(12) United States Patent
Lewis et al.

(10) Patent No.: US 7,617,328 B2
(45) Date of Patent: Nov. 10, 2009

(54) SYSTEM FOR TRANSLATION AND COMMUNICATION OF MESSAGING PROTOCOLS INTO A COMMON PROTOCOL

(75) Inventors: John Ervin Lewis, Lawrenceville, GA (US); Danh Tan Lai, Fremont, CA (US); Simon James Richardson, Pflugerville, TX (US); Richard Man-Keung Tam, Austin, TX (US); Justin McNamara, Atlanta, GA (US); Karl J. Schlieber, Flemington, NJ (US); Jessie T. Lee, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 532 days.

(21) Appl. No.: 10/299,550

(22) Filed: Nov. 18, 2002

(65) Prior Publication Data

US 2003/0101283 A1 May 29, 2003

Related U.S. Application Data

(60) Provisional application No. 60/332,376, filed on Nov. 16, 2001.

(51) Int. Cl.
*G06F 15/16* (2006.01)
(52) U.S. Cl. .................................. 709/246; 709/206
(58) Field of Classification Search ................. 709/246
See application file for complete search history.

(56) References Cited

U.S. PATENT DOCUMENTS 4,527,270 A 7/1985 Sweeton

| | | |
|---|---|---|
| 4,625,308 A | 11/1986 | Kim et al. |
| 5,029,199 A | 7/1991 | Jones et al. |
| 5,034,976 A | 7/1991 | Sato |
| 5,130,986 A | 7/1992 | Doshi |
| 5,142,693 A | 8/1992 | Hanks et al. |
| 5,193,110 A | 3/1993 | Jones et al. |
| 5,224,095 A | 6/1993 | Woest et al. |
| 5,313,653 A | 5/1994 | Sasuta |
| 5,325,310 A | 6/1994 | Johnson et al. |

(Continued)

FOREIGN PATENT DOCUMENTS

EP 0854655 4/2003

OTHER PUBLICATIONS

WO 200103011, Kamadolli S; Tipnis R, Jan. 11, 2001.*

(Continued)

*Primary Examiner*—Hassan Phillips
(74) *Attorney, Agent, or Firm*—Moazzam & Associates, LLC

(57) ABSTRACT

An adapter for passing messages in a telecommunications infrastructure from a first device to a second device. The adapter comprises a messaging interface, a processor, and a bus interface. The messaging interface is in communication with the first device and is operable to receive a received message in a first messaging format from the first device. The processor is coupled to the messaging interface and is operable to receive the received message from the messaging interface and translate the received message into a common message in a common format. The bus interface is coupled to the processor and is operable to receive the common message from the processor and transmit the common message to the second device through a bus.

24 Claims, 48 Drawing Sheets

U.S. PATENT DOCUMENTS

| | | | |
|---|---|---|---|
| 5,329,578 A | 7/1994 | Brennan et al. |
| 5,333,184 A | 7/1994 | Doherty et al. |
| 5,406,557 A * | 4/1995 | Baudoin ..................... 709/246 |
| 5,436,960 A | 7/1995 | Campana, Jr. et al. |
| 5,457,732 A | 10/1995 | Goldberg |
| 5,572,583 A | 11/1996 | Wheeler, Jr. et al. |
| 5,604,788 A | 2/1997 | Tett |
| 5,625,816 A | 4/1997 | Burdick et al. |
| 5,635,918 A | 6/1997 | Tett |
| 5,646,676 A | 7/1997 | Dewkett et al. |
| 5,724,407 A | 3/1998 | Bruno et al. |
| 5,742,668 A | 4/1998 | Pepe et al. |
| 5,742,905 A | 4/1998 | Pepe et al. |
| 5,751,791 A | 5/1998 | Chen et al. |
| 5,751,798 A | 5/1998 | Mumick et al. |
| 5,754,754 A | 5/1998 | Dudley et al. |
| 5,797,094 A | 8/1998 | Houde et al. |
| 5,809,415 A | 9/1998 | Rossmann |
| 5,838,768 A | 11/1998 | Sumar et al. |
| 5,856,825 A | 1/1999 | Yumoto et al. |
| 5,857,191 A | 1/1999 | Blackwell et al. |
| 5,862,325 A | 1/1999 | Reed et al. |
| 5,878,230 A | 3/1999 | Weber et al. |
| 5,884,246 A * | 3/1999 | Boucher et al. ............. 709/206 |
| 5,889,839 A | 3/1999 | Beyda et al. |
| 5,889,861 A | 3/1999 | Ohashi et al. |
| 5,915,021 A | 6/1999 | Herlin et al. |
| 5,918,158 A | 6/1999 | LaPorta et al. |
| 5,930,239 A | 7/1999 | Turcotte |
| 5,948,061 A | 9/1999 | Merriman et al. |
| 5,960,338 A | 9/1999 | Foti |
| 5,966,663 A | 10/1999 | Gleason |
| 5,974,203 A | 10/1999 | Tadokoro et al. |
| 5,978,919 A | 11/1999 | Doi et al. |
| 5,987,100 A | 11/1999 | Fortman |
| 5,987,317 A | 11/1999 | Venturini |
| 5,987,609 A | 11/1999 | Hasebe |
| 6,006,189 A | 12/1999 | Strawczynski et al. |
| 6,012,098 A | 1/2000 | Bayeh et al. |
| 6,032,039 A | 2/2000 | Kaplan |
| 6,075,971 A | 6/2000 | Williams et al. |
| 6,085,068 A | 7/2000 | Eaton et al. |
| 6,088,717 A | 7/2000 | Reed et al. |
| 6,092,114 A | 7/2000 | Shaffer |
| 6,094,573 A | 7/2000 | Heinonen et al. |
| 6,108,688 A | 8/2000 | Nielsen et al. |
| 6,119,014 A | 9/2000 | Alperovich et al. |
| 6,125,281 A | 9/2000 | Wells et al. |
| 6,131,118 A | 10/2000 | Stupek, Jr. et al. |
| 6,151,696 A | 11/2000 | Miller et al. |
| 6,173,284 B1 | 1/2001 | Brown |
| 6,173,415 B1 | 1/2001 | Litwin et al. |
| 6,175,743 B1 | 1/2001 | Alperovich et al. |
| 6,181,781 B1 | 1/2001 | Porter et al. |
| 6,202,099 B1 | 3/2001 | Gillies et al. |
| 6,212,550 B1 | 4/2001 | Segur |
| 6,216,008 B1 | 4/2001 | Lee |
| 6,219,542 B1 | 4/2001 | Aas et al. |
| 6,259,910 B1 | 7/2001 | Fairfield et al. |
| 6,285,889 B1 | 9/2001 | Nykanen et al. |
| 6,330,436 B1 | 12/2001 | Zidel |
| 6,360,252 B1 | 3/2002 | Rudy et al. |
| 6,363,339 B1 | 3/2002 | Rabipour et al. |
| 6,389,276 B1 | 5/2002 | Brilla et al. |
| 6,393,288 B1 | 5/2002 | Sollee et al. |
| 6,408,177 B1 | 6/2002 | Parikh et al. |
| 6,408,191 B1 | 6/2002 | Blanchard et al. |
| 6,418,306 B1 | 7/2002 | McConnell |
| 6,421,707 B1 | 7/2002 | Miller |
| 6,438,585 B2 | 8/2002 | Mousseau et al. |
| 6,473,609 B1 | 10/2002 | Schwartz et al. |
| 6,480,712 B1 | 11/2002 | Vigil |
| 6,485,396 B2 | 11/2002 | Stevens |
| 6,487,602 B1 | 11/2002 | Thakker |
| 6,560,318 B1 | 5/2003 | Spielman et al. |
| 6,564,253 B1 | 5/2003 | Stebbings |
| 6,571,245 B2 | 5/2003 | Huang et al. |
| 6,591,315 B1 | 7/2003 | Bhagat et al. |
| 6,618,763 B1 | 9/2003 | Steinberg |
| 6,622,124 B1 | 9/2003 | Kolls |
| 6,625,447 B1 | 9/2003 | Rossmann |
| 6,628,761 B1 | 9/2003 | Adamczyk et al. |
| 6,633,756 B1 | 10/2003 | Tett |
| 6,640,097 B2 | 10/2003 | Corrigan et al. |
| 6,643,507 B1 | 11/2003 | Chow et al. |
| 6,643,684 B1 | 11/2003 | Malkin et al. |
| 6,665,378 B1 | 12/2003 | Spielman et al. |
| 6,671,355 B1 | 12/2003 | Spielman et al. |
| 6,674,767 B1 * | 1/2004 | Kadyk et al. ................. 709/230 |
| 6,714,204 B2 | 3/2004 | Ishida et al. |
| 6,714,859 B2 | 3/2004 | Jones |
| 6,718,178 B1 | 4/2004 | Sladek et al. |
| 6,721,803 B1 | 4/2004 | Kirkeby |
| 6,724,863 B1 | 4/2004 | Bedingfield |
| 6,731,942 B1 | 5/2004 | Nageli |
| 6,732,175 B1 * | 5/2004 | Abjanic ...................... 709/227 |
| 6,738,636 B2 | 5/2004 | Lielbriedis |
| 6,751,298 B2 | 6/2004 | Bhogal et al. |
| 6,769,010 B1 | 7/2004 | Knapp et al. |
| 6,823,365 B1 | 11/2004 | Mattis et al. |
| 6,823,457 B1 | 11/2004 | Berstis et al. |
| 6,832,243 B1 | 12/2004 | Mikalsen et al. |
| 6,839,741 B1 | 1/2005 | Tsai |
| 6,850,944 B1 | 2/2005 | MacCall et al. |
| 6,871,063 B1 | 3/2005 | Schiffer |
| 6,873,841 B1 | 3/2005 | Sagar |
| 6,910,024 B2 | 6/2005 | Krishnamurthy et al. |
| 6,912,400 B1 | 6/2005 | Olsson et al. |
| 6,928,290 B2 | 8/2005 | Byers et al. |
| 6,947,738 B2 | 9/2005 | Skog et al. |
| 6,961,330 B1 * | 11/2005 | Cattan et al. ................. 370/352 |
| 6,976,174 B2 | 12/2005 | Terrell et al. |
| 6,978,364 B1 | 12/2005 | Balaz et al. |
| 6,981,029 B1 | 12/2005 | Menditto et al. |
| 6,987,580 B2 | 1/2006 | Watanabe et al. |
| 6,996,393 B2 | 2/2006 | Pyhalammi et al. |
| 7,031,437 B1 | 4/2006 | Parsons et al. |
| 7,039,037 B2 | 5/2006 | Wang et al. |
| 7,046,691 B1 | 5/2006 | Kadyk et al. |
| 2001/0005859 A1 | 6/2001 | Okuyama |
| 2001/0016483 A1 | 8/2001 | Nakajima |
| 2001/0027474 A1 | 10/2001 | Nachman et al. |
| 2001/0034226 A1 | 10/2001 | Watanabe et al. |
| 2001/0044310 A1 | 11/2001 | Lincke |
| 2002/0019743 A1 | 2/2002 | Nakamura |
| 2002/0029189 A1 | 3/2002 | Titus et al. |
| 2002/0032027 A1 | 3/2002 | Kirani et al. |
| 2002/0055350 A1 | 5/2002 | Gupte et al. |
| 2002/0056006 A1 | 5/2002 | Vange et al. |
| 2002/0068554 A1 | 6/2002 | Dusse |
| 2002/0090932 A1 | 7/2002 | Bhatia et al. |
| 2002/0102999 A1 | 8/2002 | Maggenti et al. |
| 2002/0112014 A1 | 8/2002 | Bennett et al. |
| 2002/0112078 A1 | 8/2002 | Yach |
| 2002/0115456 A1 | 8/2002 | Narinen et al. |
| 2002/0115457 A1 | 8/2002 | Koscal |
| 2002/0123359 A1 | 9/2002 | Wei et al. |
| 2002/0143954 A1 | 10/2002 | Aiken et al. |
| 2002/0160756 A1 | 10/2002 | Amin |
| 2002/0160805 A1 | 10/2002 | Laitinen et al. |
| 2002/0168978 A1 | 11/2002 | Molnar et al. |
| 2002/0177455 A1 | 11/2002 | Lehto et al. |
| 2002/0183080 A1 | 12/2002 | Poor et al. |
| 2003/0008635 A1 | 1/2003 | Ung et al. |

| | | | |
|---|---|---|---|
| 2003/0037181 | A1* | 2/2003 | Freed .................... 709/328 |
| 2003/0040298 | A1 | 2/2003 | Heatley |
| 2003/0045273 | A1 | 3/2003 | Pyhalammi et al. |
| 2003/0050050 | A1 | 3/2003 | Higuchi et al. |
| 2003/0061205 | A1* | 3/2003 | Cleghorn et al. .......... 707/3 |
| 2003/0061388 | A1* | 3/2003 | Cleghorn et al. ........ 709/246 |
| 2003/0069975 | A1* | 4/2003 | Abjanic et al. ........... 709/227 |
| 2003/0073450 | A1 | 4/2003 | Laumen et al. |
| 2003/0093412 | A1 | 5/2003 | Urkumyan |
| 2003/0123622 | A1 | 7/2003 | Gifford et al. |
| 2003/0228863 | A1 | 12/2003 | Vander Veen et al. |
| 2003/0233580 | A1 | 12/2003 | Keeler et al. |
| 2004/0015366 | A1* | 1/2004 | Wiseman et al. ............ 705/1 |
| 2004/0023643 | A1 | 2/2004 | Vander Veen et al. |
| 2004/0029566 | A1 | 2/2004 | Cunningham et al. |
| 2004/0029567 | A1 | 2/2004 | Timmins et al. |
| 2004/0082316 | A1 | 4/2004 | Duran et al. |
| 2004/0085360 | A1 | 5/2004 | Pratt et al. |
| 2004/0157586 | A1 | 8/2004 | Robinson et al. |
| 2004/0203948 | A1 | 10/2004 | Provost et al. |
| 2004/0230660 | A1 | 11/2004 | Abjanic et al. |
| 2005/0038892 | A1 | 2/2005 | Huang et al. |

OTHER PUBLICATIONS

Stevens, Richard W. TCP/IP Illustrated, vol. 1. Indianapolis: Pearson, 1994.

Fairhurst, Gorry. "IP Packet Header." http://www.erg.abdn.ac.uk/users/gorry/course/inet-pages/ip-packet.html.

Openwave, Openwave Voice Messaging, printed from the internet on Nov. 17, 2004, date of first publication Unkown, 2 pages, printed from ww.openwave.com/us/products/mobile/operator_products.

Openwave, Operator Products, printed from the internet on Nov. 17, 2004, 2 pages, date of first publication Unknown, printed from www.openwave.com/us/products/mobile/operator_products.

Openwave, Openwave Multimedia Messaging Service Center Openwave, printed from the internet on Feb. 17, 2004, 2 pages, date of first publication Unknown, printed from www.openwave.com/us/products/mobile/operator_products.

Motorola, Motorola Multimedia Messaging Service, printed from the internet on Jun. 19, 2006, date of first publication Unknown, 2 pages, printed from www.motorola.com/networkoperators/pdfs/VAS-MMSC.pdf.

Nokia, Are you ready for Multimedia Messaging Service; An evolutionary approach to implementing MMS, dated white paper, 2002, date of first publication Unknown, 12 pages. Www.nokia.com.

Tenet Technologies, Unified Multimedia Messaging Service (UMMS) Server, 2 pages, date of first publication Unknown, www.tenetindia.com, Bangalore, India.

* cited by examiner

| Ref ID | Field Name | Example | Required at time of initial Registration? | Customer Proprietary |
|---|---|---|---|---|
| 1. | Username | asmith | Yes | N |
| 2. | Password | 1234 | Yes | Y |
| 3. | Signed Up for DirectBill | Y/N | Yes | N |
| 4. | Signed Up for Promotional Messages | Y/N | Yes | N |
| 5. | Account Status (Active, Suspended, Closed) | Active | Yes | N |
| 6. | Unique Account Identifier | A11b25s | Yes | N |
| 7. | Account Number | 12345 | Yes | N |
| 8. | Sub – Account Number (if applicable) | 9876 | Yes | N |
| 9. | Account Type (Postpaid, Prepaid, Reseller, Corporate) | Post | Yes | N |
| 10. | Rate Plan | CH 300 | Yes | N |
| 11. | Feature Codes per Device<br>- IM Y/N – if Y, what code<br>- WAP CSD Y/N – if Y, what code<br>- WAP GPRS Y/N – if Y, what code | IM06<br>IM03 | Yes | N |
| 12. | Service Activation Date | 01/01/01 | Yes | N |
| 13. | Service Termination Date (if applicable) | | Yes | N |
| 14. | Billing Cycle Date | 14 | Yes | N |
| 15. | Credit Class Code – Spending Limit | A | Yes | Y |
| 16. | Language | English | Yes | N |
| 17. | Provisionable Classes of Service (Games, Ringtones, Promo Messages, etc...) (Replaces TCOS & OCOS) | Games Y/N<br>Ringtones Y/N | No | N |
| 18. | Parental Control Password | | No | Y |
| 19. | Default Portal Selection (General, Spanish, Youth, Business, etc...) | General | Yes | N |
| 20. | Device Type | RIM 950 | Yes | N |
| 21. | Network Type | GSM, GAIT, TDMA, etc. | Yes | N |
| 22. | Prepaid account server | | | |
| 23. | Prepaid account server version | | | |
| 24. | MSISDN / MDN Ported Number (if applicable) | 404-401-1234 | Yes | N |
| 25. | IMSI/MIN | 11009060125 | Yes | N |
| 26. | ESN | 11008914714 | Yes | |
| 27. | SIM Version | GAIT,GSM SIM Tool, 16k, 32k, etc | Yes | N |
| 28. | RIM User's Name (CI) (could be one of the aliases) | annsmith | Yes | N |
| 29. | MAN/PIN (CI) | 15775065 | Yes | N |
| 30. | Account Number (CI) | 1234567 | Yes | N |
| 31. | Account Type (CI) | Enterprise | Yes | N |
| 32. | Operating System (CI) | 2.0.13 | Yes | N |
| 33. | Memory (CI) | 4M | Yes | N |
| 34. | ESN/MSN (CI) | 031/15/130066 | Yes | N |
| 35. | Domain/Closed User Group (CI) | @imcingular.com | Yes | N |
| 36. | Device Schedule | Mobitex | No | |
| 37. | Device Make | Nokia | Yes | N |
| 38. | Device Model | 7160 | Yes | N |
| 39. | Device Version | 1.04 | No | N |
| 40. | Device Email Address | 4044011234@mobile.mycingular.net | No | N |
| 41. | IP Address (GPRS) | | No | N |
| 42. | Password Validation Required on Originator (distribution list access) | Y | No | N |
| 43. | Password for distribution list access (one for each list) | ******** | No | Y |
| 44. | Destination Email Address | Annie@aol.com | No | N |
| 45. | Destination Label | | No | N |
| 46. | Customer's POP Server List | Mail.atl.bellsouth.net | No | N |
| 47. | Alerts Disabled? | Y/N | No | N |
| 48. | My Time Zone | EST | No | N |
| 49. | Distribution Lists (one for each list) | PaulConst, PaulMaint | No | N |
| 50. | Alias (one for each list) | Annie | No | N |
| 51. | User Defined "Blacklist" | Aol.com, xyz.com, | No | N |
| 52. | User Defined "Whitelist" | Sam123@Aol.com, all mobiles | No | N |
| 53. | Previous mobile number (due to a number change) | 40455512344 | No | N |

Fig. 30a

SYSTEM FOR TRANSLATION AND COMMUNICATION OF MESSAGING PROTOCOLS INTO A COMMON PROTOCOL

RELATED APPLICATIONS

The application claims the benefit of priority from provisional U.S. Patent Application Ser. No. 60/332,376 filed Nov. 16, 2001 which is expressly incorporated herein by reference.

Set forth below is a complete list containing the names of this application and related commonly owned U.S. Patent Applications entitled "Telecommunications System Messaging Infrastructure", A System for Translation and Communication of Messaging Protocols into a Common Protocol, A System for the Validation and Routing of Messages", A System for the Storage and Retrieval of Messages", A Sysem for Handling Proprietary Files", A System for Handling File Attachments", A System for the Centralized Storage of Wireless Customer Information", A System for Customer Access to Messaging and Configuration Data", A System and Method for Querying Message Information", A System and Method for Password Protecting a Distribution", A System and Method for Providing Message Notification", Methods and Systems for Routing Messages Through a Communications Network Based on Message Content", and Methods and Systems for Tracking and Playing Back Errors in a Communications Network" filed on the same date herewith.

BACKGROUND OF THE INVENTION

As we progress into the twenty-first century, communications systems continue to enhance the interconnectedness of mankind. In particular, mobile telephony permits individuals to stay in contact with each other, without the prior limitations of being tied to land line systems. With the simple act of dialing a telephone number, a cellular telephone user can contact anyone possessing a telephone for instant voice communication. As mobile telephony technology improves, engineers have developed additional means of communicating using a cell phone. These include various forms of short messaging and email.

Unfortunately, while voice communication across multiple plain old telephone systems (POTS) and varying cell phone technologies is possible due to compatibility of the systems, users of mobile telephony products have difficulty communicating with each other over different systems and standards. For instance, a cell phone user having access to short messaging service (SMS) messages can not send an SMS message to a user utilizing a Research-in-Motion (RIM) pager which operates using Mobitex messages. Things become even more difficult when those users are operating with different service providers.

A system is needed to provide mobile telephony product users access to differing messaging types, such that messages sent in a first format can be received by a user in a second format. Such a system should provide a message translation device to translate incoming messages into a common protocol that can be converted to a protocol compatible with a recipient device.

SUMMARY OF THE INVENTION

In accordance with an aspect of the present invention, an adapter for passing messages in a telecommunications infrastructure from a first device to a second device is disclosed. The adapter comprises a messaging interface, a processor, and a bus interface. The messaging interface is in communication with the first device and is operable to receive a received message in a first messaging format from the first device. The processor is coupled to the messaging interface and is operable to receive the received message from the messaging interface and translate the received message into a common message in a common format. The bus interface is coupled to the processor and is operable to receive the common message from the processor and transmit the common message to the second device through a bus.

In accordance with another aspect of the present invention, an adapter for passing messages in a telecommunications infrastructure from a bus to a device is disclosed. The adapter comprises a bus and a processor. The bus interface is coupled to the bus and is operable to receive a common message in a common format from the bus. The processor is coupled to the bus interface and is operable to receive the common message from the bus interface and translate the common message into a device message in a device format. The messaging interface is coupled to the processor and in communication with the device and is operable to receive the device message from the processor and send the device message to the device.

In accordance with another aspect of the present invention, a method of passing messages from a first device to a second device in a telecommunications infrastructure is disclosed. The method receives a received message from the first device, the first message being in a first messaging format. Next, the method translates the received message from the first messaging format into a common message in a common format. Next, the method provides the common message through a bus to the second device.

In accordance with another aspect of the present invention, a computer-readable medium having executable instructions for passing messages from a first device to a second device in a telecommunications infrastructure is disclosed. The instructions receive a received message from the first device, the first message being in a first messaging format. Next, the instructions translate the received message from the first messaging format into a common message in a common format. Next, the instructions provide the common message through a bus to the second device.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

The accompanying drawings, which are incorporated in and constitute a part of this specification, illustrate one embodiment of the invention and together with the description, serve to explain the principles of the invention.

DESCRIPTION OF THE EMBODIMENTS

Detailed Description

Reference will now be made in detail to the present exemplary embodiments of the invention, examples of which are illustrated in the accompanying drawings. Wherever possible, the same reference numbers will be used throughout the drawings to refer to the same or like parts.

Overview

A messaging infrastructure 100 serves to communicate messages from a first device to a second device. While in the prior art messaging tended to be limited to sending and receiving messages only from devices accessible from the same Short Message Service Center (SMSC), exemplary embodiments of a messaging infrastructure 100 consistent with the present invention facilitate the sending of messages between disparate devices, many of which use different messaging protocols and formats, across a range of messaging centers and gateways. In order to assist in this process, messages sent from a first device may be received by a first adapter, which translates the messages into a common format; published onto a network transport bus in a common messaging format; received by a second adapter, which translates the messages into a second device format; and transmitted to the second device. In this fashion messages can be transmitted between various devices having different formats and capacities.

Figure 1:
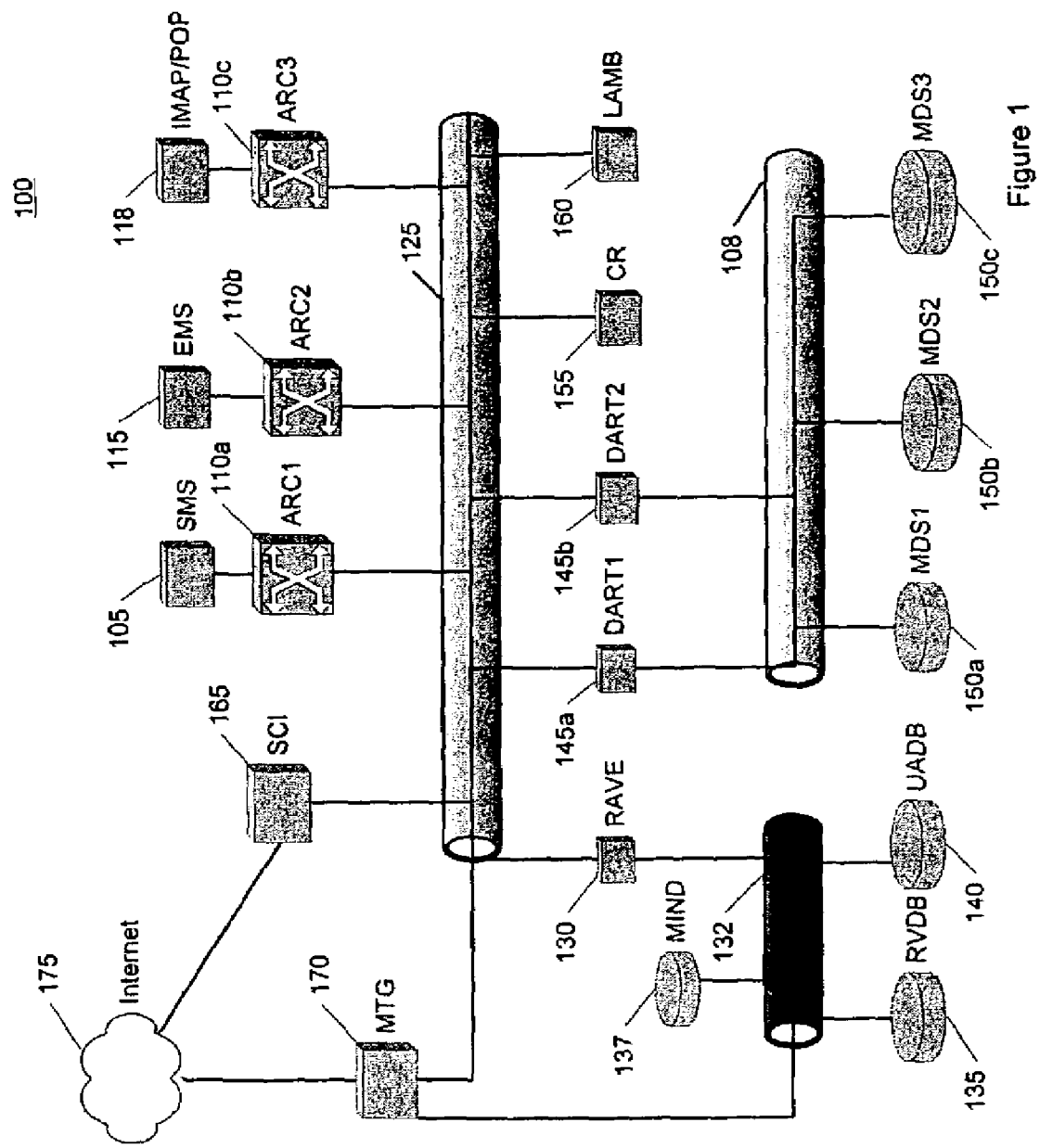
FIG. 1 illustrates a diagram of a messaging infrastructure 100 in an exemplary embodiment consistent with the present invention.

FIG. 1 illustrates a diagram of a messaging infrastructure 100 in an exemplary embodiment consistent with the present invention. The wireless messaging infrastructure 100 is comprised of a number of network elements communicating over a network transport bus 125. The network transport bus 125 may be a common asynchronous message exchange mechanism for transmitting messages in a common format. One or more Adaptive Routing Concentrators (ARCs) 110a-c provide messaging elements, such as Short Messaging Service (SMS) 105, Enhanced Messaging Service (EMS) 115, and Internet Message Access Protocol/Post Office Protocol (IMAP/POP) server 118 access to and from the network transport bus 125. The ARCs 110a-c serve to translate messages between a particular messaging element format associated with the messaging element and the common format used on the network transport bus 125. The ARCs 110a-c also may request routing information from routing entities and send the translated messages across the network transport bus 125 to an appropriate destination ARC.

In exemplary embodiments of the present invention, the one or more routing entities are known as a Routing and Validation Entities (RAVE) 130 which may be accessed by the ARCs 110a-c to perform validation, routing and alias/distribution list functions. The RAVE 130 accesses routing information in a Routing and Validation Database (RVDB) 135 via a Backbone Integration Transport Bus (BITBUS) 132. The RAVE 130 accesses alias and distribution list data in the User Alias Database (UADB) 140. In exemplary embodiments of the present invention, a Master IT and Network Database (MIND) 137 may populate both the RVDB 135 and the UADB 140. The RAVE 130 returns routing information to the ARC 110a-c that requested the routing information. Through the interaction of the ARCs 110a-c, the network transport bus 125, and the RAVE 130, messages into the messaging infrastructure 100 are received, translated, routed, and transmitted to destination devices.

In addition to these elements, exemplary embodiments of the present invention may also include one or more Data Storage and Routing Terminals (DART) 145a-b interfaced to the network transport bus 125 for storing messaging data in a Message Data Store (MDS) 150a-c for access and retrieval at later points in time. The DARTs 145a-b access the MDSs 150a-c via a Backbone DataStore Transport Bus 108. One or more Content Routers 155 interfaced to the network transport bus 125 receive messages addressed to a particular address and redirect the messages to external devices which, for example, may return information requested in the message to the message sender. A Logging Administration Maintenance and Billing Entity (LAMB) 160 interfaced to the network transport bus 125 may log network traffic for error tracking, error replay and billing functions. Also, a Subscriber Configuration Interface (SCI) 165 interfaces to the network transport bus 125 for allowing users to access and update subscriber and messaging device information.

Exemplary embodiments consistent with the present invention may also include a Mail Transfer Gateway (MTG) 170. The Mail Transfer Gateway 170 may serve as an email gateway between the messaging infrastructure 100 and the Internet 175. To facilitate this function, the Mail Transfer Gateway may be coupled to both the network transport bus 125 and the BITBUS 132.

Adaptive Routing Concentrator Hardware

Figure 2:
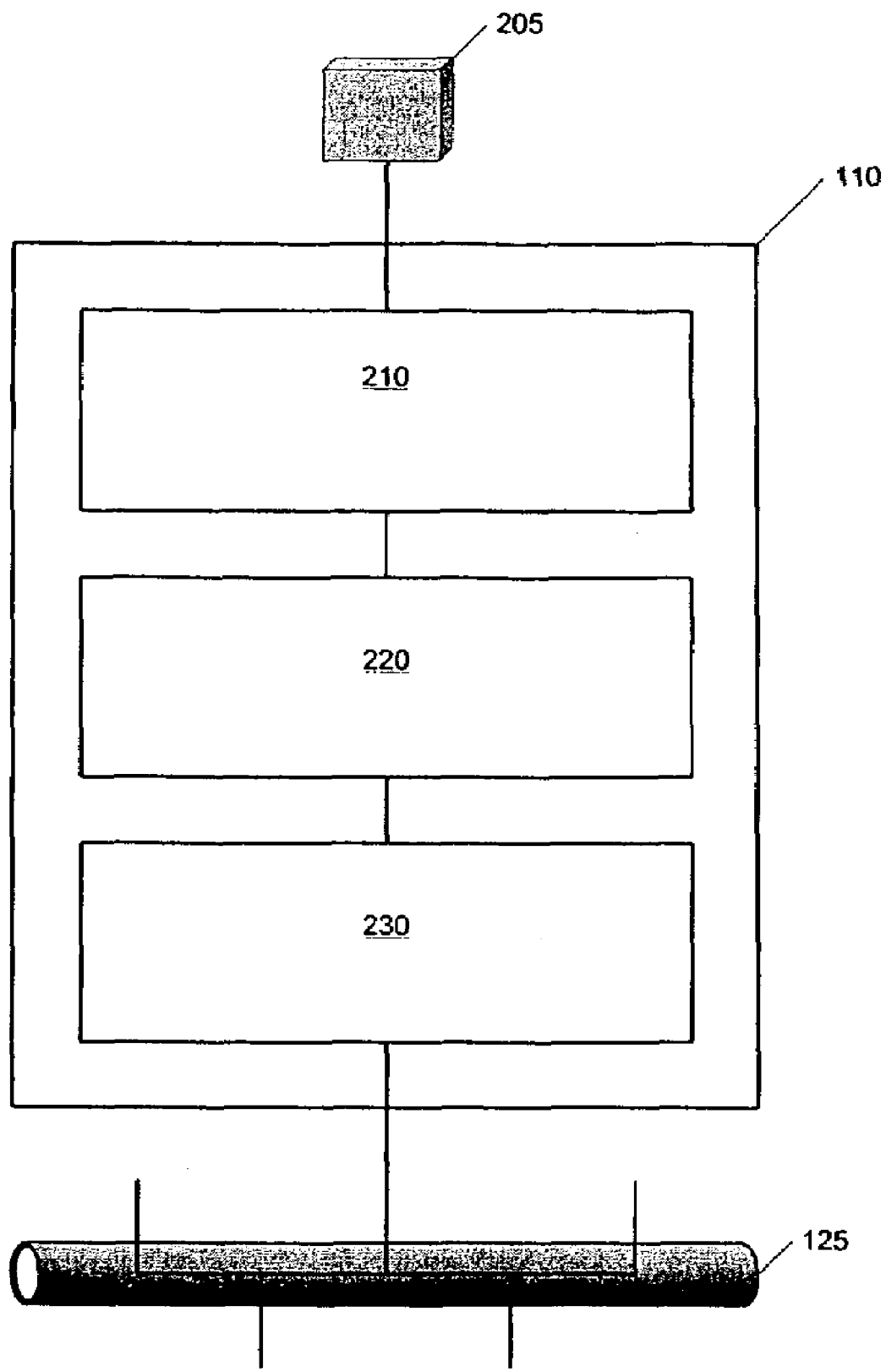
FIG. 2 illustrates a diagram of an adaptive routing concentrator in an exemplary embodiment consistent with the present invention.

FIG. 2 illustrates a diagram of an adaptive routing concentrator 110 in an exemplary embodiment consistent with the present invention. The adapter, or ARC 110, comprises a messaging interface 210 coupled to a processor 220 coupled to a network transport bus interface 230. The messaging interface 210 communicates between the ARC 110 and a messaging element 205. The message element 205 may be any of a number of messaging elements communicating a variety of messaging protocols. Messaging element 205 may comprise, for example, an SMSC, an Enhanced Messaging Service Center (EMSC), an email gateway operating Simple Mail Transfer Protocol (SMTP), Multipurpose Internet Mail Extensions (MIME) or Short Message Peer to Peer (SMPP), an Instant Messaging (IM) gateway, a push proxy gateway communicating HTTP elements, Telecator Alphanumeric Paging Protocol (TAP), or a Mobitex gateway.

Messaging interface 210 is operable to pre-cache messages or post-cache messages, or it performs no caching. Caching is useful where certain messaging elements operate in such a way that messages are segmented into multiple parts. In pre-caching, incoming message segments into the messaging interface 210 are held in the messaging interface 210 until the last segment is received, prior to sending the incoming message to the processor 220. In post-caching, outgoing segmented messages from the messaging interface 210 to the message element 205 are held until the last segment is received.

Messaging interface 210 is extensible such that, regardless of the messaging element 205 with which the messaging interface 210 is communicating, the messaging interface 210 can be adapted to communicate with that messaging element 205. Communication between the messaging interface 210 and the messaging element 205 may be unidirectional or bi-directional, such that the ARC 110 may send and/or receive messages with the messaging element 205. In addition, the ARC 110 may comprise multiple messaging interfaces 210, where each interface communicates with a separate messaging element 205.

The messaging interface 210 communicates with the processor 220. Regarding messages incoming from the messaging interface 210, the processor 220 operates to translate messages between the messaging element format or protocol and the common format utilized on the network transport bus 125. In addition, the processor 220 generates routing requests from a router, generally a RAVE. In order to generate a routing request, the processor 220 may parse the incoming message from the message interface 210 to retrieve an originating address and a destination address from the incoming message. The routing request may include the origination address, destination address, and a unique transaction identification that identifies the message. The processor 220 receives a routing response via the network transport bus interface 230 that contains routing information for the received message. Based on the routing response, the processor 220 operates to route messages received from the messaging interface 210 to an appropriate destination.

Should routing responses contain requests for additional information, such as a password, the processor 220 operates to request the password via the messaging interface 210 from the messaging element 205 and verify the receipt of an accurate password prior to routing the message to its destination. The processor 220 is also operable to send message status information to the messaging element 205 via the messaging interface 210.

Regarding messages incoming from the network transport bus interface 230, the processor 220 is operable to translate the common messages into the messaging element format and transmit the messages, via the messaging interface 210 to the messaging element 205.

The translation operation of the processor may be operable to store a plurality of potential messaging element formats within the ARC 110 or only the applicable messaging element format for the messaging element in communication with the ARC 110. The processor 220 may be operable to sense the appropriate messaging element format and adaptively translate the common format between the appropriate messaging element format, or the appropriate messaging element format may be configured into the processor 220.

The network transport interface 230 couples the processor 220 to the network transport bus 125. The network transport interface 230 monitors traffic along the network transport bus 125 for messages directed to the ARC 110 and places messages on the network transport bus 125 from the processor 210.

The Network Transport Bus

The network transport bus 125 operates as a pipeline to permit the transfer of messages between various network elements. The network transport bus utilizes a common message format for communication between the network elements. In exemplary embodiments of the present invention, the common message format may be Extensible Markup Language (XML) or MIME. While the network transport bus 125 is illustrated as a single common pipeline, those skilled in the art will appreciate that it may be segmentable and scalable and may be physically broken with firewalls and gateways separating parts of the network transport bus 125. The network transport bus 125 may include a message broker to facilitate communication along the bus and may monitor itself for congestion or other potential problems.

In an exemplary embodiment consistent with the present invention, messaging across the network transport bus 125 may be point-to-point, multipoint, or broadcast. A point-to-point message utilizes an addressing scheme whereby the message is designated to be received by a single network element. Multipoint messaging addresses a message to two or more specific network elements. Broadcast messaging publishes the message onto the network transport bus 125 for receipt by any network elements interested in receiving the message.

Exemplary embodiments consistent with the present invention may utilize a combination of subject and device addressing to send messages along the network transport bus 125. Subject based addressing tends to be broadcast based, tagging a subject address onto a message. Network elements monitor the network transport bus 125 for subject addresses of interest to the network elements. For instance, in generating a routing request, an ARC may append the subject address "Routing_Validation" to the header of a message broadcast on the network transport bus. Elements interested in reading a "Routing_Validation", such as routers or RAVEs, would read these messages off of the network transport bus 125.

Exemplary embodiments consistent with the present invention may also append a more specific network element address onto the header along with the subject address. For instance, a routing request may be addressed to "Routing_Validation.RAVE1". In which case, RAVE1 would be the intended RAVE which would read the message associated with the routing request. Other RAVEs would likely not read the message associated with the request; however, error tracking network elements, such as a LAMB, may choose to read the message.

In addition, messages may have a plurality of headers for messages intended to be received by a variety of different network elements, i.e., a multicast message. For instance, a message sent to a distribution list of recipients may have several headers attached to the message, with each header designating an intended destination network element.

Network transport bus interfaces, such as network transport bus interface 230, may run daemons that monitor the network traffic for appropriate subject addresses and network element addresses. For instance, ARC1 110a may monitor network traffic for subject addresses such as "Deliver_MSG" (for delivering a message) or "Routing_Validation_Response" (for a routing validation response). ARC1 110a may also monitor any specific network addresses appended to these subject addresses looking for ".ARC1.", in which case ARC1 110a will read the message.

Routing and Validation Entity Hardware

Figure 3:
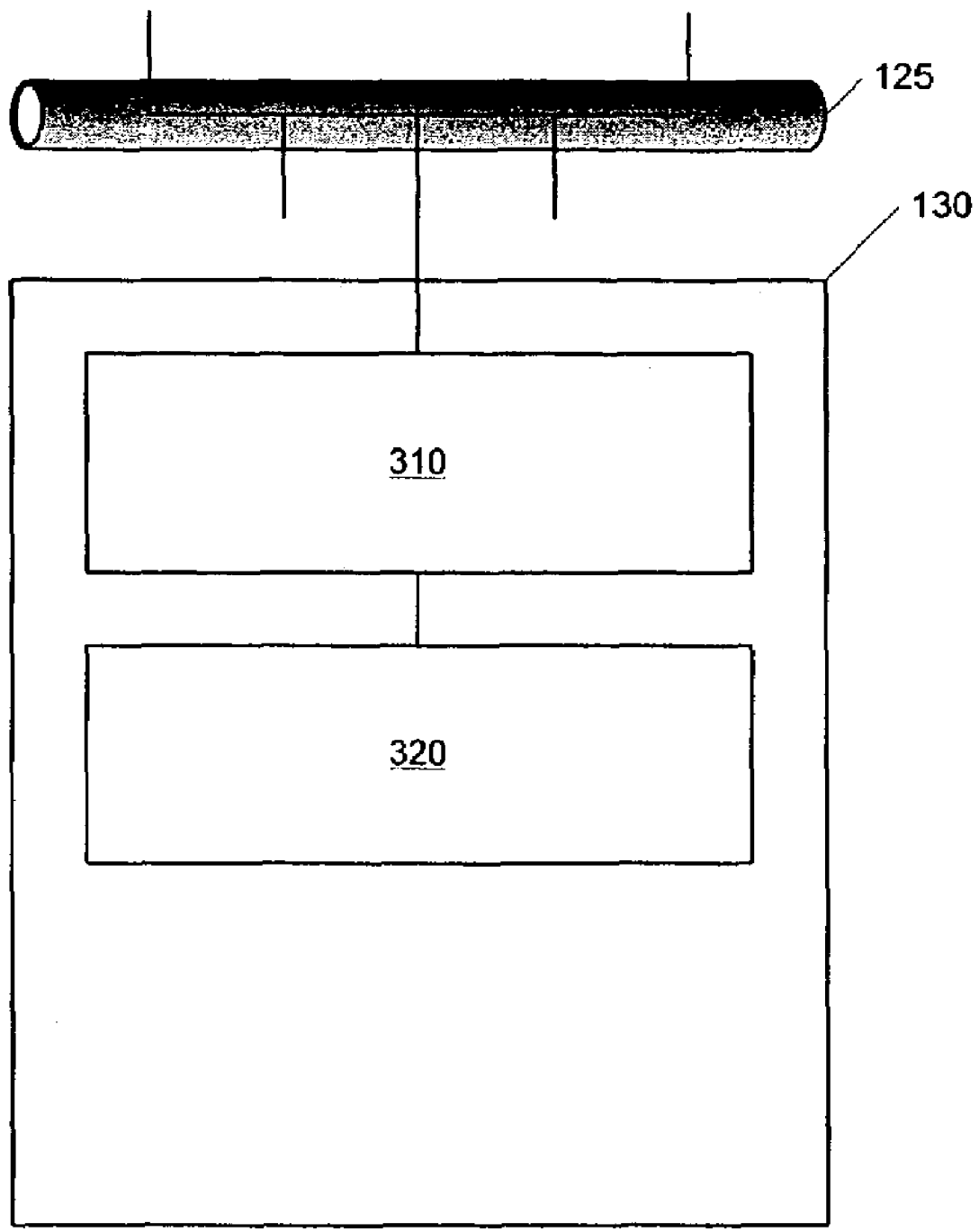
FIG. 3 illustrates a diagram of a routing and validation entity in an exemplary embodiment consistent with the present invention.

FIG. 3 illustrates a diagram of a routing and validation entity 130 in an exemplary embodiment consistent with the present invention. The RAVE 130 comprises a network transport bus interface 310 coupled to the network transport bus 125 and a processor 320 coupled to the network transport bus interface 310. The network transport interface 310 monitors traffic along the network transport bus 125 for messages directed to the RAVE 130 and places routing replies on the network transport bus 125 from the processor 320.

Similarly to the operation of the ARC's network transport bus interface 230, the RAVE's network transport bus interface 310 may run daemons that monitor the network traffic for appropriate subject addresses and network element addresses. For instance, RAVE 130 may monitor network traffic for subject addresses such as "Routing_Validation" (for receiving a routing request for a message). RAVE 130, through network transport bus interface 310 may also monitor any specific network addresses appended to these subject addresses looking for ".RAVE.", in which case RAVE 130 will read the message.

Processor 320 interfaces with the network transport bus interface 310 to receive routing requests and generate and transmit routing replies. Upon receipt of a routing request, the processor 320 may extract routing information based on the destination device address and/or the origination device address. If the destination device address is an alias or a distribution list, the processor 320 may look-up the alias or distribution list in the UADB 140 and return one or more actual destination device addresses that correspond to the alias or distribution list.

In exemplary embodiments consistent with the present invention, the processor 320 may query an RVDB, such as RVDB 135, for routing information for each of the one or more destination device address (more than one in the case of a distribution list). The routing information may contain information, including: the device type of the destination device, device address of the destination device, and an adapter, or ARC, that serves the destination device. Routing information may also include a password, if the destination device is password protected. In addition, the origination address may be used in the routing information lookup to determine if the origination device address is on a whitelist (permitted communication) or on a blacklist (barred communication). A class of service may also be looked up for the destination device address, origination device address, or both to ensure that the messaging device has an appropriate class of service prior to routing the message to the destination. In addition, if the destination device address or the origination device address is associated with a prepaid subscriber, the processor 320 may verify sufficient available funds are available to route the message. Data storage options may also be looked up for either the destination device address or the originating device address. Processor 320 may return some or all of this information in the routing reply returned to the requesting ARC.

While the RAVE 130 and the ARC 110a-c have been discussed as if they were physically separate units, it is foreseen that they may function as distinct processes within a single hardware unit. In which case, communication between the ARC 110a-c and RAVE 130 might be over a logical network transport bus rather than a physical network transport bus.

Although the functions of RAVEs, ARCs and the network transport bus has been discussed individually, and will later be discussed individually, it is helpful to understand the basic process by which messages are received, routed and delivered using these network elements.

Message Delivery

Figure 4:
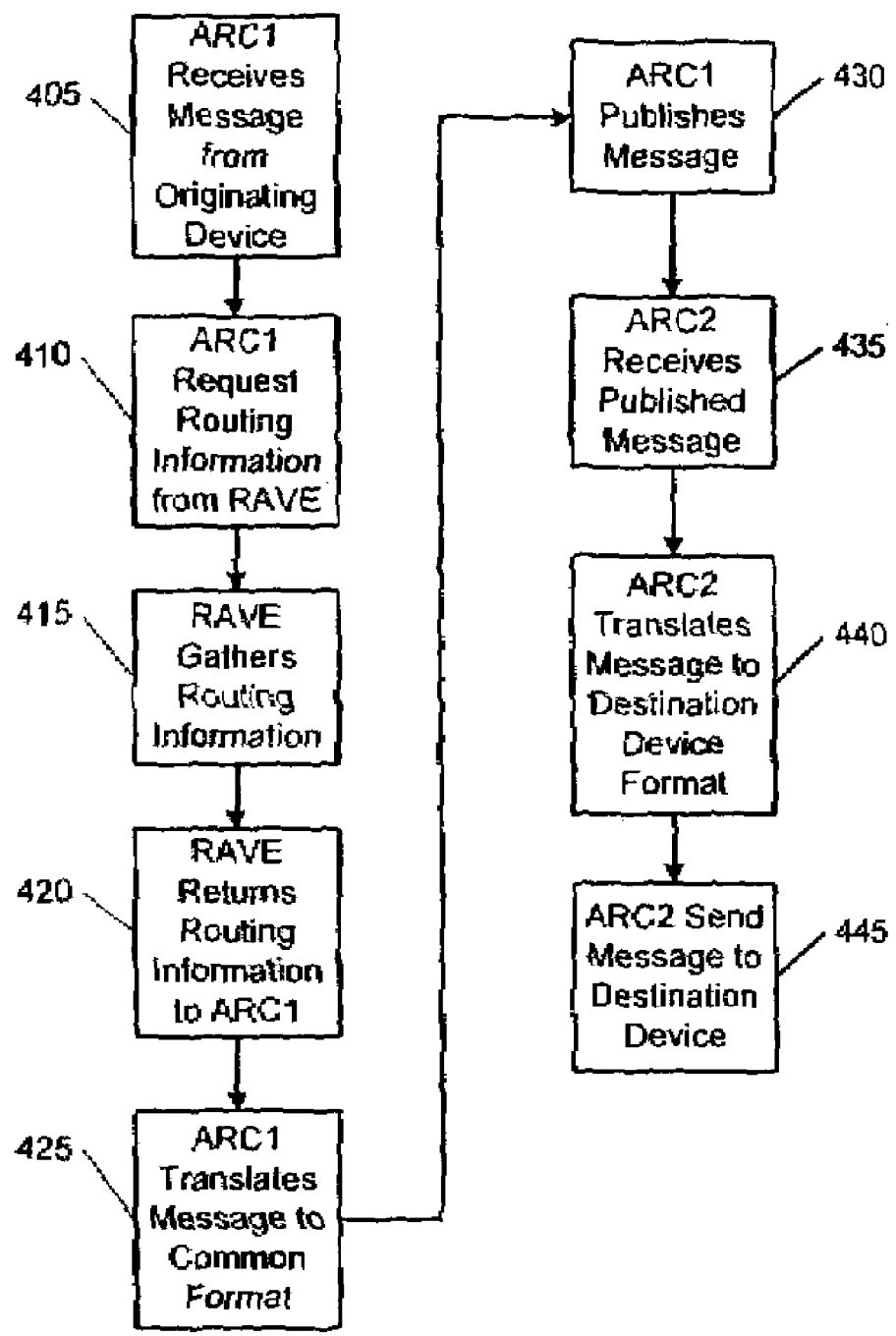
FIG. 4 illustrates a flowchart of message delivery in an exemplary embodiment consistent with the present invention.

FIG. 4 illustrates a flowchart of message delivery in an exemplary embodiment consistent with the present invention. This flowchart illustrates the processes that occur across the ARCs, RAVE, and network transport bus in an exemplary embodiment of the present invention. At stage 405, an ARC, ARC1 110a receives an incoming message from an SMSC 105. The message is received by ARC1 110a in SMS format and carries an originating device address and a destination device address. The ARC1 110a parses the incoming message for the originating device address and destination device address and assigns a unique transaction identification to the message. At stage 410, ARC1 110a requests routing information by publishing a routing request on the network transport bus. The routing request may contain the destination device address, originating device address, and the unique transaction identification. In order to save bandwidth on the bus, the message itself is typically not sent in the routing request in an exemplary embodiment of the invention.

At stage 415, the router, RAVE 130, receives the routing request and extracts routing information. The RAVE 130 may perform a look-up in the RVDB 135 based on the destination device address to extract the routing information. At stage 420, the RAVE 130 publishes the routing information back onto the network transport bus. And, the ARC1 110a picks up the routing information from the network transport bus.

At stage 425, the ARC1 110a translates the incoming message from the SMS format to the common format, either XML or MIME, and appends addressing information onto the common format message. At stage 430, the ARC1 110a publishes the message on the network transport bus. At stage 435, ARC2 receives the published message from the network transport bus. At stage 440, ARC2 110b translates the message from the common format to the ESM format, and, at stage 445, ARC2 110b transmits the message to the ESMC 115 for delivery to the destination device.

Now that an overview of message delivery has been presented, a discussion of the detailed operations of the various network elements follows.

Adaptive Routing Concentrator Operation

Figure 5:
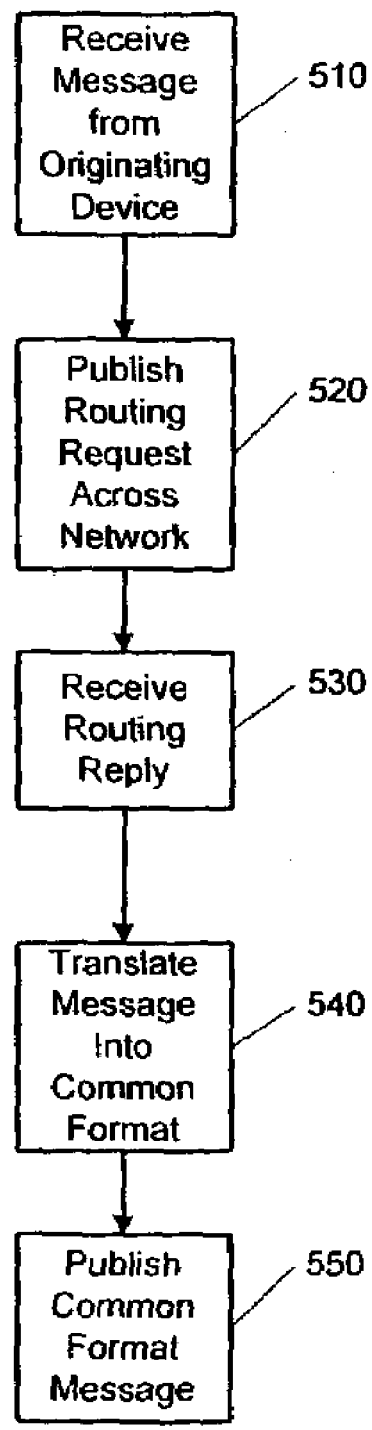
FIG. 5 illustrates a flowchart of the operation of an ARC functioning to receive a message from a messaging element in an exemplary embodiment consistent with the present invention.

FIG. 5 illustrates a flowchart of an ARC operating to receive a message from a messaging element in an exemplary embodiment consistent with the present invention. At stage 510, the ARC receives the message from the originating device via the messaging element. At stage 520, the ARC publishes a routing request for routing information for the received message. At stage 530, the ARC receives a routing reply in response to the routing request. At stage 540, assuming the routing response returns a valid response, the ARC translates the message from the incoming messaging format into the common format. At stage 550, the ARC publishes the common message to the destination device over the network transport bus.

Figure 6:
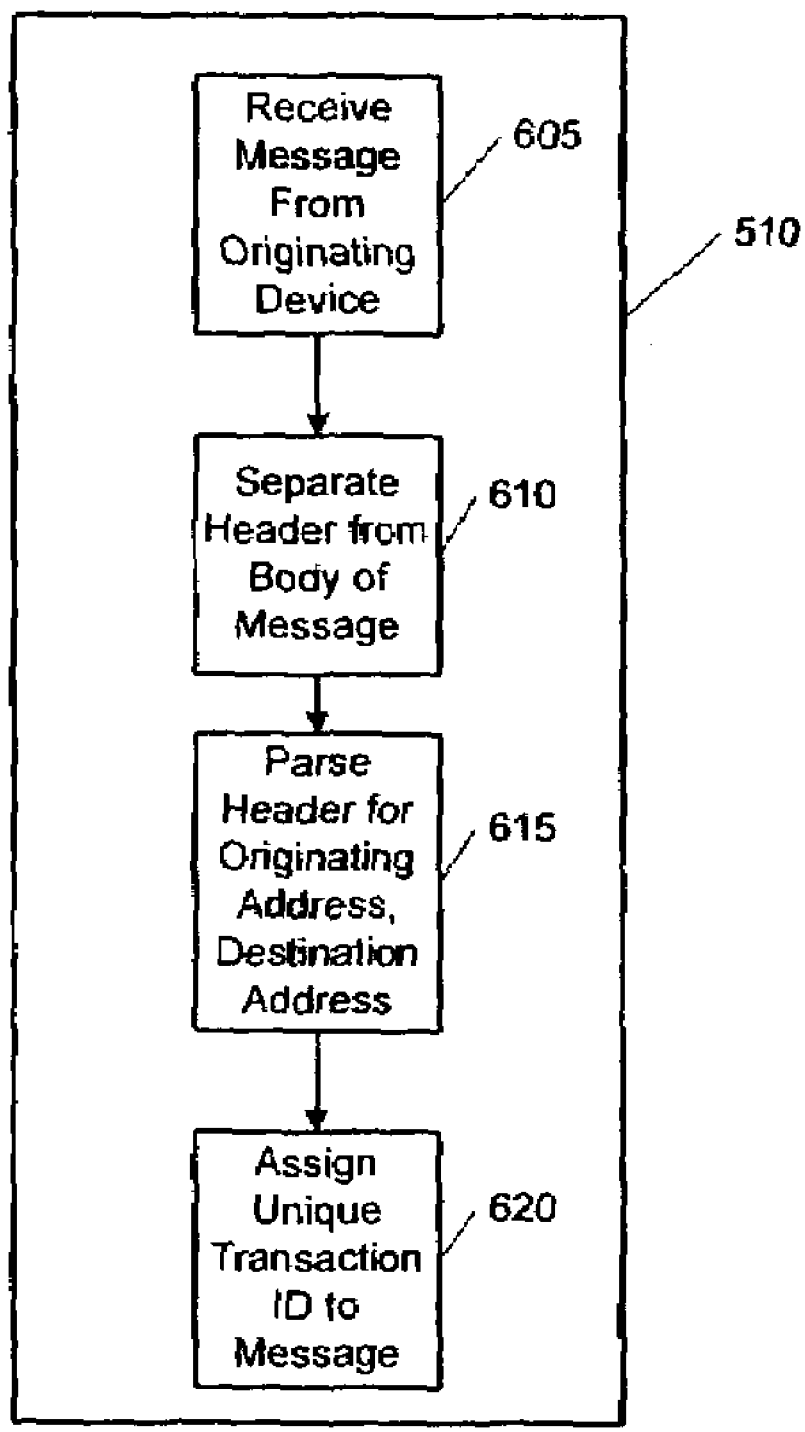
FIG. 6 illustrates a flowchart of the operation of the message receipt stage of an ARC in an exemplary embodiment consistent with the present invention.

FIG. 6 illustrates a flowchart of the operation of the message receipt stage 510 of an ARC in an exemplary embodiment consistent with the present invention. At stage 605, the ARC receives an incoming message from an originating device via a messaging element. At stage 610, the ARC separates the header from the body of the message. At stage 615, the ARC parses the header for an originating device address and a destination device address. At stage 620, the ARC assigns a unique transaction identification to the message. Typically, an ARC contains memory for short term storage of the message, header information, and associated unique transaction identification.

Figure 7:
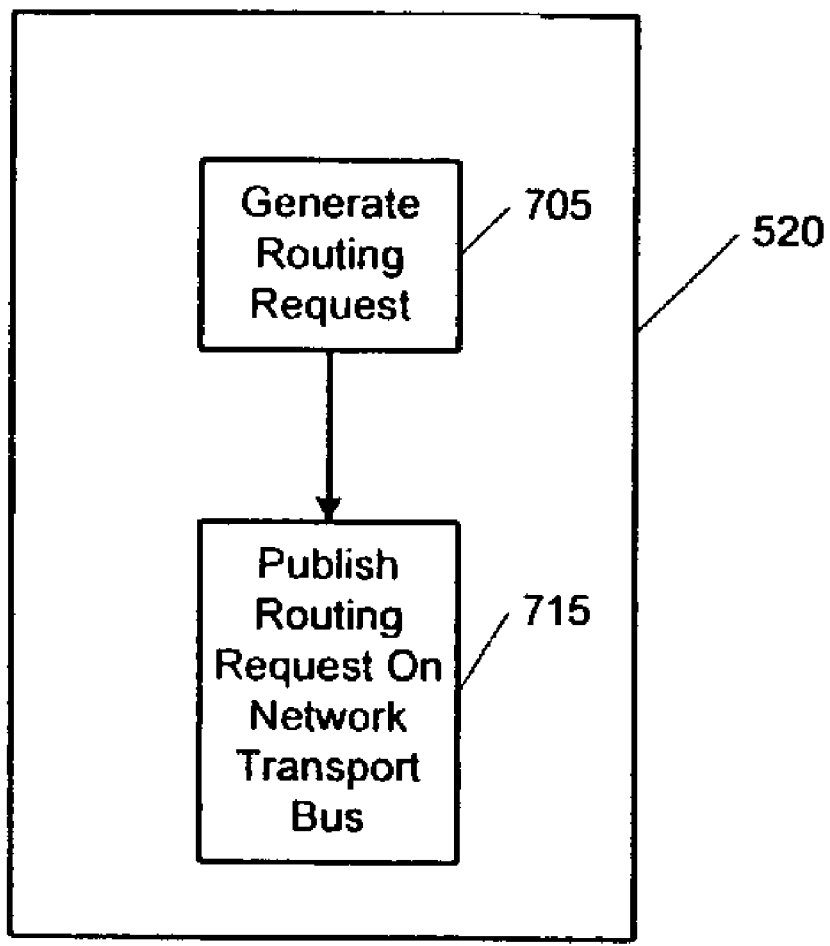
FIG. 7 illustrates a flowchart of the operation of the routing request publication stage of an ARC in an exemplary embodiment consistent with the present invention.

FIG. 7 illustrates a flowchart of the operation of the routing request publication stage 520 of an ARC in an exemplary embodiment consistent with the present invention. At stage 705, the ARC generates a routing request. Typically, a routing request may be of the following form:

"Routing_Validation.RAVE_AD-DRESS.ORIGINATING_ARC_AD-DRESS.TRANSACTION_ID.ORIGINAT-ING_DEVICE_ADDRESS.DESTINATION_DEVICE_ADDRESS"

where:

RAVE_ADDRESS is the address of the destination RAVE for the request. Typically, the ARC will not address the routing request to a particular RAVE, so this field will typically be "RAVE*", meaning any RAVE;

ORIGINATING_ARC_ADDRESS is the address of the ARC originating the routing request, e.g., ARC1, ARC2, etc.;

TRANSACTION_ID is the assigned transaction identification of the message;

ORIGINATING_DEVICE_ADDRESS is the address of the originating device gathered from parsing the header information; and DESTINATION_DEVICE_ADDRESS is the address of the destination device gathered from parsing the header information.

At stage 710, the request is published on the network transport bus.

Figure 8:
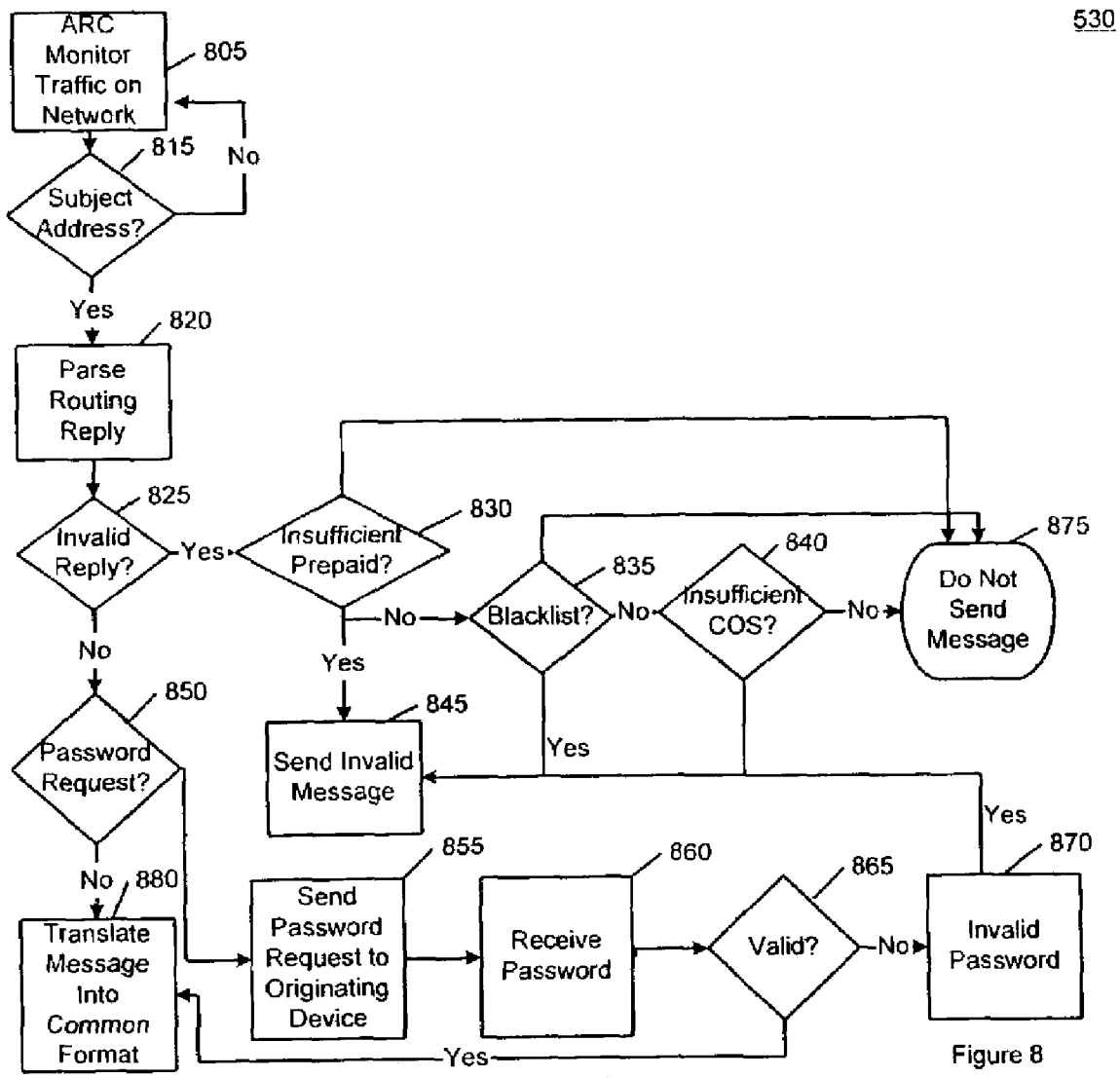
FIG. 8 illustrates a flowchart of the operation of the receipt of a routing reply stage of an ARC in an exemplary embodiment consistent with the present invention.

Once the ARC publishes the routing request, its tasks relating to this message are complete until the return of a routing reply. FIG. 8 illustrates a flowchart of the operation of the receipt of a routing reply stage 530 of an ARC in an exemplary embodiment consistent with the present invention. At stage 805, the monitor daemon in the ARC monitors traffic on the network transport bus. At stage 815, the daemon examines the header of a message on the network transport bus to determine if the subject address is a routing reply for this particular ARC. Typically, it is searching for "Routing_Validation_Response.ARCn", where ARCn is the address of this ARC that is awaiting the routing reply.

If an appropriately addressed routing reply is received at stage 815, at stage 820, the ARC will parse the routing reply. At stage 825, the routing reply is examined for an invalid message in the response. An Invalid message in the response may typically be of the following form:

"Routing_Validation_Response.Invalid.Reason", where Reason could be because of, for example, an insufficient prepaid account, blacklisting, or an insufficient COS.

If an Invalid response is returned, at stage 830 the ARC examines the reason field to determine if it is because of insufficient funds in a prepaid subscriber's device. If so, an invalid message is returned to the originating device in stage 845. The invalid message may include the reason for the invalid message. Following an invalid message to the originating device in stage 845, at stage 875, further processing of the message is halted, so that the message is not delivered to the recipient. In the exemplary embodiment of the invention, resources are not expended translating the message to the common format if the message is not going to be transmitted across the network transport bus to the destination device.

If insufficient funds are not the reason for the Invalid reply, at stage 835 the ARC examines the reason field to determine if it is because of a blacklist associated with the destination device. If so, an invalid message is returned to the originating device in stage 845. The invalid message may include the reason for the invalid message. Following an invalid message to the originating device in stage 845, at stage 875, further processing of the message is halted, so that the message is not delivered to the recipient.

If blacklisting is not the reason for the Invalid reply, at stage 840 the ARC examines the reason field to determine if it is because of an insufficient COS associated with the device. If so, an invalid message is returned to the originating device in stage 845. The invalid message may include the reason for the invalid message. Following an invalid message to the originating device in stage 845, at stage 875, further processing of the message is halted, so that the message is not delivered to the recipient.

If none of these is the reasons for the Invalid reply, at stage 875, the message is not sent, and, typically an invalid message is sent to the originating device.

If a valid reply is received in the routing response, e.g., "Routing_Validation_Response.Valid.", at stage 850 the reply is examined to see whether a password has been transmitted in the reply. If a password has been submitted in the reply, this is an indication that the destination device is password protected and the originator needs to supply a password to send the message. Optionally, the originating device may include a password in the original message which would obviate the need for stages 855-860. Typically the originating device will not have supplied a password. Therefore, at stage 855, a password request is sent to the messaging entity requesting a password. At stages 860 and 865, the password is received and compared to the password supplied by the routing reply. If the passwords do not match, at stages 870 and 875 an invalid password message is returned to the originating device and the message is not delivered. Optionally, exemplary embodiments consistent with the present invention may provide for multiple attempts to provide a correct password.

Figure 9:
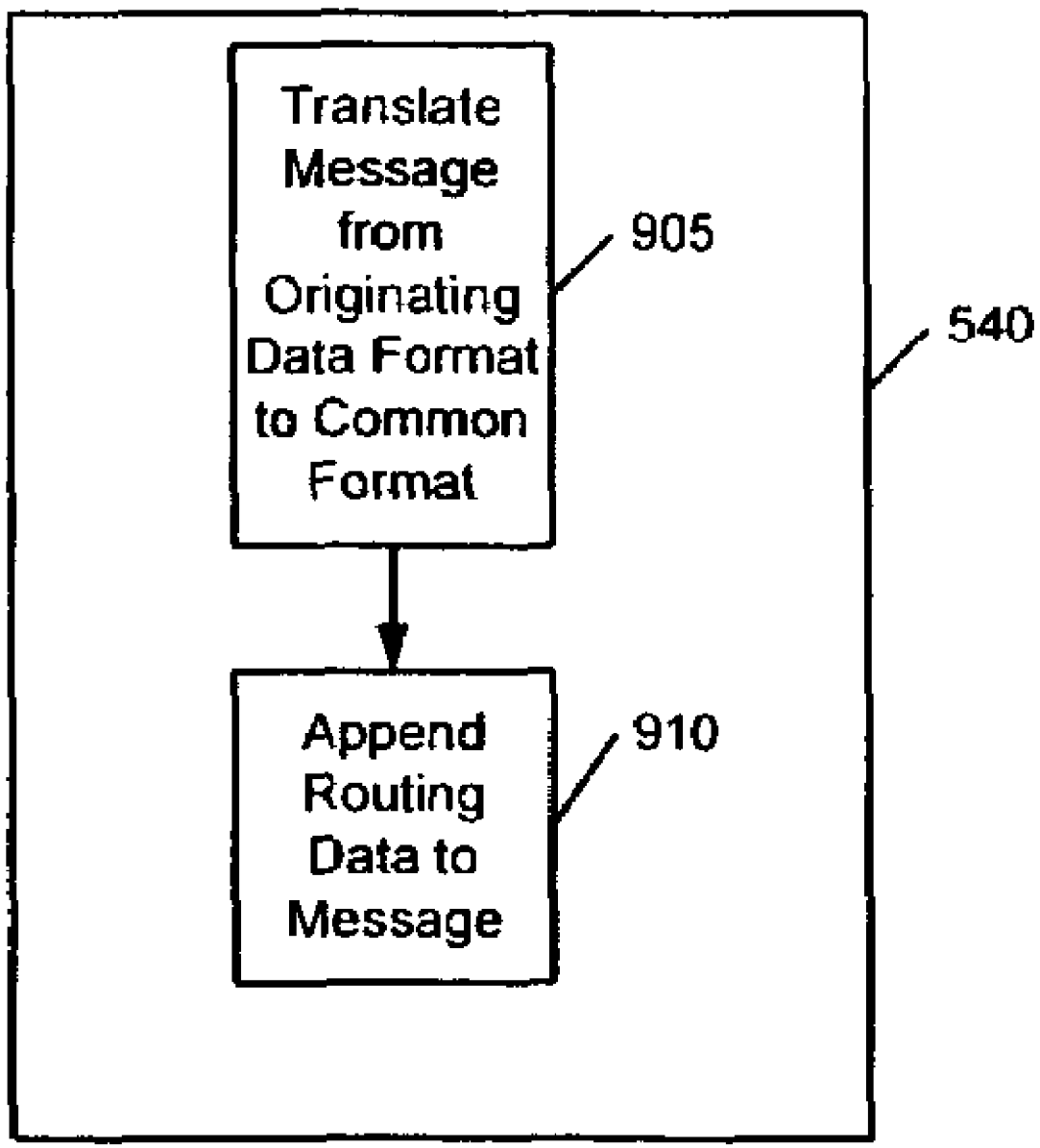
FIG. 9 illustrates a flowchart of the operation of the translation stage of an ARC in an exemplary embodiment consistent with the present invention.

Assuming a valid response and a valid password, if required, processing continues at stage 540 where the message is translated into the common format. FIG. 9 illustrates a flowchart of the operation of the translation stage 540 of an ARC in an exemplary embodiment consistent with the present invention. At stage 905, the message is translated from its original message format to the common message format utilized on the network transport bus. At stage 910 routing information gathered from the routing reply is utilized to append a header to the message in the common format. The header of the common message may be in one of the following formats:

"Deliver_Message.ARCn.DEVICE_TYPE.DESTINATION_ADDRESS.TRANSACTION_IDENTIFICATION" or "Deliver_Store_Message.ARCn.DEVICE_TYPE.DESTINATION_ADDRESS.TRANSACTION_IDENTIFICATION", where:

ARCn is the address of the ARC associated with the destination device. This information may or may not be in the routing reply information. If the information is in the routing reply information, then the appropriate ARC address is in this field. Otherwise, this field will contain ARC*, and each ARC will have to examine this message and internally decide whether the Device Type or Destination Address is associated with the respective recipient ARC;

Device_Type is the type of destination device. Examples include GSM, TDMA, Mobitex, FAX, etc.;

Destination Address is the destination address for the destination device;

A Deliver_Message subject is used if the message does not need to be stored in the DART. A Deliver_Store_Message subject is used if the message is to be stored in the DART.

Once the message had been published onto the network transport bus, the operations of the ARC are essentially complete. Additional exemplary embodiments of the invention may provide for feedback to originating ARCs relating to the delivered status of messages.

Figure 10:
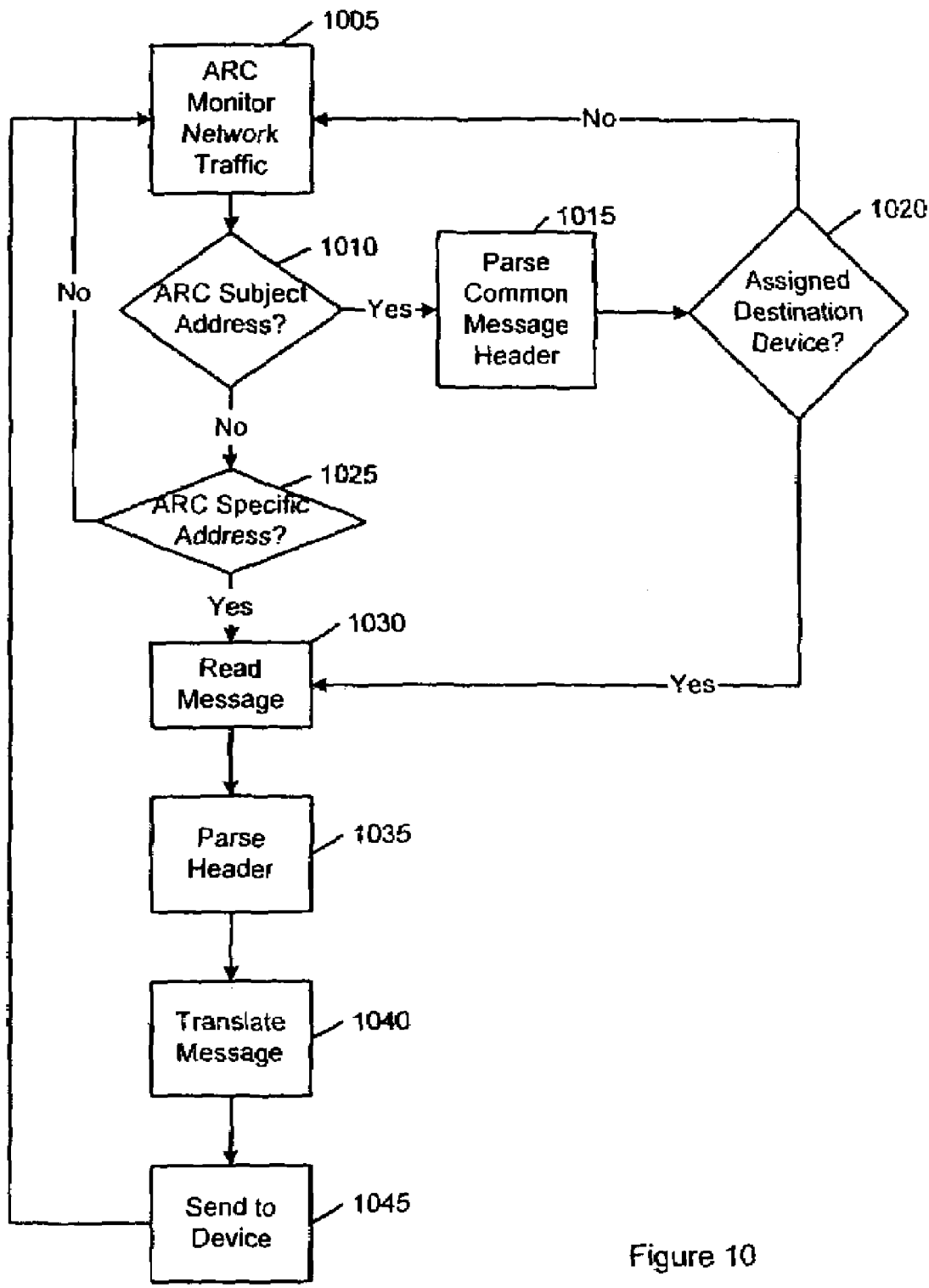
FIG. 10 illustrates a flowchart of the operation of an ARC functioning to transmit a message from the network transport bus in an exemplary embodiment consistent with the present invention.

While the previous FIGS. 5-9 illustrated the flowchart of the operation of an ARC functioning to receive a message from a messaging element in an exemplary embodiment consistent with the present invention, ARCs also function to receive messages from the network transport bus for transmission to destination devices. FIG. 10 illustrates a flowchart of the operation of an ARC functioning to transmit a message from the network transport bus in an exemplary embodiment consistent with the present invention.

At stage 1005, the monitor daemon in the ARC monitors traffic on the network transport bus. At stage 1010, the daemon examines the header of a message on the network transport bus to determine if the subject address is related to delivery of a message. Typically, it is searching for "Deliver_Message.ARCn.DEVICE_TYPE.DESTINATION_ADDRESS" or "Deliver_Store_Message.ARCn.DEVICE_TYPE.DESTINATION_ADDRESS". If a delivery related message is found at stage 1010 and the ARCn field is left as "ARC*", at stage 1015 the ARC will parse the common message header to pull out the Device_Type and Destination_Address entries. At stage 1020, if either of these entries has a value assigned to the ARC, processing proceeds to stage 1030.

At stage 1025, if the subject address is not related to delivery of a message and the ARC is not specifically addressed, e.g. ARC1., then the daemon continues to monitor network traffic at stage 1005. Otherwise, flow proceeds to stage 1030.

At stage 1030, the contents of the message in the common format are read from the network transport bus. At stage 1035, the header of the message is parsed to determine the destination address. At stage 1040, the message is translated by the ARC from the common format to the messaging format of the messaging entity, and at stage 1045, the message is sent to the destination device via the messaging entity.

Routing and Validation Entity Operation

Figure 11:
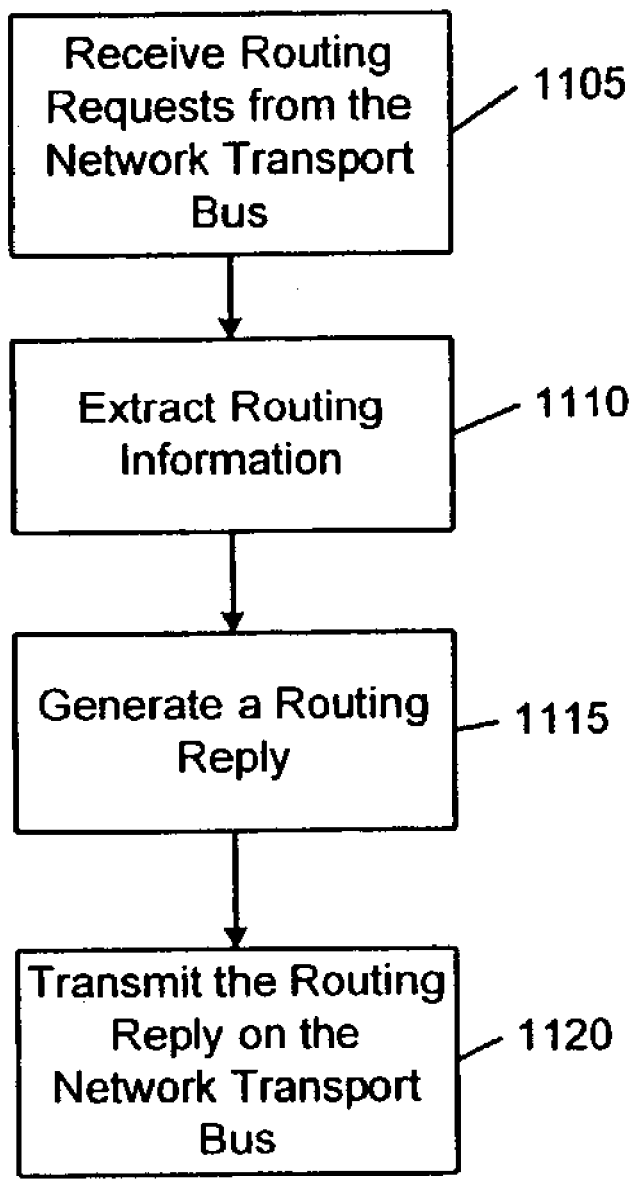
FIG. 11 illustrates a flowchart of the operation of a RAVE for routing messages in an exemplary embodiment consistent with the present invention.

Having completed a detailed explanation of the operation of an ARC, a detailed explanation of the operation of the RAVE will now be undertaken. FIG. 11 illustrates a flowchart of the operation of a RAVE for routing messages in an exemplary embodiment consistent with the present invention. At stage 1105, the RAVE receives a routing request from the network transport bus. At stage 1110, the RAVE extracts routing information relating to the routing request. At stage 1115, the RAVE generates a routing reply comprising the routing information. At stage 1120, the RAVE transmits the routing reply back onto the network transport bus.

Figure 12:
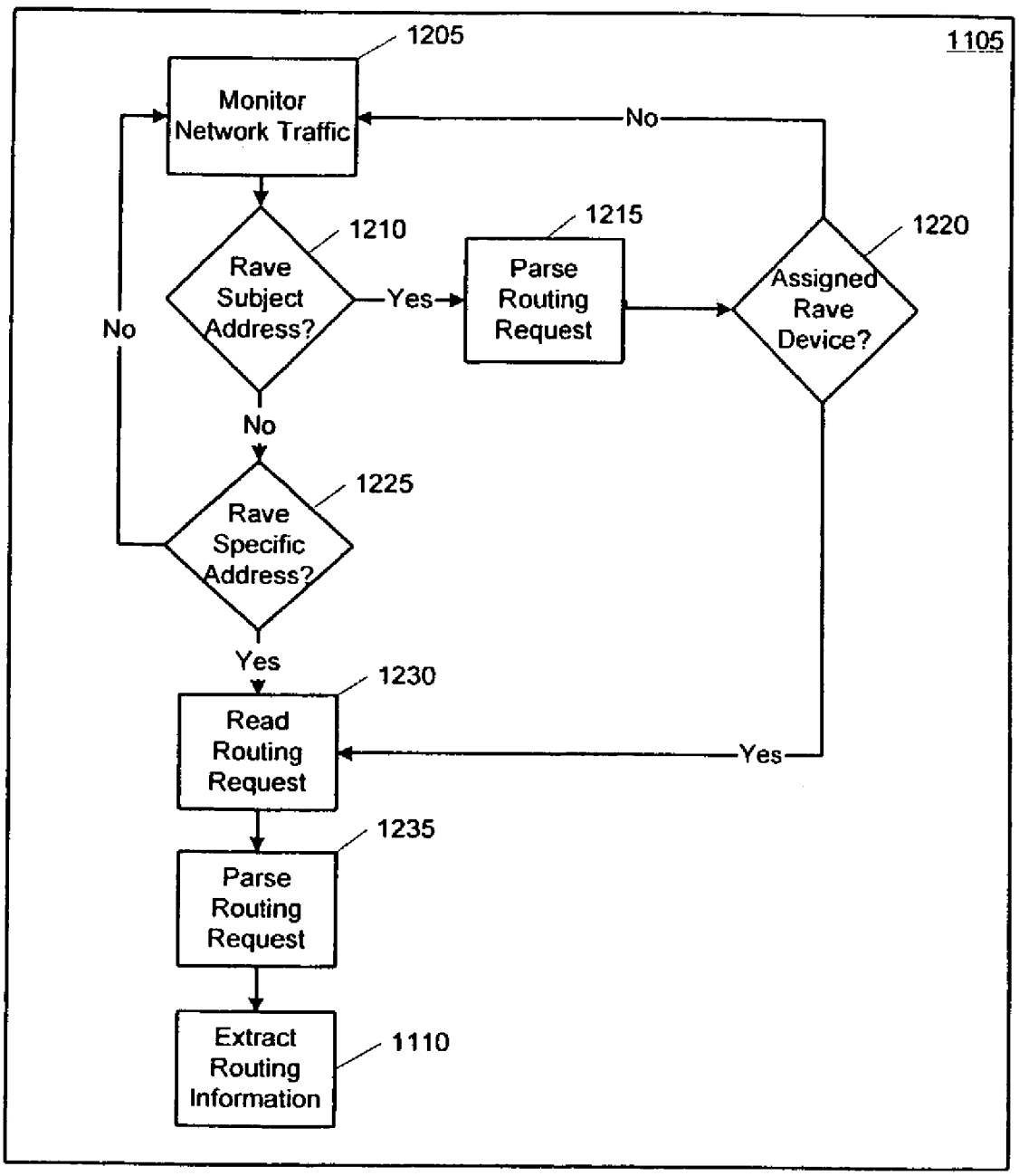
FIG. 12 illustrates a flowchart of the operation of the routing request receipt stage of a RAVE in an exemplary embodiment consistent with the present invention.

FIG. 12 illustrates a flowchart of the operation of the routing request receipt stage 1105 of a RAVE in an exemplary embodiment consistent with the present invention. At stage 1205, a daemon on the RAVE monitors network traffic on the network transport bus. At stage 1210, the daemon examines the header of a message on the network transport bus to determine if the subject address is a routing request. Typically, it is searching for "Routing_Validation.RAVE_ADDRESS.ORIGINATING_ARC_ADDRESS. TRANSACTION_ID.ORIGINATING_DEVICE_ADDRESS.DESTINATION_DEVICE_ADDRESS"

where:

RAVE_ADDRESS is the address of the destination RAVE for the request. Typically, the ARC will not address the routing request to a particular RAVE, so this field will typically be "RAVE*", meaning any RAVE;

ORIGINATING_ARC_ADDRESS is the address of the ARC originating the routing request, e.g., ARC1, ARC2, etc.;

TRANSACTION_ID is the assigned transaction identification of the message;

ORIGINATING_DEVICE_ADDRESS is the address of the originating device gathered from parsing the header information; and DESTINATION_DEVICE_ADDRESS is the address of the destination device gathered from parsing the header information.

If a Routing_Validation message is found at stage 1210 and the RAVE_ADDRESS field is left as "RAVE*", at stage 1215 the RAVE will parse the common message header to pull out the Destination_Device_Address entry. At stage 1220, if the entry has a value assigned to the RAVE, processing proceeds to stage 1230.

At stage 1225, if the subject address is not a Routing_Validation and the RAVE is not specifically addressed, e.g. RAVE1., then the daemon continues to monitor network traffic at stage 1005. Otherwise, flow proceeds to stage 1230.

At stage 1230, the Routing_Validation message is read, and at stage 1235 the Routing_Validation message is parsed to pull out the originating device address and the destination device address. At stage 1110, routing information is extracted from the RVDB.

Figure 13:
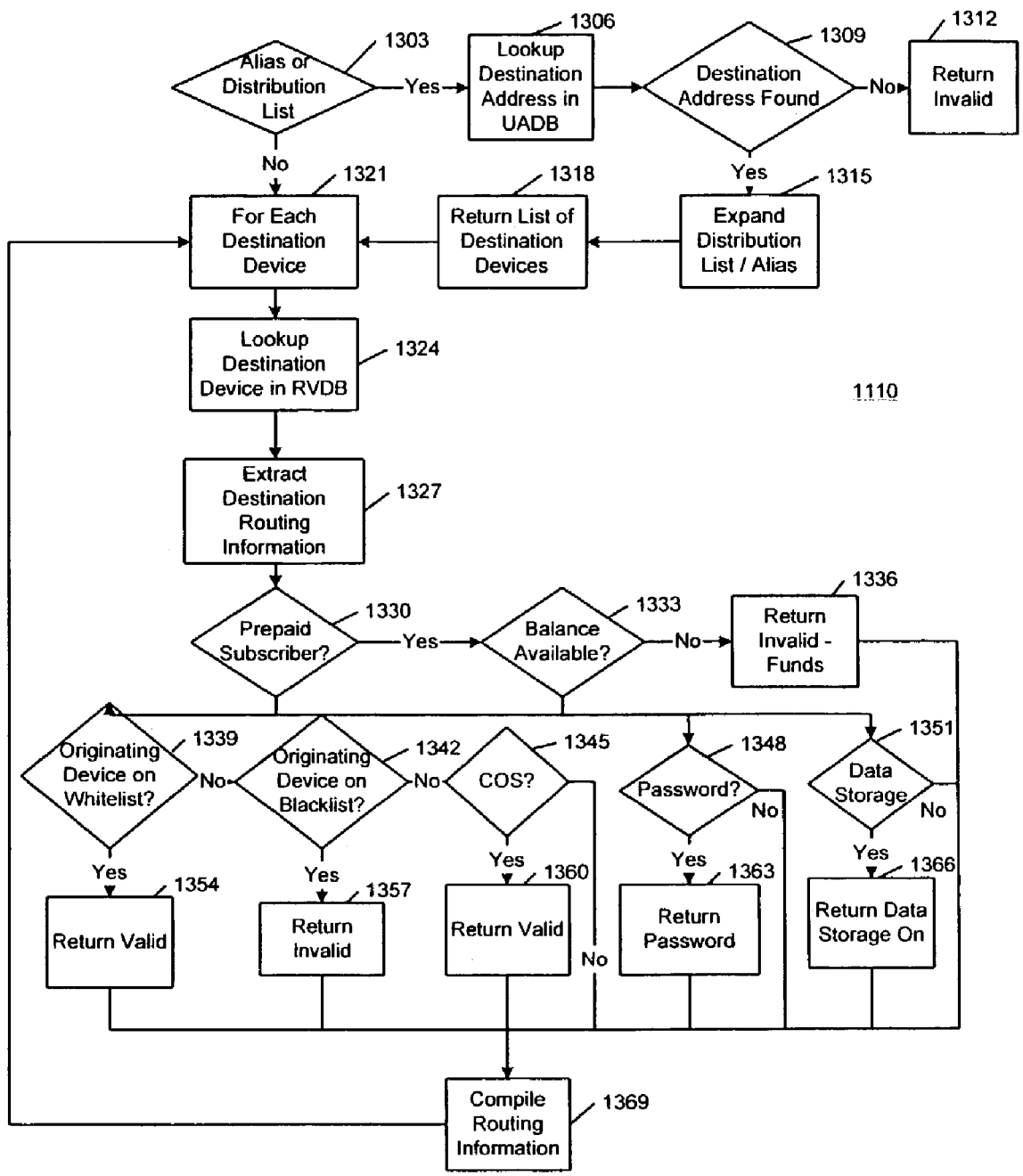
FIG. 13 illustrates a flowchart of the operation of the extraction of routing information stage of a RAVE in an exemplary embodiment consistent with the present invention.

FIG. 13 illustrates a flowchart of the operation of the extraction of routing information stage 1110 of a RAVE in an exemplary embodiment consistent with the present invention. At stage 1303, the RAVE examines the destination device address entry to determine whether it is an alias or a distribution list. If the destination device address entry is an alias or a distribution list, at stage 1306 the RAVE looks up the entry in the UADB. At stage 1309, if the entry is not found in the UADB, an Invalid response is returned in the routing response at stage 1312. But, if the entry is found in the UADB, at stage 1315 the destination devices are expanded from the entry in the UADB, and the list of one or more destination devices is returned at stage 1318.

At stage 1321, for each of the one or more destination devices, process stages 1324-1369 are executed. If more than one device is present, this will yield a string of routing information with a header portion for each of the destination devices.

At stage 1324, the destination device is looked up in the RVDB. At stage 1327, routing information is extracted from the RVDB for the destination device. The routing information comprises at least a device address. The routing information may further comprise: a device type, an ARC address associated with the device address, prepaid subscriber flag, whitelist data, blacklist data, COS data, password data, and a data storage flag.

At stage 1330, if the origination device and/or the destination device is related to a prepaid subscriber, stage 1333 looks up balance information to determine if there is an available balance. If the balance is not available, at stage 1336, an Invalid reply is returned for the associated destination device.

If the balance is available, the RAVE may debit the origination device and/or destination devices account.

If the origination and/or destination device is not associated with a prepaid subscriber, or associated with a prepaid subscriber with a sufficient balance, processing proceeds in parallel to stages 1339, 1348, and 1351.

At stage 1339, the ARC checks whether the originating address is on a whitelist for the destination device. If so, a Valid response is generated and processing continues at stage 1369. If not, at stage 1342 the ARC checks whether the originating address is on a blacklist for the destination device. If so, an Invalid response is generated and processing continues at stage 1369. If not, at stage 1345 the ARC checks whether the originating address or destination address meets the COS requirements. If so, a Valid response is generated and processing continues at stage 1369.

At stage 1348, the process checks whether a password is required for the destination device. If so, at stage 1363 a Password is returned and processing proceeds to stage 1369.

At stage 1351, the process checks whether a data storage flag is turned on for the destination device. If so, at stage 1365 a data storage flag is returned and processing proceeds to stage 1369.

At stage 1369, the various returned routing information is compiled for all destination devices associated with the message. This is used to generated the routing reply of stage 1115 (FIG. 11). A routing reply header typically will look like this for each destination device in the header:

"Routing_Validation_Response.VALIDITY.REASON.DEVICE_TYPE.DEVICE_ADDRESS. ARCn.PASSWORD.DATASTORE.TRANSACTION_ID", where VALIDITY generally returns either Valid or Invalid;

REASON may return the reason for an Invalid response;

DEVICE_TYPE may return the type of device;

DEVICE_ADDRESS returns the specific device address for the destination device;

ARCn may return the address of the ARC responsible for the device;

PASSWORD may return a password if one is required to send a message to the destination device; and DATASTORE may return a flag if data storage should take place for the message.

Data Storage and Routing Terminal

In an exemplary embodiment consistent with the present invention, DARTS 145*a-b* may be active network elements that supply business logic for storing, updating, and querying current message objects from MDS 150*a-c*. DARTS 145*a-b*, for example, can provide an interface between MDS 150*a-c*, and other elements of the wireless architecture that produce and query the data stored in MDS 150*a-c*. In the example of FIG. 1, DARTS 145*a-b* may support interface requirements to MDS 150*a-c*. For example, DARTS 145*a-b* may implement load balancing between MDS 150*a-c*. In this manner, one or more of the DARTs, such as DART1 145*a*, may perform a load balancing function for the data stored in one or more message data stores such as MDS 150*a*.

One or more of the DARTs, such as DART1 145*a*, may provide routing to one or more of the message data stores such as MDS 150*a*. In this manner, DART1 145*a*, for example, may route messages or other information to one or more of the message data stores such as MDS 150*a*. In one exemplary embodiment, DARTS 145*a-b* perform routing functions which direct particular messages to a particular message data store such as MDS 150*b*.

One or more of the DARTs such as DART1 145*a*, may store messages in a message data store such as MDS 150*c*, on a per device basis. For example, all of the messages that are associated with a particular device may be stored in a single message data store, such as MDS 150*b*. In this example, DART1 145*a* may be able to detect a device type associated with a particular message and route that message to a predefined message data store. Device types may be defined as general packet radio service (GPRS), Global System for Mobile Communication (GSM) or MOBITEX. In a further embodiment of the present invention, a single DART, such as DART1 145*a*, may be adapted to handle a certain type of message for a particular device. In this manner, DART1 145*a* may handle all MOBITEX messages. DART1 145*a* may then be tasked with routing all MOBITEX messages to a particular message data store. In an alternate embodiment of the present invention, multiple DARTs may handle multiple device types. For example, each DART in the system depicted in FIG. 1 may be capable of handling messages for numerous different device types.

DARTS 145*a-b* may be capable of handling fragmented message segments. For example, in a short messaging service (SMS) format, messages may be segmented into different parts of standard lengths. One embodiment of the DART may be capable of handling message segments so as to preserve the integrity of a message made up of message segments. For example, DART 145*a* may be capable of receiving numerous message segments of a single message and directing those message segments to a single message data store such as MDS 150*b*.

DARTS 145*a-b* may be capable of routing information including the originating and terminating addresses of a particular message. In a further embodiment of the present invention, DARTS 145*a-b* may be able to handle and direct class of service (COS) data as well as context identification data on a per transaction basis. In general, DARTS 145*a-b* may be capable of handling numerous data and information structures associated with a particular message. For example, DART 145*a* may be able to parse out a message header.

DARTS 145*a-b* may be capable of querying messages and determining the current status of a message. These query and status functions may be performed on a per device basis. For example, a DART, such as DART1 145*a*, may be able to access a message data store, such as MDS 150*b*, to determine the number of messages stored therein for a particular device type. Additionally, DART1 145*a* may be capable of determining the current status of messages stored in a message data store.

One or more DARTs, such as DART 145*b*, may provide support for multiple database elements such as UADB 140, RVDB 135, and MDS 150*a-c*, as well as other internal or external databases. In an exemplary embodiment of the present invention, DARTs, such as DART 145*b*, may support call level interfaces such as open database connectivity (ODBC) or JAVA database connectivity (JDBC), database middle ware, light weight directory access protocol (LDAP) interfaces, multiplexing database requests, JAVA messaging service and JAVA naming directory information, database connection pooling, database adaptors, and format and application protocol of a database gateway. Alternate embodiments of the DART of the present invention may be able to support any one or more of these protocols and applications as well as numerous others known to those skilled in the art.

The DARTs, such as DART 145*a*, may provide the ability to send transactions as a remote request in which one sequential query language request is sent to one database. In other embodiments, a DART, such as DART 145*b*, may be able to send transactions as a remote unit of work in which many sequential query language requests are sent to one database or as a distributive request in which many sequential query language requests are sent to many databases. In this manner, one or more DARTs, for example, may be capable of querying one or more databases, such as RVDB 135, UADB 140, and MDS 150*c*.

DART2 145*b*, may be capable of publishing messages to other network elements such as, for example, RAVEs, ARCs, and other DARTs. This message transfer may be accomplished via a publish and subscribe process. Additionally, in another embodiment of the present invention, the transfer of messages may be accomplished via a synchronous or an asynchronous transaction process.

DART1 145*a* may be capable of parsing a message so that only header information without message text can be sent to a wireless subscriber. DART1 145*a* may also be capable of responding with specific header information, message identification information, message size or length, date stamps, and message statuses. In this manner, DART 145*a* may be able to parse out various segments of a message and send any number of those segments to a wireless subscriber.

In a further aspect of the present invention, segmented messages can be linked together into a single transaction. For example, if a message exceeds the standard length, it would then take up more than one segment. DART 145*b* of the present invention contemplates treating the segmented pieces of a single message as a single transaction. In a further embodiment of the present invention, data can be parsed out of the message to convert it into different protocols.

DART 145*b* may provide various storage management functions. For example, DART 145*b* may provide the capability of throttling the number of messages for a single wireless subscriber. In addition, DART 145*b* may be capable of tracking the number and size of messages a single wireless subscriber stores in a message data store such as MDS 150*a*. DART2 145*b* may be capable of notifying a wireless subscriber of the number of messages stored in a message data store. In another embodiment of the present invention, a wireless subscriber may be allotted a certain limited amount of storage in a message data store such as MDS 150*a*. In this manner, a wireless subscriber, for example, may be given one megabyte of data storage capability on a message data store. If the wireless subscriber exceeds the one megabyte storage limit, then DART2 145*b* may be capable of sending the wireless subscriber a message indicating such.

DART2 145*b* may be capable of notifying a wireless subscriber that his message storage limit is about to be reached. These notification messages may be delivered through any convenient medium to the wireless subscriber. For example, the wireless subscriber may receive such a message on his pager. A further aspect of the current invention provides for storage thresholds that are dynamically modifiable. In this example, a wireless subscriber may be allocated an initial storage capacity, for example two megabytes, and then be able to increase that capacity later upon the occurrence of a certain event.

The DARTs, such as DART1 145*a* may be capable of supporting data replication. Further, DART 145*a* may be capable of supporting method replication. For example, business logic may be replicated among various DARTs and may be thus modifiable throughout all DARTs.

DARTs, such as DART2 145*b*, may be capable of allowing a user to remotely delete e-mail from a wireless device. In this manner, a wireless subscriber may be able to access his wireless device and be able to delete, for example, an e-mail message. DART 145*a* may then be able to synchronize this deletion to a mail server so that the e-mail is also deleted from the mail server. In other words, a single delete command from a wireless device could operate to erase, for example, an e-mail message from both a database and an e-mail server. In the exemplary embodiment of FIG. 1, DART1 145*a* may receive a delete command from a wireless subscriber. In this example, DART1 145*a* may then be able to delete the particular e-mail message from MDS 150*a* as well as from an IMAP/POP server 156. In this manner, DART 145*a* may be capable of a synchronized delete function.

Figure 14:
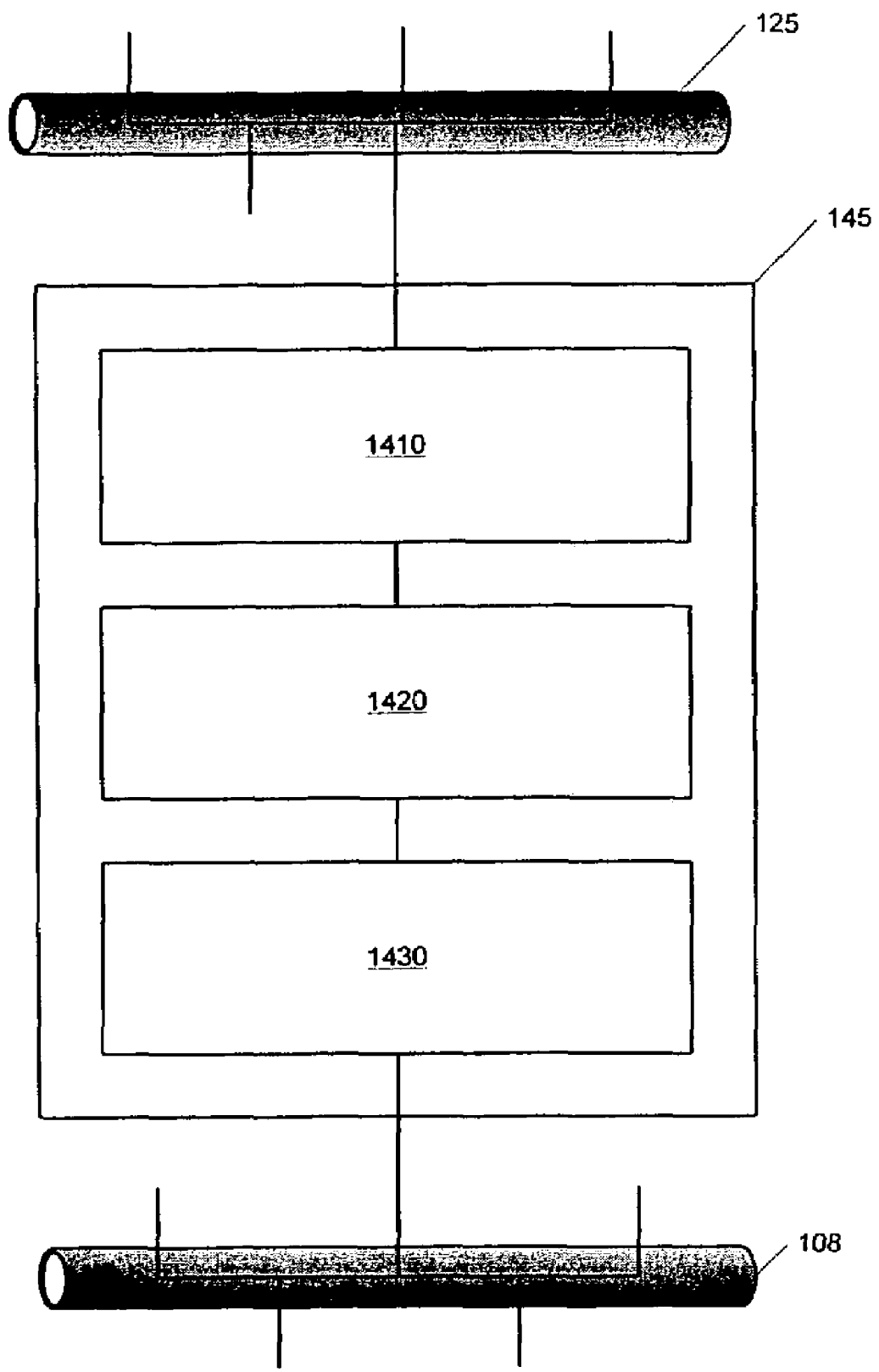
FIG. 14 illustrates a diagram of a Data Storage and Routing Terminal in an exemplary embodiment consistent with the present invention.

FIG. 14 illustrates a diagram of a Data Storage and Routing Terminal 145 in an exemplary embodiment consistent with the present invention. The DART 145 comprises a network transport bus interface 1410 coupled to a processor 1420 coupled to a backbone datastore transport bus interface 1430.

The network transport bus interface 1410 couples the processor 1420 to the network transport bus 125. The network transport bus interface 1410 monitors traffic along the network transport bus 125 for messages directed to the DART 145 and places messages on the network transport bus 125 from the processor 1420.

The processor performs the operations described throughout this portion of the specification and interfaces to the backbone datastore transport bus 108 through the backbone datastore transport bus interface 1430. Through this interface and bus, the DART communicates with the message data store entities, MDS.

The message data store entities, such as MDS 150*a*, may be capable of storing e-mail messages with or without attachments, text messages including, for example, short messages, instant messages, and MOBITEX messages, enhanced messages including, for example, ETSI messages, ENS messages, and NOKIA smart messages, multimedia messages including, for example, text, fax, icons, logos, animations, music, photos, media clips, or any combination of the above.

The MDS may be able to store data in a MIME or XML format. Messages may also be popped up to an external e-mail server. In this manner, a message stored at the direction of a DART, such as DART1 145*a*, in a database, such as MDS 150*a*, in MIME format could be transmitted to an external device through ARC translation. Additionally, messages can be stored, for example, in a linked list format.

MDS elements 150*a*, 150*b*, and 150*c*, may be capable of storing messages in any convenient data format. This message storage may be capable of supporting any number of various communications protocols. In addition to MIME format, numerous other data storage formats known to those skilled in the art may be used consistently with the principles of the present invention. In addition, data may be stored in MDS 150*a-c*, on a per transaction basis to decrease the storage requirements for multiple devices or destinations.

MDS can be scaleable. For example, MDS 150*a* may be expandable beyond an initial data storage capability. Further, new MDSs (not shown) may be added to the backbone data store transport 105 to provide additional storage capability. In this manner, not only are individual MDSs, such as MDS 150*a*, scaleable but so too is the storage capacity across all MDS in the entire network.

MDS 150*a*, 150*b*, and 150*c* may provide security features. For example, data may be stored in MDS 150*a*, 150*b*, and 150*c* in any convenient encrypted format. Other exemplary embodiments of MDS 150*b*, for example, may provide for redundancy to ensure no loss of data. Further, MDS 150*b* may be configured to ensure no duplication of records or data.

MDS elements 150*a*, 150*b*, and 150*c* may support both long term and transient storage. In this manner, MDS 150*b* may contain cache memory or any other sort of transient storage medium. Further, MDS 150*b* may support distributed storage and may provide a storage area network architecture. Long term storage can occur, for example, on a magnetic medium or an optical medium. The database architecture of MDS 150*a-c*, may be based on, for example, a relational model or an object oriented model. Numerous database structures are known to those skilled in the art and are possible implementations of MDS 150*a-c*.

MDS 150*a-c* may provide security features. For example, data may be stored in MDS 150*a-c* in any convenient encrypted format. Other exemplary embodiments of MDS 150*a-c* may provide for redundancy to ensure no loss of data. Further, MDS 150*a-c* may be configured to ensure no duplication of records or data.

MDS elements 150*a-c* may support both long term and transient storage. In this manner, MDS 150*a* may contain cache memory or any other sort of transient storage medium. Further, MDS 150*a* may support distributed storage and may provide a storage area network architecture. Long term storage can occur, for example, on a magnetic medium or an optical medium. The database architecture of MDS 150*a-c* may be based on a relational model or an object oriented model. Numerous database structures are known to those skilled in the art and are possible implementations of MDS 150*a-c*.

In an exemplary embodiment consistent with the principles of the present invention, an MDS comprises three tables: a message store table, a message device status table and a transaction data segment table. In this example, the message store table, the message device status table and the transaction data segment table are each contained in a relational database. The relational database may be distributed over many different data storage entities and may be implemented in any convenient manner. For example, one skilled in the art would be able to implement the principles of the MDS on an Oracle database product.

In one embodiment, the message store table is a repository for message information. The message store table stores a transaction identifier associated with a message, a message class, a description of a the message, the number of segments in a multi-segment message, message priority, an originating address, a destination address, a class of service code, message status information, the date the message was submitted, a sequence number for the message, and a notification address for the message. The message store table has as its primary key a message identifier. This message identifier, in this example, is a unique string associated with a message.

In general, the message store table is configured to accept detailed information about a message transmitted across a messaging infrastructure 100. In this example, a unique transaction identifier is associated with each message. This transaction identifier may be in the form of a string of characters. The message class describes the type of message, such as a proprietary ring tone. For multi-segment SMS messages, the message store table stores the number of segments in the message. A message priority, in the form of a flag, may be associated with each message. In this manner, priorities can be associated with each message and delivery schemes can be established based on message priority. For example, a priority flag may accept as a priority "urgent." In such a case, a message with an associated priority flag set to "urgent" may receive preferential delivery treatment. The origination and destination addresses may be any form of address associated with a communications device. For example, these addresses could correspond to email addresses, IP domain names, cellular telephone numbers, fax machines, pagers, or any other type of communications device.

The MDS is capable of storing in a common format, such as MIME or XML, messages that are generated on or received by any communications device. The status information, in this example, tracks the status of a message. For example, the status information may indicate that a message was delivered. A notification address, contained in the exemplary embodiment of message store table receives an indication that a message was delivered.

The message device status table stores message and device information. In this example, the message device status table contains device type information, a routing identifier, device status, completion date, query attempts, retry attempts, the number of segments of a multi-segment message that were delivered successfully, and the number of segments of a multi-segment message that were not delivered successfully. The device type information, for example, includes the type of device and any relevant associated characteristics. The routing identifier, for example, may be a string that denotes a particular route to be traveled by a message. Device status information may include information about whether a particular device is turned on or is in use. Query attempts and retry attempts, in this example, refer to the number of query attempts made on a message and the number of attempts made at delivery, respectively. Likewise, the number of segments of a multi-segment message delivered successfully and unsuccessfully are stored so that multi-segment messages may be properly delivered. In this example, the message device status table has as its foreign key a message identifier. In this manner, the message device status table references message store table for message information.

The transaction data segment table stores information about segmented messages. In SMS messaging, the maximum length of a message segment is 160 characters. If an SMS message is longer than 160 characters, then it must be stored in more than one segment. Each segment may be transmitted separately over a network and then reassembled at a destination. In this example, the transaction data segment table stores information about the number of segments in a multi-segment message along with the data contained in each segment. The transaction data segment table has as its primary key a segment identifier and as its foreign key a transaction identifier. In this manner, the transaction data segment table references message store table for message information.

The message store table contains the body of a message in a common format. This message body, for example, could be the text of an email message or the coding of a ring tone converted into a common format. In one embodiment of the present invention, the message body is associated with multiple destination addresses without duplication of the message body. For example, an SMS message may have as its destination numerous devices. Instead of storing the SMS message text in a data structure associated with each of the destination addresses, the SMS message text may be stored a single time and associated with the multiple destination addresses in the message store table. In this manner, message text is stored only once and the associated information, such as destination addresses, can then be used to reference the message text.

Operation of the DART in Conjunction with the ARC & RAVE

Figure 15:
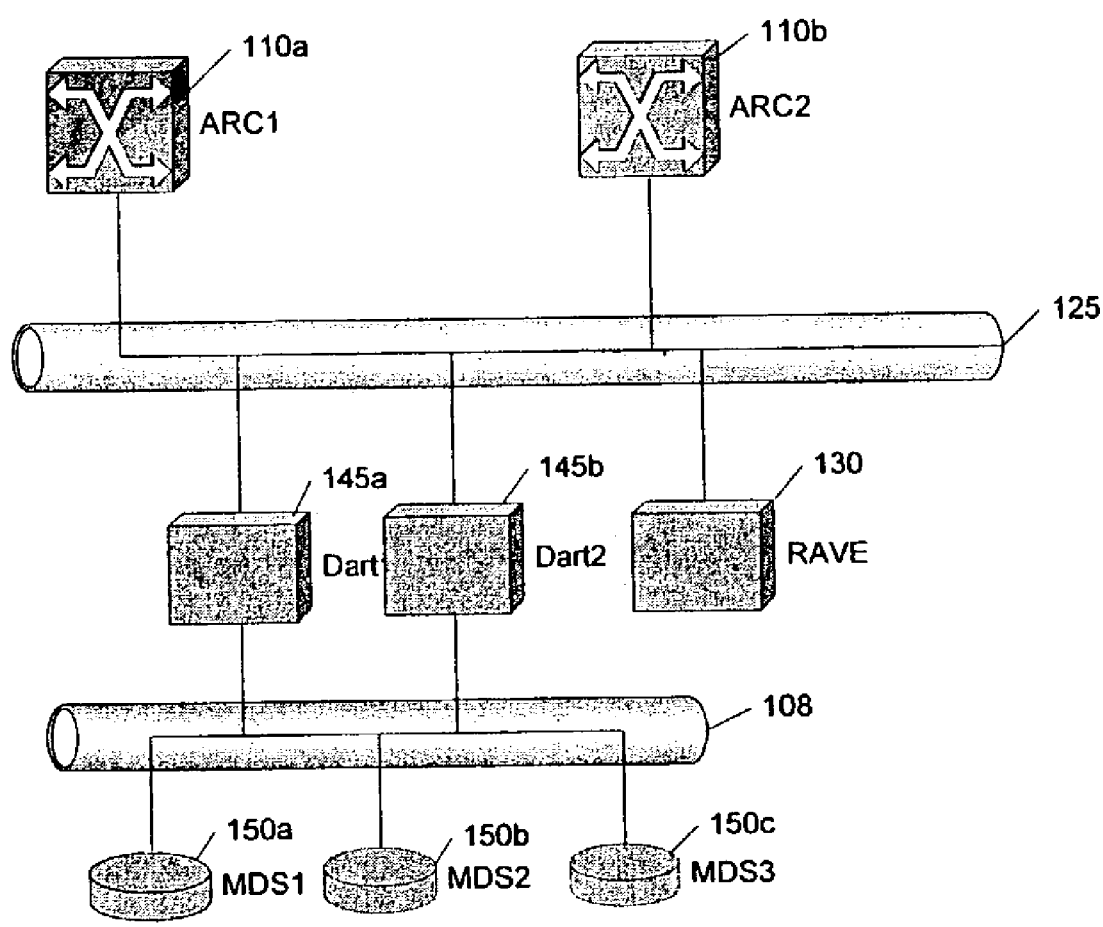
FIG. 15 illustrates a simplified view of the messaging infrastructure 100 illustrated in FIG. 1 in an exemplary embodiment consistent with the present invention.

FIG. 15 illustrates a simplified view of the messaging infrastructure 100 illustrated in FIG. 1 in an exemplary embodiment consistent with the present invention. DART 145b is interfaced with network transport bus 125 and backbone data store transport bus 108. Likewise, in this example, DART 145a interfaces with network transport bus 125 and backbone data transport bus 108. Network transport bus 125 interfaces with DART 145a, DART 145b, ARC1 110a ARC2 110b, and RAVE 130. Backbone data store transport bus 108 interfaces with DART1 145a, DART2 145b, MDS 150a, MDS 150b, and MDS 150c.

In operation, messages stored on an MDS 150a-c may flow from the MDS through backbone data store transport bus 108 to an applicable DART 145a or 145b to network transport bus 125, and then to an applicable ARC 110a or 110b. Likewise, messages may originate in an applicable ARC 110a or 110b and then flow to network transport bus 125, an applicable DART 145a or 145b, backbone data store transport bus 108, and an applicable MDS 150a, 150b, or 150c.

As discussed in previous portions of the detailed discussion, a data storage function may be enabled to trigger storage of messages in an MDS by a DART. An ARC may designate the address of a specific DART, such as DART1 145a by utilizing "Deliver_Store_Message.DART1". In this manner, a point to point communications protocol may be employed. Alternatively, a publish and subscribe protocol may be used in which case ARC 110a simply publishes the new message, for example, with a subject such as "Deliver_Store_Message.DART*" on network transport 125. Each DART may subscribe to "Deliver_Store_Message" messages.

In this publish and subscribe system, each ARC element and each DART connected to network transport 125 receives the new message. Likewise, in this example, the DART will make a storage decision based on, for example, the DEVICE_TYPE, DESTINATION_ADDRESS, or ORIGINATION_ADDRESS associated with the message. In this example, both ARC 110a and DART 145a have subscribed for these messages and both process the message. In this case, the message processing by DART 145a and ARC 110a occurs in parallel. DART 145*a* may then publish the message on backbone data store transport 108.

In this example, there may be many MDS elements listening for these published messages but only one is configured for the subscriber. MDS 150*b* stores the message at the direction of DART 145*a* as the DART 145*a* issues an "MDS_STORE.MDS2" on the Backbone DataStore Transport 108. DART 145*a* may also publish a "Confirm_Store" message along with the transaction ID for this message on network transport bus 106. ARC2 110*b* is listening for this message, and once it is received, ARC2 110*b* may transmit this confirmation status to the originator of the message.

In another example, a wireless subscriber may access a message that has already been sent to a destination and can, for example, resend, forward, query, or delete this message. In this example, a wireless subscriber sends a request to see the contents of his message mailbox. This request is sent via ARC2 110*b* to network transport 125. In this manner, ARC2 110*b* publishes the request on network transport 125. As noted, ARC2 110*b* may append the address of a specific DART to the published request in which case a point to point protocol is used. Alternatively, ARC2 110*b* may simply attach a subject such as "Read_Mailbox" to the published request, without a specific element identified, in which case a publish and subscribe protocol is used.

In this example, the DART associated with the particular subscriber or device processes the request. In this case, DART2 145*b* has subscribed to any query request and therefore receives the request from network transport 125. DART2 145*b* then republishes this request on backbone data store transport 108. While all of the MDS may be listening for these types of messages, only one MDS, in this case MDS3 150*c*, processes the query request. In this example, MDS3 150*c* receives this request because the wireless subscriber who sent this request has his information stored on MDS3 150*c*. Once again, DART2 145*b* may use a point to point protocol addressing the request specifically to MDS3 150*c*. Alternatively, DART2 145*b* may use a publish and subscribe protocol in which case the request is published on backbone data store transport 108 and each MDS listens for the request. Only the MDS associated with the subscriber, in this case MDS3 150*c*, processes the request. MDS3 150*c* then publishes the information about this wireless subscriber on backbone data store transport 108. In this example, DART2 145*b* receives the information about the wireless subscriber from backbone data transport 108. DART2 145*b* then publishes this information on network transport 125 with addressing specified for ARC2 110*b*, in a point to point protocol. Alternatively, DART2 145*b* may employ a publish and subscribe protocol. Since ARC2 110*b* has subscribed for this message, it receives the information about the wireless subscriber, performs any translation functions that may be necessary, and displays the results to the wireless subscriber. In this manner, information stored in MDS3 150*c* can be retrieved and forwarded to a wireless subscriber.

In another example of the operation of an exemplary embodiment of the present invention, a wireless subscriber may submit a request to cancel a message that is set for delivery. In this example, a wireless subscriber has received information about his current pending messages. The subscriber sees one message that is for delivery that he wishes to cancel so he sends a cancel message request. This cancel message request is sent from ARC2 110*b* over network transport bus 125. In this manner, ARC2 110*b* transforms the cancel message request into a request that is published on network transport 125. This published request, for example, can contain the transaction ID, the subscriber ID, and the device type. In this example, ARC1 110*a* has subscribed to any cancel message requests. ARC1 110*a* receives this cancel message request and converts it into the proper format for the remaining elements of the wireless network. Both ARC2 110*b* and DART1 145*a* are listening for this request. DART1 145*a* then publishes this request on backbone data store transport 108. Each MDS listens for these types of requests. In this example, MDS1 150*a* takes the request because MDS1 150*a* has this particular wireless subscriber's data stored in its data storage mechanism. After MDS1 150*a* receives the request, MDS1 150*a* returns the requested data and publishes it on the backbone data store transport 108. MDS1 150*a* may then delete the message. DART1 145*a*, listening for this requested information, receives the requested information and publishes it on network transport 125. ARC2 110*b*, since it subscribes to this requested data, receives the requested data, performs any translation functions, and returns it to the wireless subscriber.

In another example, a wireless subscriber may wish to access a message from an external IMAP/POP client. A wireless subscriber's user name and password may be used for validation. The RAVE entity may be responsible for validating the particular wireless subscriber. A wireless subscriber sends a request to retrieve external messages from an IMAP/POP mail server. This request is received by ARC2 110*b* which may perform translation functions. After any necessary translation functions, ARC2 110*b* publishes the request on network transport 125. This request, may be published in the form of an update message request.

In this example, DART1 145*a* subscribes to such update message requests., Therefore, DART1 145*a* receives this update message request. Upon receiving this update message request, in this example, DART1 145*a* publishes on network transport 125 a get subscriber mail information request. RAVE 130 is subscribed for a get subscriber mail information request message and receives this message. RAVE 130 searches applicable databases, such as RVDB 135 for appropriate wireless subscriber information. RAVE 130 then publishes this information on network transport 125. In this manner, RAVE 130 places on network transport 125 various information about a wireless subscriber, such as the wireless subscriber's user name, alias, preferences, and possible destination addresses.

DART1 145*a* subscribes to the information placed on network transport 125 by RAVE 130. DART1 145*a* receives this information and in response publishes a get external e-mail request on network transport 125. In this example, ARC2 110*b* is associated with an IMAP/POP server (not shown) and to that extent, ARC2 110*b* may perform various translation functions for the IMAP/POP server. ARC2 110*b* subscribes to get external e-mail requests and therefore receives this request and its accompanying information and forwards the request to an IMAP/POP server (not shown) which retrieves the information from an external storage device. This retrieved information, which for example could be an e-mail message, is received by ARC2 110*b* for any necessary translation. After ARC2 110*b* performs necessary translation functions on the external mail message, ARC2 110*b* publishes this email message on network transport 125.

In this example, DART2 145*b* subscribes to these external mail messages. DART2 145*b* receives the external message from network transport 125 and publishes the external mail message on backbone data store transport 108. All of the MDSs listen for external mail messages such as that placed on backbone data store transport 108 by DART2 145*b*. In this case, MDS2 150*b* contains information about the wireless subscriber and therefore receives the external mail message attributable to that wireless subscriber. MDS2 150b receives the external mail message from backbone data store transport 108. MDS2 150b, in this example, then updates its data storage with the external mail message that it received from backbone data store transport 108. The wireless system may be configured such that one DART subscribes to new message requests while another DART subscribes to update requests.

After MDS2 150b has received the last external e-mail message, DART2 145b may then publish on network transport 125 a sub-messages POP message which may also contain subscriber identification. ARC1 110a subscribes to receive this type of message which would contain the information about the external mail message. Accordingly, in this example, ARC1 110a receives this information and the accompanying external mail message, performs any translation that may be necessary, and then returns the external mail message to the wireless subscriber.

In another example, a class of service associated with a message may not allow the body of the message itself to be read. In such a case, ARC1 110a may return only a description of the message. For example, a wireless subscriber may request that a ring tone be forwarded from an external IMAP/POP server. In such a case, ARC2 110b receives this request and, through the previously described method, publishes a request on network transport 125. A field associated with this message may indicate that it is a proprietary ring tone. If this is the case, ARC1 110a after perhaps several intervening steps, may return to the wireless subscriber a message indicating that the proprietary ring tone may not be forwarded.

In yet another example, a DART entity may allow a wireless subscriber to POP a message through an external IMAP/POP client. A wireless subscriber may be able to download an external message description or the whole message itself based on an associated class of service code.

In this example, a wireless subscriber requests a description of all messages stored on an IMAP/POP server. ARC1 110a receives this request and transforms it into a publish request which is published on network transport 125. DART1 145a has subscribed to this publish request and receives the request from network transport 125. DART1 145a transforms this request into a query that is then published on backbone data store transport 108. In this case, MDS2 150b has subscribed for queries and receives the query from backbone data store transport 108. Upon receiving the query, MDS2 150b processes the request to return the subscriber's messages. For example, MDS2 150b may be able to receive a query from backbone data store transport 108 and, through associated functions, search its associated database or databases for contents relevant to the query.

In this example, MDS2 150b contains all messages associated with the wireless subscriber. MDS2 150b, after processing the query, returns the information to backbone data store transport 108. DART2 145b has subscribed to receive this information and receives it from backbone data store transport 108. DART2 145b may then forward this information to network transport 125. ARC1 110a associated with an IMAP/POP server, has subscribed to receive this information. After receiving the information, ARC1 110a transforms the information to POP responses and forwards them through the server to the IMAP/POP client of the wireless subscriber.

In yet another example of the operation of the communications system, a wireless subscriber may receive a value added message. In this example, a value added message service generates a new message for a subscriber. The value added message service may need confirmation of message delivery so that the wireless network provider can bill the wireless subscriber. As such, a short message peer to peer primitive with a registered delivery flag is sent to ARC1 110a. In this example, ARC1 110a extracts the destination address, origination address, and any additional information necessary, and then publishes a subscriber look-up on network transport 125. If any passwords are required for a destination or distribution list, then these can also be sent in a query published on network transport 125. In this example, RAVE 130 has subscribed for these subscriber look-up requests. RAVE 130 receives the look-up requests and performs an alias look-up and a validation request to connected routing and validation databases and user alias databases. This alias look-up and validation request may be performed using a publish and subscribe protocol or any other convenient protocol.

RAVE 130 then publishes the extracted list, the associated device types, any disallowed destinations, and any other pertinent information to the originating ARC, in this case ARC1 110a in the destination field. In this manner, RAVE 130 publishes this information on network transport 125 with its destination as ARC1 110a. In another aspect, RAVE 130 publishes this information on network transport 125 with a subject to which all ARCs subscribe. In this manner, RAVE 130 may use a publish and subscribe protocol to communicate with ARC1 110a and other ARC entities. ARC1 110a has subscribed for this information and receives the list, device type, disallowed destinations, and other information and proceeds to publish on network transport 125 the message data with the extracted destinations and associated device types. ARC1 110a may also return failed destinations to the originating value added message service.

In this example, DART1 145a and ARC2 110b have subscribed for this message. For example, a device type of SMSC associated with ARC2 110b may be included in the destination. ARC2 110b may then convert this message to an SNPP and perform any transformations required based on message type, device type, and SMSC type. DART1 145a, via backbone data store transport 108, may then publish this message to MDS1 150a for storage. MDS1 150a stores the message. MDS1 150a may return the confirmation of storage by publishing it on backbone data store transport 108. DART1 145a, by subscribing to confirmation messages, receives the confirmation and publishes it on network transport 125. ARC1 110a by subscribing to this type of confirmation message, receives the confirmation message from network transport 125. In this exemplary embodiment, a confirmation is then forwarded from message data store transport 116, via backbone data store transport 108, DART1 145a, and network transport 125, to ARC1 110a via a publish and subscribe protocol, point to point protocol, or any other convenient method.

The SMSC acknowledges receiving the SMPP message and returns an acknowledgement. In this example, ARC2 110b, associated with the SMSC, publishes this acknowledgement on network transport 125. DART2 145b listens for this acknowledgment and, based on the originating address, adds this acknowledgement to the stored transaction in MDS1 150a. This can occur, for example, by DART2 145b receiving from network transport 125 the acknowledgement and then publishing the acknowledgement on backbone data store transport 108. MDS1 150a, because it subscribes to the acknowledgment associated with this particular wireless subscriber, receives the acknowledgement and adds it to the stored transaction.

MDS1 150a may then return a completed transaction message by publishing it on backbone data store-transport 108. DART2 145b may then receive this completed transaction message and publish it on network transport 125. The completed transaction message may then be received by ARC2

110b associated with the SMSC. In this manner, the SMSC can receive confirmation of delivery and generate a receipt. This receipt may then proceed through ARC2 110b to network transport 125. In this manner, ARC2 110b, after performing any necessary translation functions, may publish the receipt on network transport 125. DART2 145b, in this example, has subscribed to receive the receipt published on network transport 125. DART2 145b, after receiving the receipt, publishes it on backbone data store 108. MDS1 150a, because it is associated with a particular wireless user, adds the receipt to the message transaction. In this manner, the status of the message can be updated in MDS1 150a.

Operation of the DART

Figure 16:
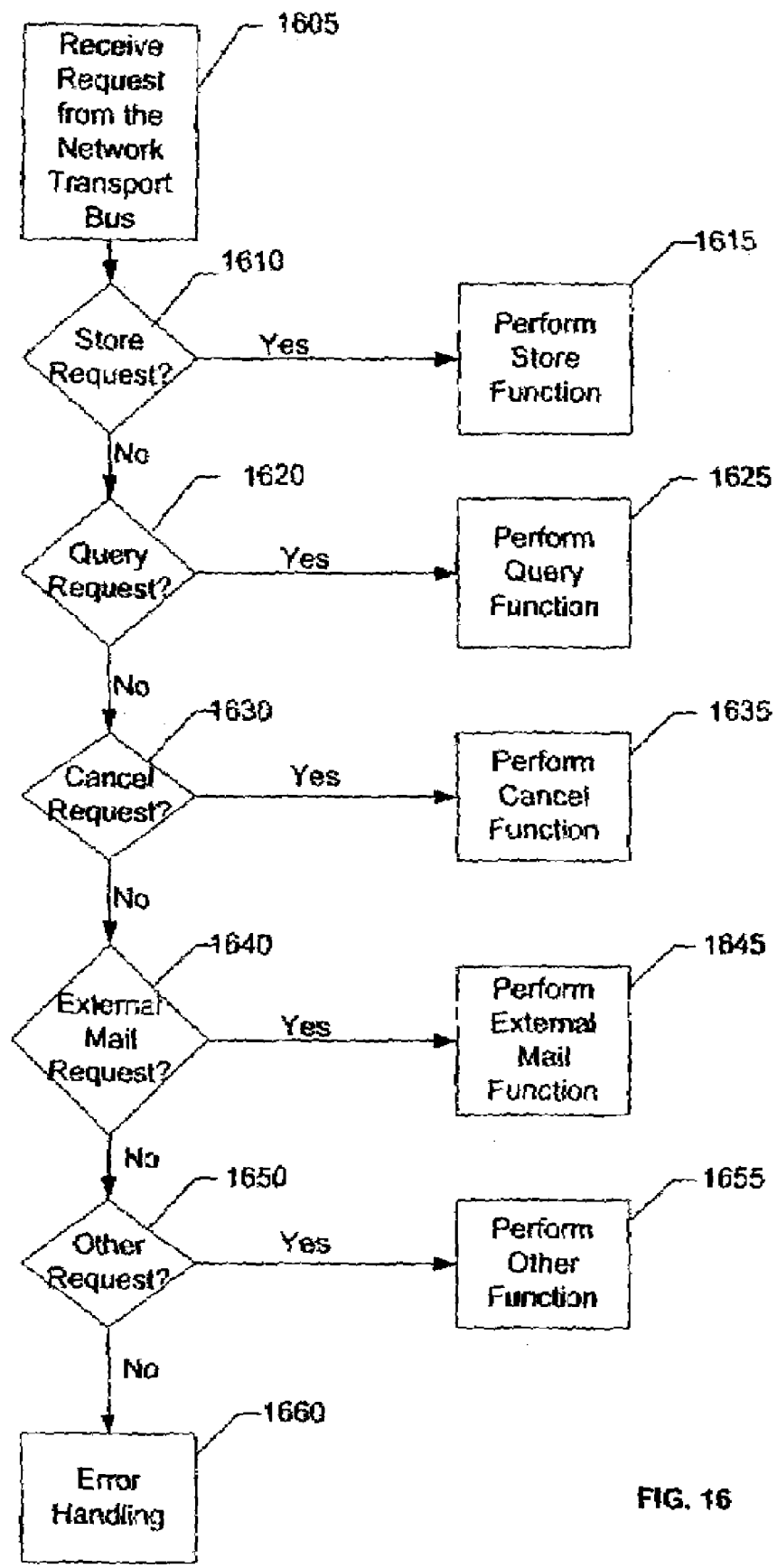
FIG. 16 illustrates a flow chart of the operation of a DART element in an exemplary embodiment consistent with the principles of the present invention.

FIG. 16 illustrates a flow chart of the operation of a DART element consistent with the principles of the present invention. In this embodiment, the DART element is capable of performing several different functions related to the storage and maintenance of messages.

At stage 1605, a DART element receives a request from the network transport bus. As discussed, this request may be specifically addressed to a particular DART in a point to point protocol or may contain a subject header in a publish and subscribe protocol. Upon receiving the request, the DART element then determines which function to execute. At stage 1610, the DART element determines whether the request is a store request. Typically, a string of characters in the request heading or the request itself denominates the type of request. For example, a request containing the string "DELIVER_STORE" indicates that the request is to deliver a message and to store it. In another example, the string "STORE" contained in a request indicates to a DART entity that the request is a store request.

If the DART entity determines that the request is a store request, then the DART entity performs a store function as indicated in stage 1615. If the request is not a store request, then the DART entity proceeds to stage 1620 to determine if the request is a query request. Like the store request, the DART entity examines the request, for example, for the string "QUERY." If the request is a query request, then the DART entity performs a query function as depicted in stage 1625. If not, the DART entity proceeds to stage 1630 to determine if the request is a cancel request. If it is, then the DART entity performs a cancel function as depicted in stage 1635. If not, the DART entity, as depicted in stage 1640, determines whether the request is an external mail request. If it is, then the DART entity performs an external mail function. If not, then the DART entity, as illustrated in stage 1650, determines if the request is any other type of request. If it is, then the DART entity performs the requested function. Otherwise, the DART entity performs an error handling function.

In this manner, the DART entity determines the type of request and performs the associated function. FIG. 16 is merely an example of a few different types of requests performed by the DART entity as many other functions are within the scope of the present invention. For example, the DART entity may perform specific lookup requests by accessing an associated MDS and returning specific data. Likewise, in error handling stage 1660, the DART entity may perform several different functions. For example, the DART entity may report the error to other network entities such as the LAMB.

Figure 17:
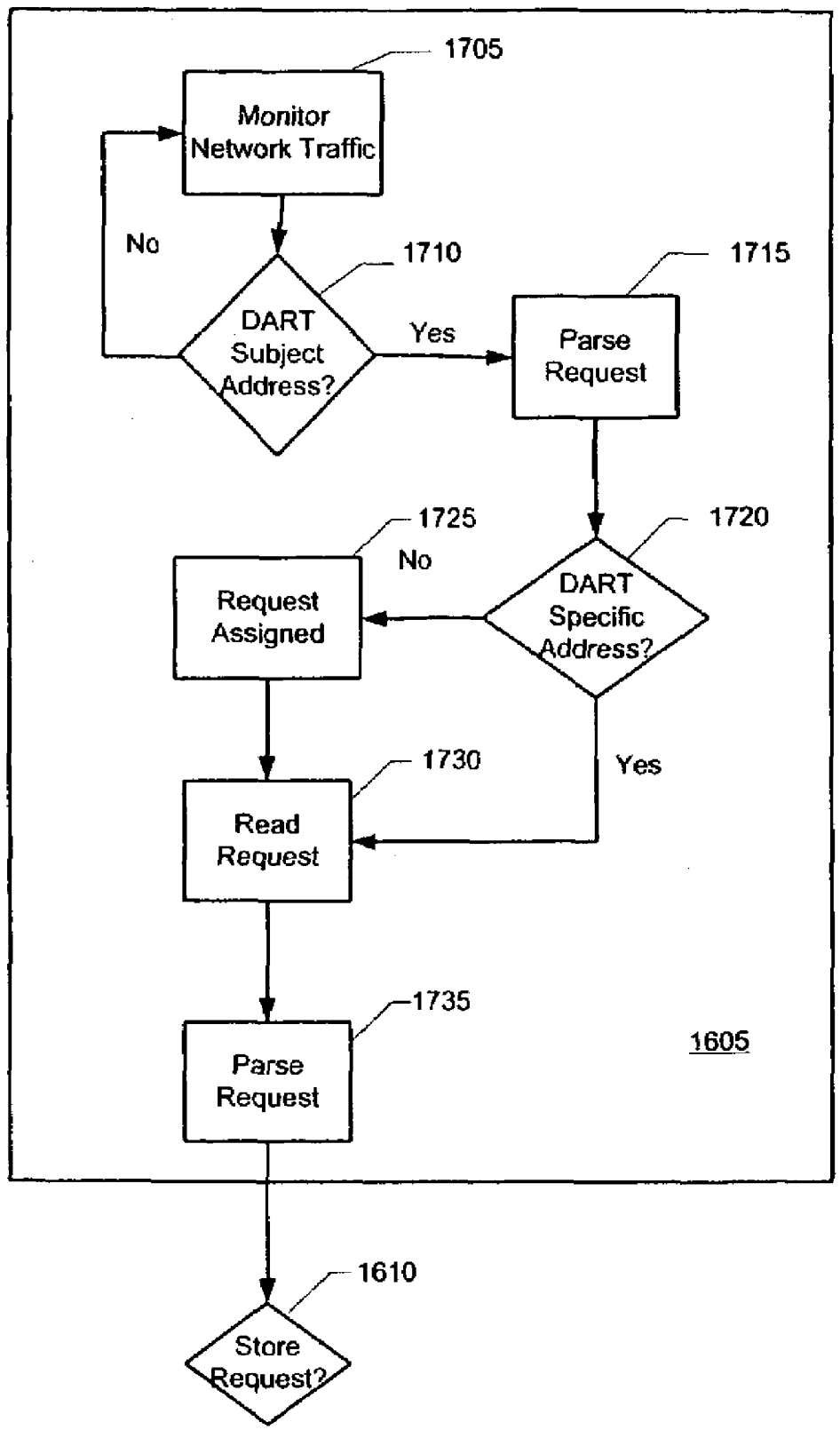
FIG. 17 illustrates the receipt of a request by a DART entity in an exemplary embodiment consistent with the principles of the present invention.

FIG. 17 illustrates the receipt of a request by a DART entity consistent with the principles of the present invention. In this fashion, FIG. 17 is an exemplary embodiment of stage 1605, receive request from network transport bus, of FIG. 16. At stage 1705, a monitor daemon in the DART monitors traffic on the network transport bus. At stage 1710, the daemon examines a header of a message on the network transport bus to determine if the subject heading is one that is for a DART. For example, the subject heading may contain the string, "STORE" which indicates that the request is a store request to be handled by a DART. If the subject address is not a DART subject address, then the DART daemon continues to monitor traffic on the network bus. If the subject address is a DART subject, then the DART parses the request as illustrated in stage 1715.

At stage 1720, the DART determines whether the request contains a DART specific address. For example, a request may contain a subject followed by a specific DART address such as ". . . STORE.DART1 . . . ." In this case, the specific DART address is "DART1" which indicates that the request is directed specifically to the addressed DART, DART1. If the request does not contain a specific DART address, then the request is assigned to a DART entity. In alternate embodiments, the first DART to receive the request processes it. In yet another embodiment, the assignment of a request to a DART may be based upon load information. If the request contains a DART specific address, then the addressed DART reads the request as depicted in stage 1730.

Likewise, after a request is assigned in stage 1725, a DART reads the request in stage 1730. The DART then parses the request as illustrated in stage 1735. In parsing the request, the DART may strip out a subject heading, addressing information, and message content. The flow then proceeds to the determination of the type of request explained with regard to FIG. 16.

Figure 18:
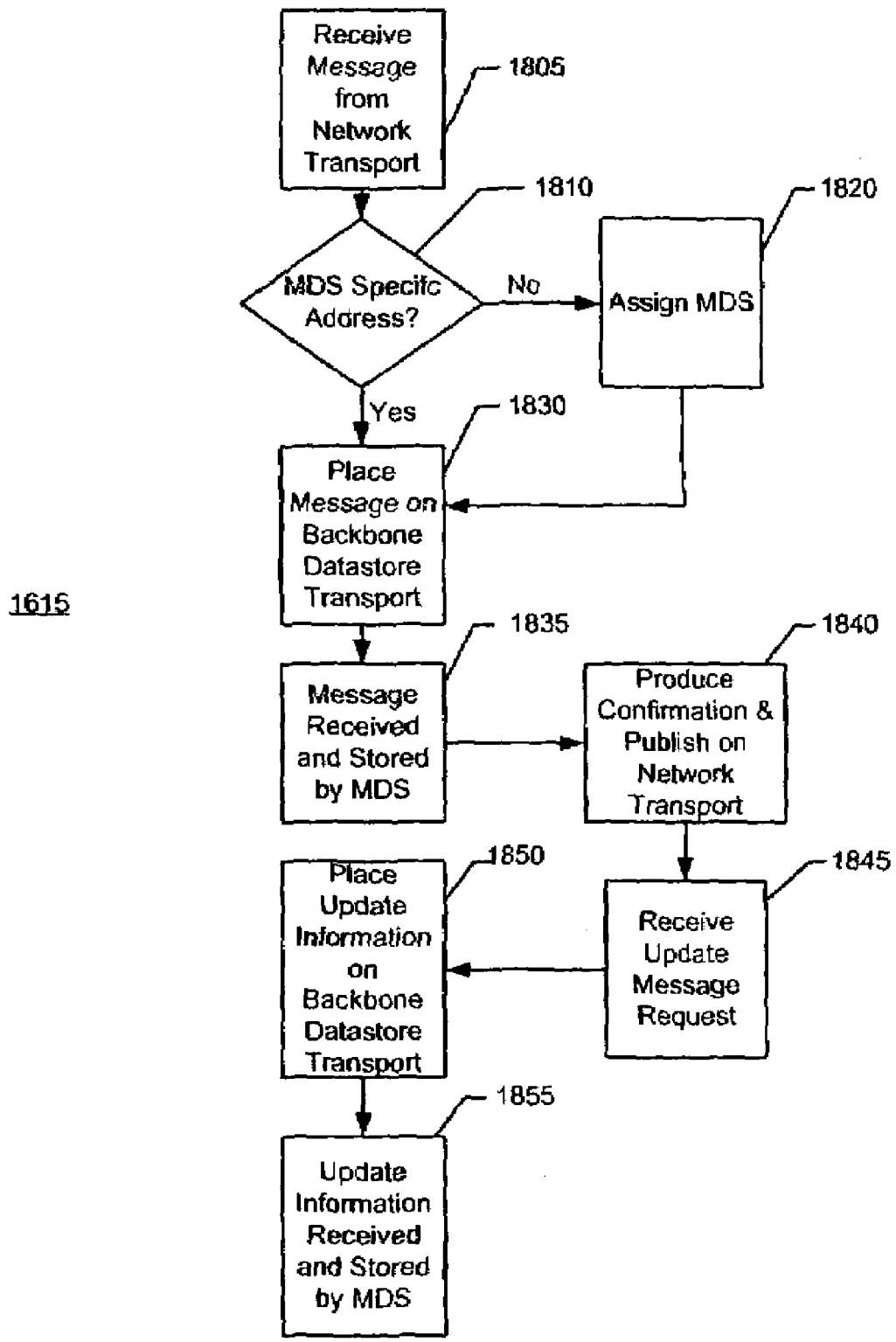
FIG. 18 is a flow chart illustrating the operation of a DART entity performing a store function in an exemplary embodiment consistent with the principles of the present invention.

FIG. 18 is a flow chart illustrating the operation of a DART entity performing a store function consistent with the principles of the present invention. In exemplary stage 1805, the DART receives from the network transport the message that is to be stored. The DART, as depicted in stage 1810, examines the message header, content, or appended information to determine if it contains an address for a specific MDS. For example, a header contained with the message may contain the address of a specific MDS, such as "MDS1." If the message header, content, or appended information does not contain a specific MDS address, then the DART, as illustrated in stage 1820, determines which MDS is to store the message.

The DART accomplishes this assignment function in any of a number of ways. For example, the DART may store the message on an MDS that contains the messages for a particular subscriber. If the message header, content, or appended information contains a specific MDS address, then the DART, as illustrated in stage 1830, places the message on the backbone datastore transport. Likewise, after assigning an MDS in stage 1820, the DART places the message on the backbone datastore transport as depicted in stage 1830. The message is received and stored by the designated MDS in stage 1835. In stage 1835, the MDS stores the message and any accompanying information in a storage device.

In stage 1840, the DART produces a confirmation message and publishes it on the network transport. For example, in the case of a store request, the DART produces a confirmation message indicating that the message has been stored. In exemplary stage 1845, the DART receives from the network transport an update message request. In one embodiment of the present invention, this update message request may contain delivery information for the message. For example, if the message is the subject of a "DELIVER_STORE" request, then a delivery confirmation may accompany the update message request to indicate that the message has been delivered. In stage 1850, the DART places the update information on the backbone datastore transport. In stage 1855, the same MDS that stored the message receives and stores the update information.

Figure 19:
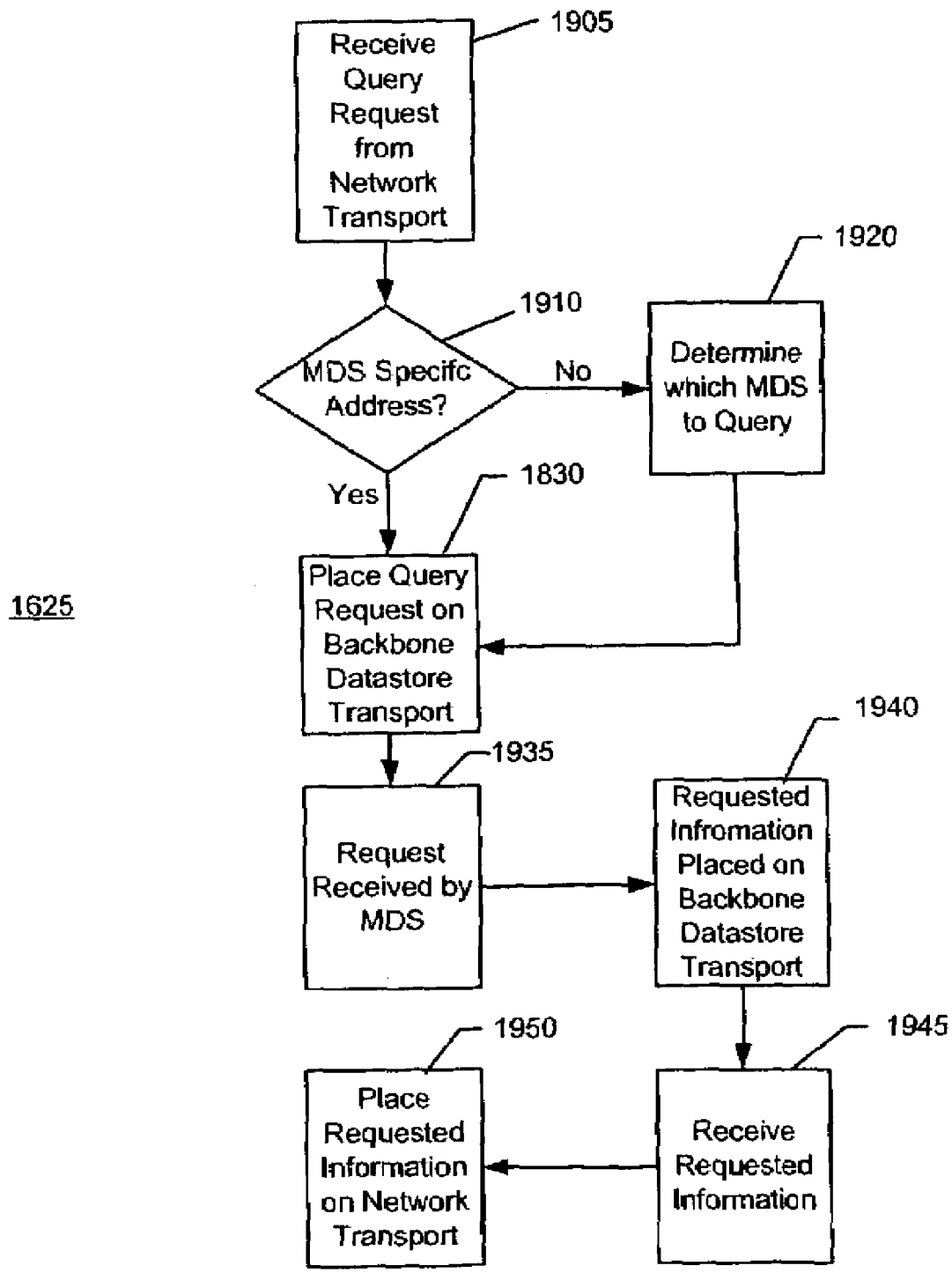
FIG. 19 illustrates a query request performed by a DART entity in an exemplary embodiment consistent with the principles of the present invention.

FIG. 19 illustrates a query request performed by a DART entity consistent with the principles of the present invention. In exemplary stage 1905, the DART receives a query request from the network transport. The DART, as depicted in stage 1910, examines the request header, content, or appended information to determine if it contains an address for a specific MDS. For example, a header accompanying the request may contain the address of a specific MDS, such as "MDS1." If the request header, content, or appended information does not contain a specific MDS address, then the DART, as illustrated in stage 1920, determines which MDS to query.

The DART accomplishes this function in any of a number of ways. For example, the DART may query the MDS that contains the messages associated with a particular subscriber. If the request header, content, or appended information contains a specific MDS address, then the DART, as illustrated in stage 1930, places the request on the backbone datastore transport. Likewise, after determining which MDS to query in stage 1920, the DART places the request on the backbone datastore transport as depicted in stage 1930. The request is received by the designated MDS in stage 1935. In stage 1935, the MDS accesses the requested information from a storage device. In stage 1940, the requested information retrieved from the MDS is placed on the backbone datastore transport. In stage 1945, the DART receives the requested information and, in stage 1950, places the requested information on the network transport.

Figure 20:
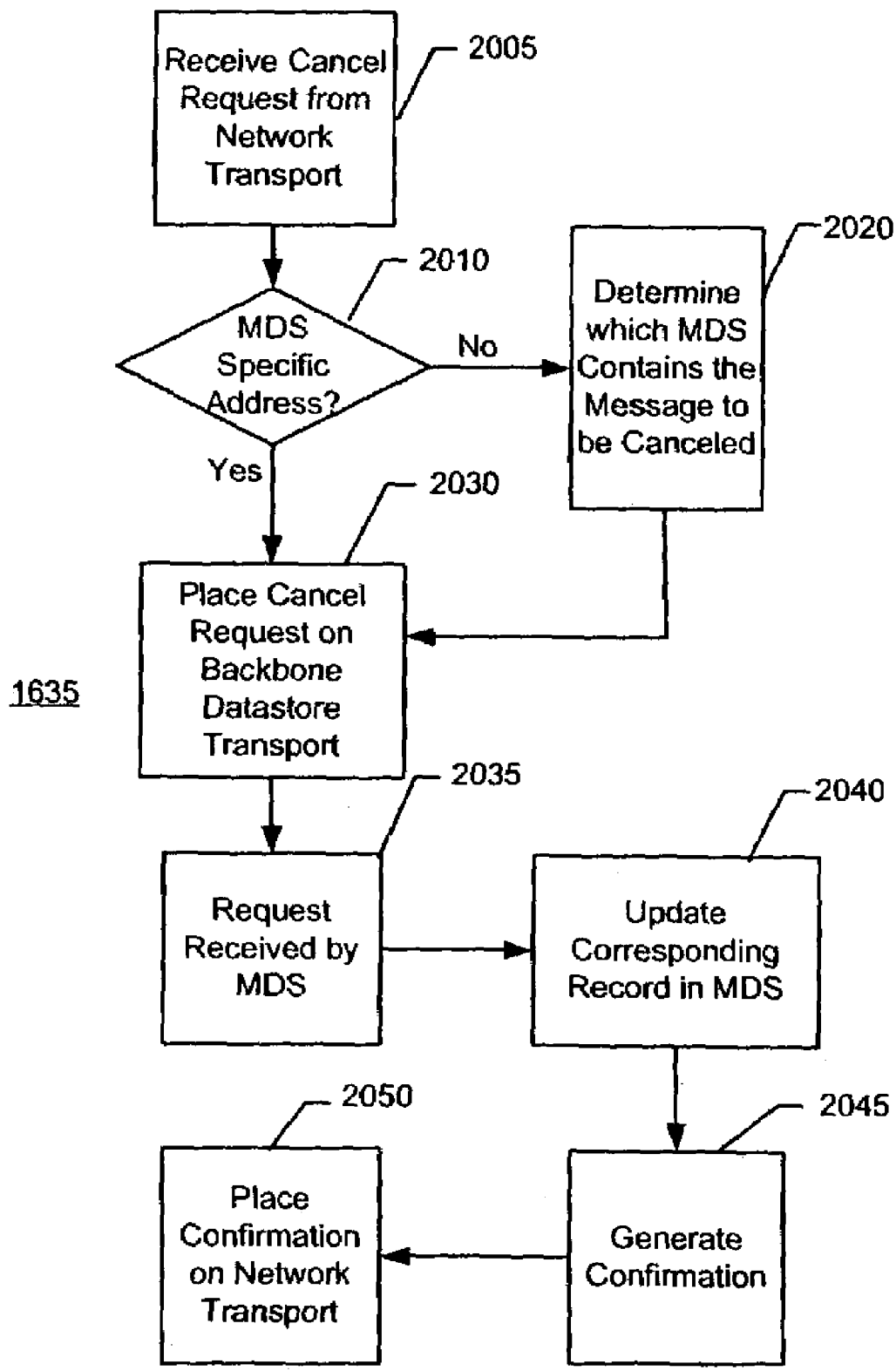
FIG. 20 illustrates a cancel request performed by a DART entity in an exemplary embodiment consistent with the principles of the present invention.

FIG. 20 illustrates a cancel request performed by a DART entity consistent with the principles of the present invention. In exemplary stage 2005, the DART receives a cancel request from the network transport. The DART, as depicted in stage 2010, examines the request header, content, or appended information to determine if it contains an address for a specific MDS. For example, a header accompanying the request may contain the address of a specific MDS, such as "MDS1." If the request header, content, or appended information does not contain a specific MDS address, then the DART, as illustrated in stage 2020, determines which MDS contains the message that is to be canceled. If the request header, content, or appended information contains a specific MDS address, then the DART, as illustrated in stage 2030, places the request on the backbone datastore transport.

Likewise, after determining which MDS contains the message to be canceled in stage 2020, the DART places the request on the backbone datastore transport as depicted in stage 2030. The request is received by the designated MDS in stage 2035. In stage 2040, the DART updates the corresponding record in the MDS with the cancel message information. For example, the DART, in accessing the MDS with the particular message, may delete the message from the MDS or may store information on the MDS indicating that the message is a canceled message. In stage 2045, the DART generates a confirmation message. This confirmation message, for example, contains information indicating the successful cancellation of the message. In stage 2050, the confirmation message is placed on the network transport.

Figure 21:
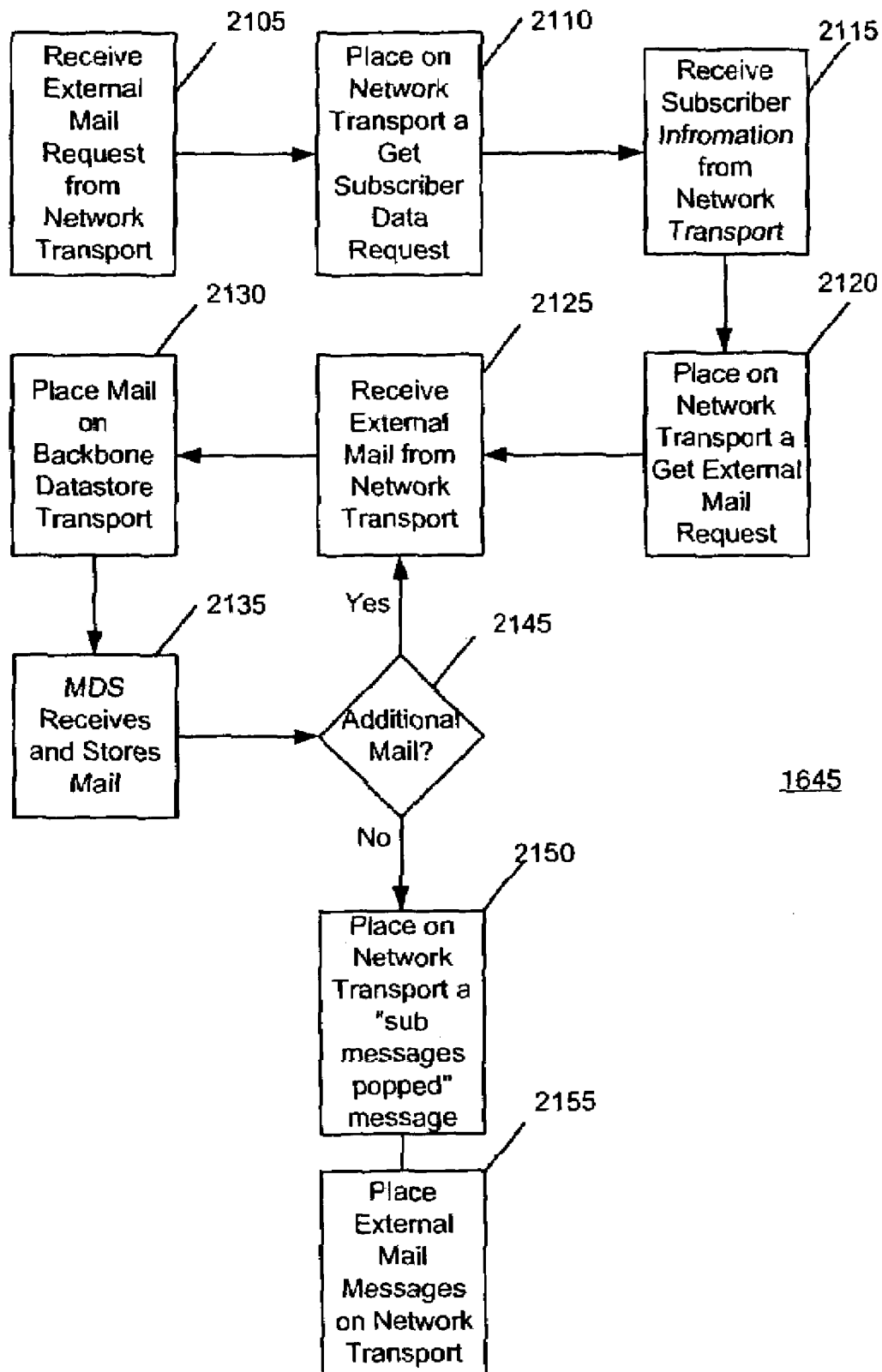
FIG. 21 illustrates an external mail request performed by a DART entity in an exemplary embodiment consistent with the principles of the present invention.

FIG. 21 illustrates an external mail request performed by a DART entity consistent with the principles of the present invention. In exemplary stage 2105, the DART receives an external mail request from the network transport. In this example, a subscriber requests a message from a device external to the wireless network. Upon receiving this request, the DART places a get subscriber data request on the network transport as illustrated in stage 2110. In stage 2115, the DART receives the requested subscriber information from the network transport. For example, the DART may request and receive an external email source for a particular subscriber. In stage 2120, the DART places a get external mail request on the network transport. In formulating this request, the DART uses subscriber information it obtained from the network transport.

After sending the get external mail request, the DART receives the external mail from the network transport in stage 2125. In stage 2130, the DART places the external mail on the backbone datastore transport, and in stage 2135, the MDS receives and stores the external mail. For example, the DART may direct storage of the external mail on an MDS that contains other messages associated with a particular subscriber. In stage 2145, the DART determines if there is additional external mail that needs to be received. If so, then the DART receives the external mail (stage 2125), places it on the backbone datastore transport (stage 2130), and stores the mail in an MDS (stage 2135). If in stage 2145 no additional mail exists, then the DART places a sub messages popped message on the network transport as depicted in stage 2150. The DART, in stage 2155, places the external mail messages on the network transport.

Figure 22:
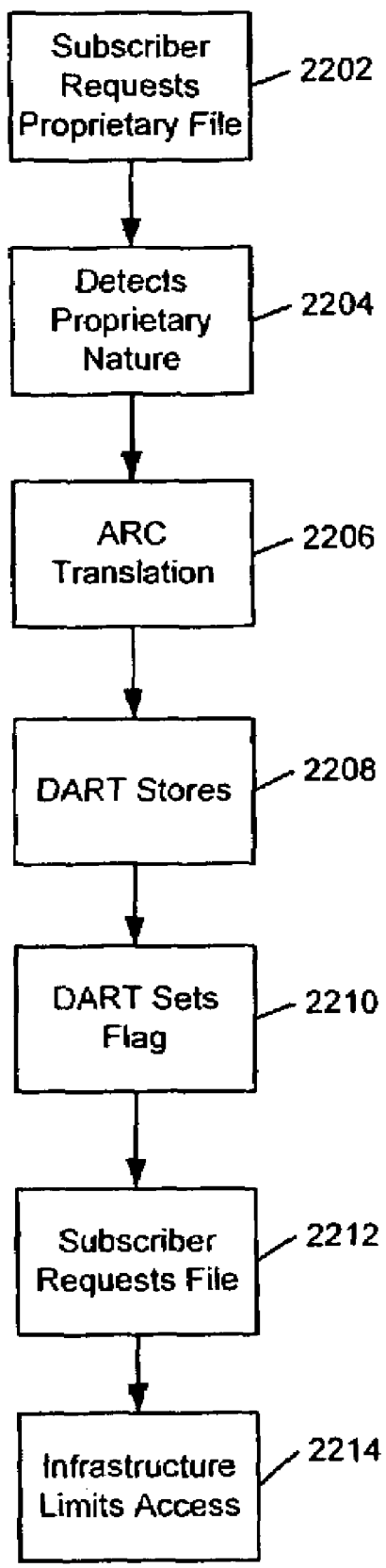
FIG. 22 illustrates a method for limiting access to a proprietary file such as a ring tone in an exemplary embodiment consistent with the principles of the present invention.

FIG. 22 illustrates an method for limiting access to a proprietary file such as a ring tone. In stage 2202, a subscriber downloads a proprietary file from a third party content provider. In this example, the download is initiated by a subscriber from a device that operates on the network. For example, a subscriber may download a proprietary midi file, graphics file, or ring tone from a content provider's internet site to a cellular phone. In another example, a subscriber may download a proprietary file using his personal computer. In this example, the proprietary file contains copyrighted material, and therefore the subscriber may purchase the proprietary download. The downloaded file itself can be in any convenient format.

The network detects the proprietary nature of the file in stage 2204. This detection occurs, for example, when the incoming ARC reads the origination address of the download and accesses a database of known providers of proprietary files. In a further aspect of the invention, the RAVE or DART entities may read the origination address and compare it to addresses of content providers, for example, stored in an RVBD, UADB, or MIND database. In another example, the network provider may have agreements with third party content providers under which the proprietary nature of a download is communicated to the network. This communication can be appended to the download itself or can be sent separately, for example, with a transaction identifier. In another embodiment, the various entities of the network, such as the ARC, RAVE or DART, may strip off a header from the incoming downloaded file, parse out information in that header, and determine that the download is proprietary. In yet another aspect of the invention, the content of the download itself may be checked for proprietary material against a set of commonly known proprietary objects. For example, many ring tones are copyrighted and can be downloaded for a small fee.

The network itself may have access to a content provider's proprietary ring tones so that they can be compared to ring tones being downloaded by subscribers. In such a case, an incoming ARC is capable of detecting ring tone files and converting them into a standard format, such as MIME or XML. In other embodiments of the invention, other network entities, such as the DART or the RAVE, may be capable of ascertaining that a particular downloaded file is a ring tone file.

In stage 2206, the incoming ARC translates the proprietary file into a common format such as MIME or XML. This translation function, in this example, is performed so that the file can be stored in a database residing within the network. For example, as depicted in stage 2208, a DART entity stores the converted downloaded file and accompanying information in an MDS. The file, in this example, is stored in the MDS associated with a particular subscriber or device. In such a case, the file may be stored in a field in a table of a database. Various storage methods, previously described, implement the routing and storage of the proprietary file. For example, the ARC that translates the file into a common format may publish the file, along with subject information, on a network transport. A DART associated with that type of file or device or that particular subscriber receives the file from a network transport. The DART, in this example, then stores that file along with accompanying information in an MDS. As noted, the routing of the file from the ARC to the MDS may occur with a publish and subscribe protocol or with a point to point protocol.

In stage 2210, a flag contained in an MDS is associated with the file. This flag, for example, can be a flag that denotes that the file is copyrighted. In this manner, a copyright flag, contained in an MDS database, can be set to indicate that the file is copyrighted. The data structure may be implemented to contain a copyright flag. In another embodiment, the message class portion or the class of service portion of the message store table may be used to indicate that a file is proprietary. The file and associated flag, for example, are stored together in the same database along with other message information. For example, a DART associated with the MDS containing a particular subscriber's messages stores the proprietary file, in common format, in the message store stable. The DART, in this example, also stores information about the message in the fields depicted in the tables. For example, the DART stores a description of the file, a transaction identifier, the number of segments, and other information associated with the file in the message store table. In a similar manner, the DART stores device-type information in a message portion of a device status table. In this embodiment of the invention, the file itself along with accompanying identifying information is stored in an MDS.

As shown in the examples of stages 2212 and 2214, when a subscriber accesses the proprietary file stored in an MDS, the network limits the access to that file. In one embodiment of the invention, the DART entity recognizes the proprietary or copyright flag associated with the file and sends a communication directing other elements of the network to block certain functions such as the forward function. For example, a subscriber may have purchased the use of a proprietary file for a particular device. The subscriber stores the file in the network and accesses it from that particular device. In this example, the device could be a pager, cellular phone, personal computer, or any other device that interfaces with the network. As such, the device may have the capability of forwarding messages. If the subscriber attempts to forward the message from one device to another, the forward function is blocked by the network. In this manner, the network preserves the proprietary nature of the file. This blocking is accomplished, for example, by network elements such as the ARC, RAVE, or DART that recognize the proprietary or copyright flag associated with the file. In such a case, these elements block certain functions, such as send, forward, or copy, so that the proprietary file is not duplicated.

In other embodiments, other network entities may be tasked with limiting access to the proprietary file. For example, the outgoing ARC may recognize the proprietary or copyright flag and block certain functions. In one example, a subscriber seeks to access a proprietary file from a personal computer connected to the Internet. In this case, the subscriber accesses the network via the Internet. As previously described, a subscriber can list messages stored in an MDS on a web page displayed on that subscriber's personal computer. In one embodiment of the invention, a proprietary file may only be listed by name on the displayed web page with a notice that it is improper to copy the file. The web page may thus limit the subscriber access to the file. For example, a subscriber may only be able to view the file and not copy it. In this manner, a read only copy of the file may be transmitted from the MDS, through an associated DART, through an ARC for translation and out to a web page. In another embodiment, the web page may block other functions such as the forward or send functions.

In another embodiment, a subscriber may have downloaded a proprietary ring tone to his cellular phone. Since cellular phones have a limited amount of memory, the subscriber may store the ring tone on the network, for example in an MDS, for later use on the same phone. The subscriber, using the same phone, may then access the ring tone at a later date and reload it onto that phone. An MDS stores the ring tone itself and other information such as the device to which it was first downloaded. In this manner, the ring tone is associated with a particular device—in this case the cellular phone to which it was initially downloaded. Therefore, the network, in this example can limit access to the ring tone only to the phone to which is was initially downloaded. However, if the subscriber attempts to load the ring tone on a different device, the information stored in the MDS permits the network to block access to the ring tone by that different device. In this manner, the network preserves the proprietary nature of a file.

Figure 23:
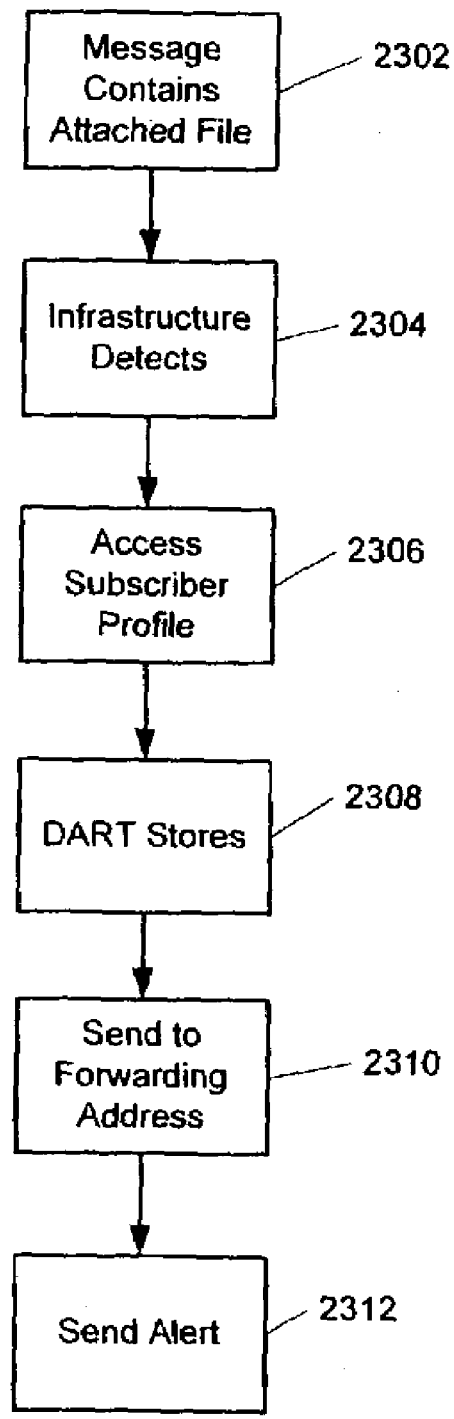
FIG. 23 depicts an method for handling attachments to messages in an exemplary embodiment consistent with the principles of the present invention.

FIG. 23 depicts a method for handling attachments to messages. In stage 2302, a message addressed to a subscriber's wireless device contains an attached file. For example, an email message with an attachment is sent to a subscriber on his cellular phone, pager, blackberry, or other wireless device. In this example, the attachment could be a Microsoft Word document, Microsoft Excel spreadsheet, AutoCAD drawing, or any other type of file that is not capable of being displayed on the wireless device. In such a case, the wireless device is not able to handle the attached file.

In stage 2304, the wireless network detects the attachment. This detection may be accomplished by numerous entities of the wireless network such as an ARC, a RAVE, or a DART. In one embodiment, an ARC entity upon receiving the message and attached file detects the presence of the attached file. In another embodiment, the Mail Transfer Agent (MTA) or Mail Transfer Gateway (MTG) detects the attached file upon receipt of the message and attached file from the Internet. In yet another embodiment, a DART detects the attached file in the process of storing the message and attached file on an MDS.

The detection of the attached file, regardless of the entity responsible for detecting it, may be accomplished in numerous ways. In one example, the header of the message is read to discover that a file is attached. For example, an email message may contain a Microsoft Word document as an attachment. Information about the presence of the attachment may be incorporated into the header of the email message. A network entity, such as an ARC, DART, or MTA, in this example, reads and interprets the message header. In this manner, the network entity detects the presence, and possibly the type, of the attachment. In another embodiment, a network entity determines the size of the incoming message and attachment. Since many attachments are large, the network entity may assume that any incoming message that is of a sufficient size contains an attachment. For example, an email message may contain a picture attachment that is two megabytes in size.

The network entity, such as an ARC, DART, MTG, or MTA, that receives the email message and attachment may be able to estimate the size of the attachment. In yet another embodiment, a network entity may read the attachment itself to discover its type. In this example, the ARC that receives the message and attachment converts both into a standard format such as MIME or XML for storage on the network. The receiving ARC in translating the attachment reads the type of attachment. For example, an ARC that receives an email message with a Microsoft Excel spreadsheet as an attachment converts that email message to a common format. In addition, that ARC or another ARC that specifically handles an attachment of that type converts the attachment to a common format for storage in an MDS.

In yet another embodiment of the invention, a network entity, such as an ARC, RAVE, DART, MTG, or MTA, detects the type of attachment. In this example, a message with an attachment is received by a network entity. That network entity detects the attachment type, for example, by reading the message header, reading the message itself, reading the attachment, reading information associated with the message, reading information associated with the attachment, or in any other convenient method. In this example, the network ascertains the type of attachment so that it can be sent to the proper forwarding address.

In stage 2306, the wireless network accesses the subscriber's information for a forwarding address. In this example, a network obtains the forwarding address from a database residing on the network. For example, a RAVE entity may access a UADB or RVDB for the forwarding address associated with that subscriber.

In one aspect of the invention, a subscriber is able to associate different forwarding addresses with different types of attachments. For example, a subscriber may associate a fax machine for attachments that contain text and a color printer for attachments that contain pictures. In another embodiment, a subscriber may be able to designate a forwarding address after being notified by the network that he has received a message with an attachment. In this manner, the network may inform the subscriber, possibly on his wireless device, that he has received a message with an attachment of a certain type. The network, via one or more of its entities, may then prompt the subscriber for a forwarding address. This address can be in the form of an alias stored in an database residing on the network. For example, a subscriber is sent a message with a database attachment. The network informs the subscriber of the message and the attachment type and prompts the subscriber for a destination address. This prompt, for example, appears on the subscriber's pager. The subscriber sees the prompt and enters as a forwarding address the alias "fax." The wireless network recognizes the alias "fax" as a specific address associated with the subscriber's fax hook. In one embodiment, the wireless network accesses a subscriber's profile information stored in a UADB, RVDB, or MIND and retrieves the forwarding address associated with the alias "fax." The attachment is then forwarded to the subscriber's fax hook.

In stage 2308, a DART entity stores the message and attachment in an MDS. In one embodiment of the invention, the message and attachment, converted into a common format by an ARC, is published on a network transport. A DART associated with the subscriber, for example, receives the message and attachment and then stores it in an associated MDS. As detailed previously, the message may occupy one portion of an MDS, the attachment may occupy another portion of the MDS, and accompanying information may be associated with the message and attachment in the MDS. For example, the attachment type may be stored in the MDS along with the attachment.

In stage 2310, the message and attachment are sent to the forwarding address. In one aspect of the invention, the message and attachment are retrieved from an MDS and published on the network transport by the DART with a forwarding address. In this example, an ARC receives the message, attachment, and forwarding address and performs translation functions. The receiving ARC is associated with the particular device to which the message and attachment are forwarded. For example, the network may contain an ARC that performs translation functions associated with a fax machine. In this manner, an attachment may be converted by an ARC from a standard format, such as MIME or XML, into a format suitable for a fax machine. In this case, the subscriber is forwarding the attachment to a fax machine. After translation, the ARC, for example, sends the translated attachment to an MTA along with the forwarding address. The MTA may then send the attachment, in a suitable format, to the fax machine.

In an alternate embodiment of the present invention, an attachment may be held in the MTA and not translated into a common format. For example, an incoming email message with an attachment may be stored temporarily in an MTA. The message itself may be sent to an ARC for translation. In this example, the message, but not the attachment is processed by the network. An ARC receives the message, translates it, and places it on a network transport, for example, with a validation request. A RAVE receives the validation request and validates the destination address for the email message. In this case, the email message is properly addressed to a subscriber's wireless device. The RAVE returns a validation response to the network transport, possibly with the originating ARC as the destination for the response. In this manner, the communication between the RAVE and the ARC may be based on a point to point protocol. In another embodiment, the RAVE may simply publish the response on the network transport with a subject such as "validation response." In a publish and subscribe protocol, all ARCs connected to the network transport subscribe to the subject "validation response" and all ARCs look at the response. The originating ARC receives the response after looking at information the response contains. In this fashion, the originating ARC processes the response to determine that the response is intended for it.

After receiving the validation response, the originating ARC, in this example, publishes on the network transport a message with the subject "get forward address." This message, in this example, is received by a RAVE. The RAVE accesses the subscriber's profile, stored for example in a UADB or RVDB, to obtain an address to forward the attachment. The RAVE returns the address to the originating ARC. The ARC passes the address to the MTA so that the MTA can forward the attachment to the subscriber's specified forwarding address. In this example, the attachment is not stored within the network but is instead sent to a device at a forwarding address.

In stage 2312, the subscriber receives an acknowledgement that the attachment has been forwarded. In this example, the network has forwarded the attachment and generated an acknowledgement message. This acknowledgement message is sent to the subscriber, for example, on his wireless device. In another embodiment of the invention, a subscriber may be able to designate the type of acknowledgement he receives as well as the destination for that acknowledgement. In this example, the subscriber may receive an acknowledgement message on his wireless device and also at his personal email account. In yet another aspect of the current invention, the acknowledgement message may contain information about the attachment, the successful receipt of the attachment by the device to which it was forwarded, or any other relevant information. In another aspect of the invention, the subscriber may not receive an acknowledgement message.

The Mail Transfer Gateway (MTG)

Figure 24:
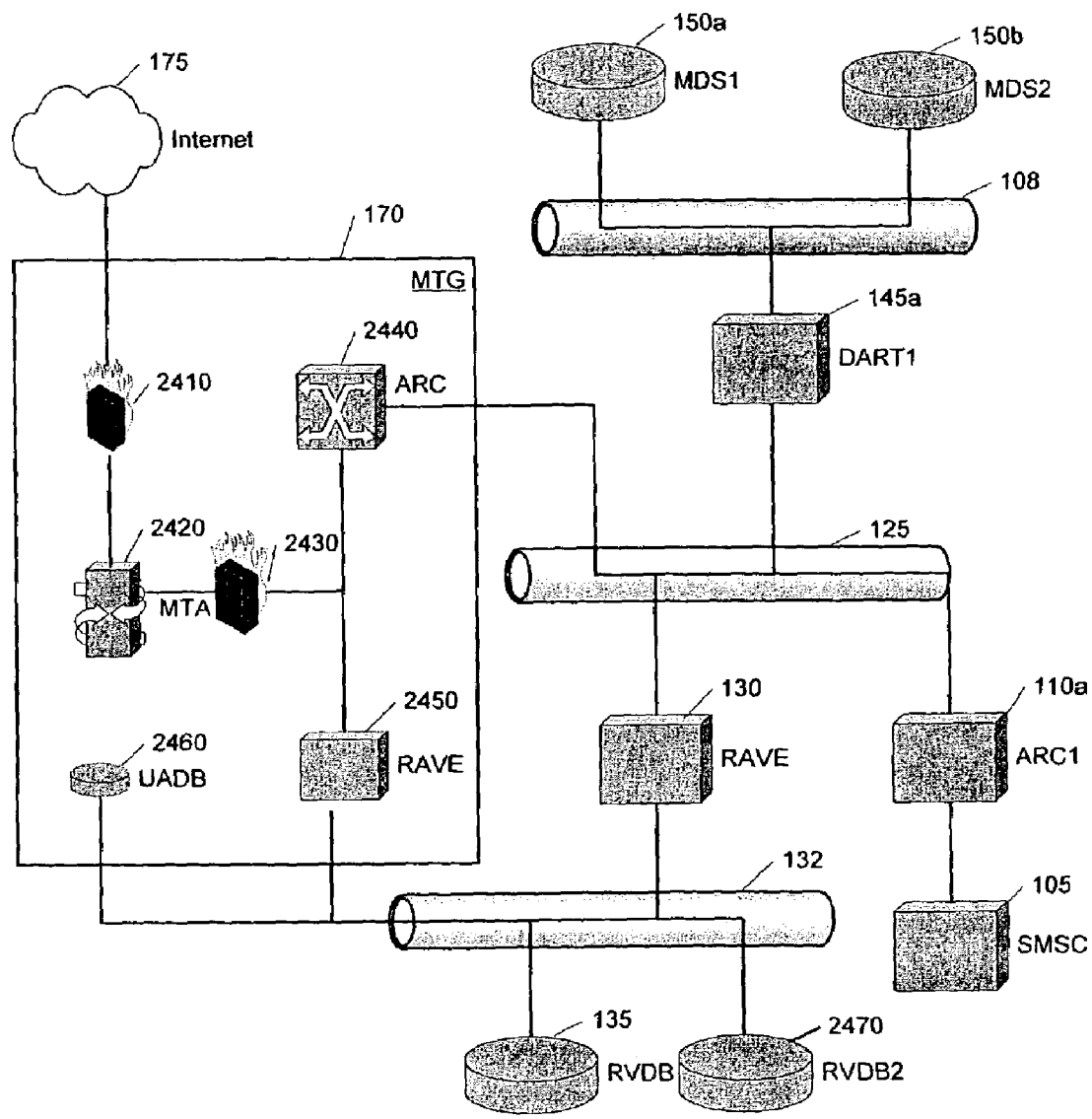
FIG. 24 illustrates the Mail Transfer Gateway 170 interfaced to the messaging infrastructure 100 in an exemplary embodiment consistent with the principles of the present invention.

FIG. 24 illustrates the Mail Transfer Gateway 170 interfaced to the messaging infrastructure 100 in an exemplary embodiment consistent with the present invention. Mail transfer gateway 170 interfaces with elements of the messaging infrastructure 100 via network transport bus 125 and BITBUS 132. In this example, DART 145a interfaces with MDS1 150a and MDS 150b through message transport bus 108. Additionally, DART 145a interfaces with RAVE 130, ARC1 110a and ARC 2440 through network transport bus 125. Likewise, MDS1 150a and MDS 150b interface with DART 145a through message transport 108. In this fashion, message transport 108 may serve to transfer data from MDS1 150a and MDS 150b to DART 145a. In addition, data can be routed from DART 145a to MDS1 150a and MDS 150b through network transport 108.

RAVE 130 interfaces with DART 145a through network transport bus 125. RAVE 130 interfaces with RVDB 135 and RVDB2 2470 through BITBUS 132. In this manner, network transport bus 125, for example, acts as a communications channel between DART 145a and RAVE 130. Likewise, BITBUS 132 acts as a communications channel between RAVE 130 and RVDB 135 as well as RVDB2 2470.

RVDB 135 and RVDB2 2470 interact with RAVE 130 via BITBUS 132. RVDB 135 and RVDB2 2470 are also interconnected to RAVE 2450 and UADB 2460 via BITBUS 132. BITBUS 132 serves as a communications channel between RVDBs 136 and 140 and RAVEs 128 and 2450 as well as UADB 2460.

ARC1 110a interfaces with DART 145a via network transport bus 125. ARC1 110a is interconnected to RAVE 130 through network transport bus 125. In this manner, network transport bus 125 serves as a communications channel between ARC1 110a and DART 145a as well as RAVE 130. Additionally, ARC1 110a interfaces with short message service center 105. In one embodiment of the present invention, short message service 105 is responsible for delivering messages to mobile devices using a store and forward approach.

MTG 170 serves as an e-mail gateway to a data network. In this fashion, all inbound and outbound customer internet traffic may use mail transfer gateway 170.

MTA 2420 may support simple mail transfer protocol (SMTP) and communicate with other MTAs (not shown) and post offices (not shown) to send and receive mail messages to and from the Internet. MTA 2420 may reside outside of a network firewall depicted by firewall 2430. In this manner, firewall 2430 serves to protect the remainder of the messaging network infrastructure 100.

In one embodiment consistent with the principles of the present invention, MTA 2420 may perform validation on origination addresses from a RAVE entity such as RAVE 2450 while also performing White list and Blacklist lookups. In this manner, MTA 2420 may perform some or all of the validation procedures that, for example, RAVE 2450 may be capable of performing. MTA 2420 may utilize one or more database protocols to validate and readdress e-mail messages.

MTA 2420 may perform validating functions using data stored in UADB 2460. UADB 2460 is a replicated database which contains a complete set or a subset of data contained in, for example, the MIND database (shown in FIG. 1). In this example, UADB 2460, which is a replicated database, provides customized message handling information on a per subscriber basis. UADB 2460 may contain, for example, customer aliases, White lists, Blacklists, distribution lists, language filters, message formatting options, and other aspects of a subscriber's profile. Subscribers may be able to update their profile via an Internet portal, through the subscriber configuration API, or through other means. UADB 2460 may receive updates from other network databases.

Data contained in UADB 2460 may be stored in a database contained within MTA 2420. In this example, UADB 2460 may not be present or may be incorporated within MTA 2420. In this manner, MTA 2420 may be capable of storing or caching subscriber information. Subscriber information may be permanently or temporarily stored on MTA 2420. In a further embodiment of the present invention, MTA 2420 and UADB 2460 may be separated by firewall 2430 in order to provide security.

MTA 2420 may provide anti-spamming functions. For example, MTA 2420 may include the capability to allow or bar specific Internet IP addresses, domains, and hosts from delivering e-mail to MTA 2420. In this example, MTA 2420 may be capable of silently dropping incoming e-mail messages without further delivery requirements. MTA 2420 may be capable of filtering, reducing, or eliminating unwanted and unsolicited e-mails from reaching messaging subscribers.

MTA 2420 may support many different anti-spamming techniques. For example, MTA 2420 may be capable of validation based upon a sender's e-mail address. In this manner, MTA 2420 may be capable of blocking spam messages from a particular e-mail address. Further, MTA 2420 may be capable of limiting the number of connections made by a host per second. Further, MTA 2420 may be capable of accessing a national database of known spammers or other content protection databases. MTA 2420 may be capable of accessing a system-wide Blacklist to deny service to purveyors of spam. MTA 2420 may be capable of protecting existing domain names of a particular messaging provider. Further, MTA 2420 may be capable of determining and blocking spamming by use of war dialing-attacks. In addition, MTA 2420 may be capable of detecting spam messages based upon the content of an e-mail using a list of regular expressions. MTA 2420 may be capable of detecting previously unidentified spam messages based upon the volume of similar e-mail from an originating address. Further, MTA 2420 may be capable of verifying the text of an e-mail for spamming. In one embodiment of the present invention, this verification process may include a check sum or a counter for e-mail text that is processed, for example, by removing white space, by converting e-mail text to lower case, or by common keywords.

In a further embodiment of the present invention, a messaging subscriber may be capable of altering his user profile to avoid receiving spam e-mail messages. In one exemplary embodiment consistent with the principles of the present invention, MTA 2420 may allow a user to format the messages he receives. For example, a messaging subscriber may not wish to have the header of a text message or e-mail displayed on his messaging device. In such a case, MTA 2420 may allow a messaging subscriber to format the messages he receives so that the header is not displayed. Other configuration options are within the scope of operation of MTA 2420. For example, a messaging subscriber may also be able to configure the messages he sends so that they are also displayed on a receiving device in a particular format.

In a further embodiment of the present invention, a messaging subscriber may be able to configure a profile so that he receives message segments one at a time. In standard SMS format, message segments contain 160 characters per segment. In this manner, a messaging subscriber who receives a message which contains more than 160 characters may receive more than one message segment. In one embodiment of the present invention, a messaging subscriber may be able to alter a user profile so that he receives only one message segment at a time. This could be advantageous because messaging subscribers are typically charged for each segment received. A messaging subscriber who receives the first segment of a multi-segment message may not wish to receive subsequent segments. In such a case, MTA 2420 may provide that a messaging subscriber receives only the first message segment of a multi-segment message.

In a further embodiment of the present invention, MTA 2420 may support and host multiple domain names with each domain providing separate mail handling capabilities. For example, a domain name may be associated with a certain set of mail handling rules. These rules, for example, may include stripping the header information from an e-mail message, supplying only the text of an e-mail message with sender information, replacing a sender address with an 18-digit address, replacing the entire message text with a canned message depending upon the address of the sender, or any other mail handling process. In this manner, a messaging subscriber may be able to configure the receipt of e-mail messages based on their origination address.

MTA 2420 may provide the ability to allow mobile devices or messaging devices to reply to e-mail messages. An exemplary embodiment of MTA 2420 may enable a "reply to all" functionality for a two-way messaging data device. In a further example, MTA 2420 may support delivery and read receipts of e-mail messages. In yet another embodiment of the present invention, MTA 2420 may be capable of handling replies to messages that are addressed to a group.

In one example, when an e-mail is received, the originator's address may be captured by MTA 2420. This origination address may be sent via ARC 2440 to network transport bus 125. The final destination may reply to this e-mail. Network transport bus 125 may then be configured such that this reply message is delivered to the originating mail transfer gateway (MTG), such as MTG 170. MTG 170 could then extract the original e-mail address and forward the e-mail to MTA 2420. From this point, MTA 2420 may forward the e-mail through firewall 2410 to the Internet 175.

In a further embodiment of the present invention, MTA 2420 may provide the ability to allow a mobile device to send the same message to multiple recipients. In this manner, a messaging subscriber may be able to define a distribution list, which may be stored in UADB 2460 or its replica, for use by MTA 2420 in sending an e-mail to the Internet 175. A messaging subscriber's distribution list, for example, could be a numeric list, an alphanumeric list, or any other type of list. For example, a messaging subscriber may denote a particular word that can be associated with various destination addresses. These destination addresses could correspond to messaging devices, standard Internet e-mail addresses, or any other message receipt location. In this example, when a messaging subscriber uses the specified word in sending an e-mail message, that e-mail message could then be sent to all of the destination addresses associated with that word. A messaging subscriber could denote the word "home" to be associated with three different destination addresses. In this example, when the messaging subscriber sends a message to "home," that e-mail message would go to the three associated destination addresses. These destination addresses may correspond to any number of devices.

In a further embodiment of the present invention, MTA 360 may provide the ability to readdress outgoing e-mail based upon a subscriber's alias preference which may be contained in UADB 2460. For example, a messaging subscriber who sends a message from his messaging device may wish to have that message appear as though it came from a different origination address. In this manner, an e-mail sent from a messaging device may appear to its recipient to have been sent from, for example, a personal computer. A messaging subscriber may send a message from his mobile phone to a destination e-mail address. The recipient of this message would then see that the message came from a mobile phone. That is, in this example, the origination address for that message would be a mobile phone.

In one embodiment consistent with the principles of the present invention, MTA 2420 may be able to remap this origination address so that it appears that the message came from a different device. In this manner, the recipient of the message would not see the mobile phone as being the origination address. The origination address, for example, appears as an alias which could be a standard Internet e-mail address. In this manner, the recipient of the message, in replying to the message, would reply to the messaging subscriber's e-mail address. In this fashion, the reply e-mail would not go to the messaging subscriber's mobile phone, but would instead be routed to the alias origination address.

In one embodiment of the present invention, MTA 2420 may support standard e-mail protocols, such as SMTP, LDAP, IMAP, or any other e-mail protocol. Further, MTA 2420 may support standard API interfaces such as MAPI.

MTA 2420 may be capable of returning various routing information about e-mails. For example, MTA 2420 may provide alias look-up or extraction of destination addresses for a given alias. MTA 2420 may interface with UADB 2460 or its replica in order to perform this look-up or extraction function. In another example, MTA 2420 may be capable of looking up a distribution list. This distribution list may be stored within MTA 2420, within UADB 2460, or in any other network database. In addition, MTA 2420 may provide e-mail addressing as well as alias or types of aliases. In a further embodiment, MTA 2420 may be capable of extracting validation information for a given destination address. MTA 2420 may perform this extraction function by looking up validation information on a database such as UADB 2460.

In an exemplary embodiment consistent with the principles of the present invention, MTA 2420 may provide an appropriate return message to a sender's e-mail address depending upon a particular error condition. For example, if a messaging subscriber sends an e-mail message and that e-mail message does not reach the destination address, then MTA 2420 may provide that messaging subscriber with an appropriate error message. In this manner, MTA 2420 may be capable of handling SMTP error conditions. In a further aspect of the present invention, MTA 2420 may be capable of informing the originator of an e-mail of negative acknowledgements, for example, by a messaging device or by an Internet e-mail. Further, MTA 2420 may be capable of sending error messages received from the Internet back to the originator of the e-mail message. These error messages may include, for example, the cause of the error, the destination, and the original message body. MTA 2420 may also be capable of sending a notification to the e-mail originator that a certain operation, such as a forward or fax operation, has not been successful.

MTA 2420 may contain processing rules. For example, MTA 2420 may administer White lists and Blacklists. Blacklists are used to block incoming e-mails from delivery to users. White lists are lists of acceptable or preferred e-mail addresses. In one embodiment of the present invention, a messaging subscriber is able to configure his or her White list and/or Blacklist. Mail transfer gateway 170 may also provide the capability of creating and managing a system-wide Blacklist, for example, to control spamming. Mail transfer gateway 170 may also provide the capability of creating and managing a system-wide White list.

In one embodiment of the present invention, mail transfer gateway 170 may be capable of specifying a future delivery time for e-mail messages. For example, e-mail messages may be delivered to subscribers as they arrive at MTG 170. MTG 170 may submit e-mail messages to network transport bus 125 sequentially. In this manner, e-mail messages may be queued up in the messaging network for transmission to messaging subscribers. In one embodiment, MTG 170 may be able to schedule delivery times to messaging subscribers. In this manner, an e-mail message received by MTA 2420 may not be delivered immediately to network transport bus 125. MTG 170 may schedule the delivery of this e-mail message from MTA 2420 to network transport bus 125 to occur at a specified time. In one aspect of the current invention, a messaging subscriber may be able to specify these delivery times.

MTA 2420 may support virus detection for messaging devices and may be able to provide virus protection. Further, MTA 2420 may be capable of blocking specific types of messages from unknown sites or from specific sites. MTG 170, for example, may support multiple NIC cards for additional security. In addition to firewalls 2430 and 2410, other security measures may be implemented with MTG 170.

MTA 2420 may provide the ability to forward a message and an accompanying attachment to an e-mail address, fax server, or other device. In this manner, a user operating a mobile device may receive an e-mail message with an attachment. The attachment may be of such a size or of such a format as to be unviewable on that messaging device. In this example, a user may wish to send the e-mail attachment or the e-mail along with the attachment to another device to be viewed, printed, or stored. MTA 2420 may be capable of providing this forwarding function.

In a further embodiment of the present invention, MTG 170 may provide multiple interfaces between MTA 2420 and various ARC, RAVE, and LAMB entities. In this manner, a single MTA, such as MTA 2420, may interface with multiple RAVE, ARC, and LAMB entities. An exemplary embodiment of MTA 2420 of the present invention may support LDAP, work across a firewall, and use multiple LDAP connections for redundancy.

MTG 170 and its subcomponent MTA 2420, may support various protocols. For example, MTA 2420 may be utilized in conjunction with multiple WEGs and may support SMTP to SMPP conversion as well as connection to SMSCs. Further, MTA 2420 may support transformation protocols such as, for example, SMTP, SMPP, XML, or any other convenient protocol. In a further embodiment of the present invention, MTA 2420 may be operational via a Telnet port. Further, MTA 2420 may implement a secure log-in procedure.

ARC1 110*a* and ARC 2440 may forward e-mail messages to network transport bus 125. In one configuration, the delivering ARC, such as ARC 2440, may be aware that these are e-mail destined messages and format them accordingly. For example, ARC1 110*a* and ARC 2440 may extract a destination address, extract a subject, and extract the body from the text payload of an SMS message. For SMS messages, the e-mail destination address as defined in Internet standards may be the first continuous set of alphanumeric characters of the message up to the first space or blank. In this manner, ARCs 110*a* and 2440 may be able to parse out a destination address from an e-mail.

ARCs 110*a* and 2440 may be capable of formatting an e-mail message based on the final device type. If a device is an SMS handset that does not support concatenated messages, then ARC1 110*a* or ARC 2440 may split the message into segments or truncate the message. If the e-mail message is segmented, then a segment identification number, maximum number of segments, and current segment may be included in each message for delivery. In this manner, an ARC, such as ARC 2440, may be capable of formatting a segmented message as well as handling multiple segments of a multi-segment message. If a messaging device does not support e-mail attachments, then an ARC, such as ARC 2440, may include a remark indicating the number and type of attachments. In this manner, the ARC entity, such as ARC 2440, may be capable of handling message attachments based on particular device types.

Figure 25:
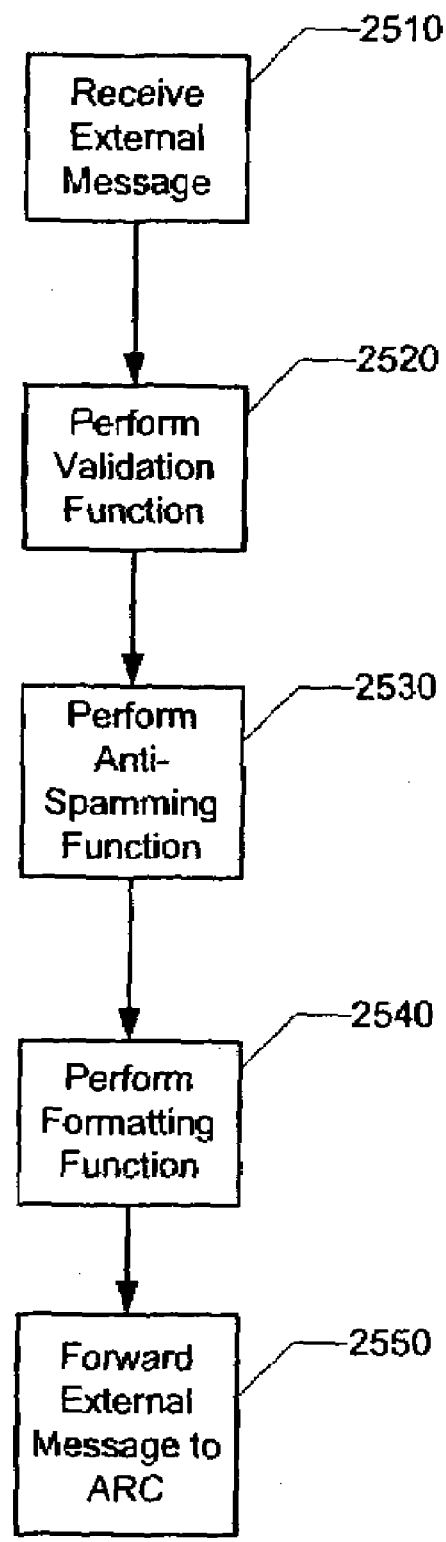
FIG. 25 illustrates a flow chart of the operation of an MTA element in an exemplary embodiment consistent with the principles of the present invention.

FIG. 25 illustrates a flow chart of the operation of an MTA element consistent with the principles of the present invention. In this embodiment, the MTA element is capable of receiving an external message and performing various functions relating to that message. At stage 2510, the MTA receives an external message. This message, for example, is an email message from the internet. At stage 2520, the MTA performs a validation function on the message. In this manner, the MTA ascertains whether the message is one that is destined for a subscriber. At stage 2530, the MTA performs various anti-spamming functions to prevent the delivery of unwanted messages. At stage 2540, the MTA optionally performs formatting functions on the incoming message. For example, the MTA places the message in a format desired by the subscriber to whom the message is directed.

Figure 26:
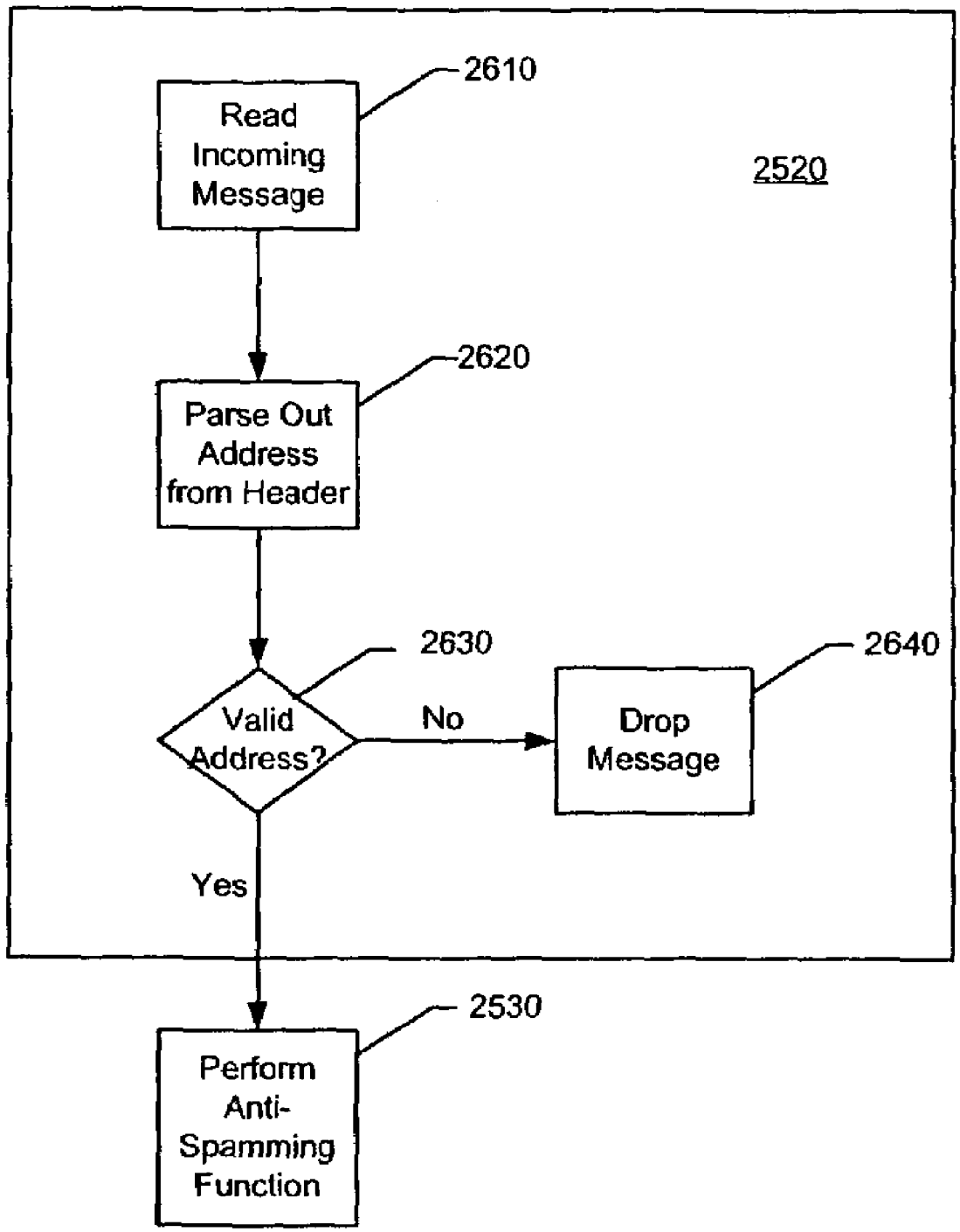
FIG. 26 illustrates the execution of a validation function by an MTA entity in an exemplary embodiment consistent with the principles of the present invention.

FIG. 26 illustrates the execution of a validation function by an MTA entity consistent with the principles of the present invention. At stage 2610, the MTA reads the incoming message, and at stage 2620, the MTA parses out an address from the header. In one embodiment of the present invention, the MTA parses out the destination address from an email message. In this embodiment, the destination address is in a standard format of username@domainname.com. At stage 2630, the MTA determines whether the destination address is valid. For example, the MTA may extract the username and compare it to usernames contained in a database of subscribers. In this manner, the MTA determines if the destination address corresponds to a subscriber so that the message can be delivered. If it does, then the flow proceeds to stage 2530, perform anti-spamming function. If it does not, then the message is dropped as indicated in stage 2640. Optionally, the MTA generates an undeliverable message that is returned along with the message itself to the origination address.

Figure 27:
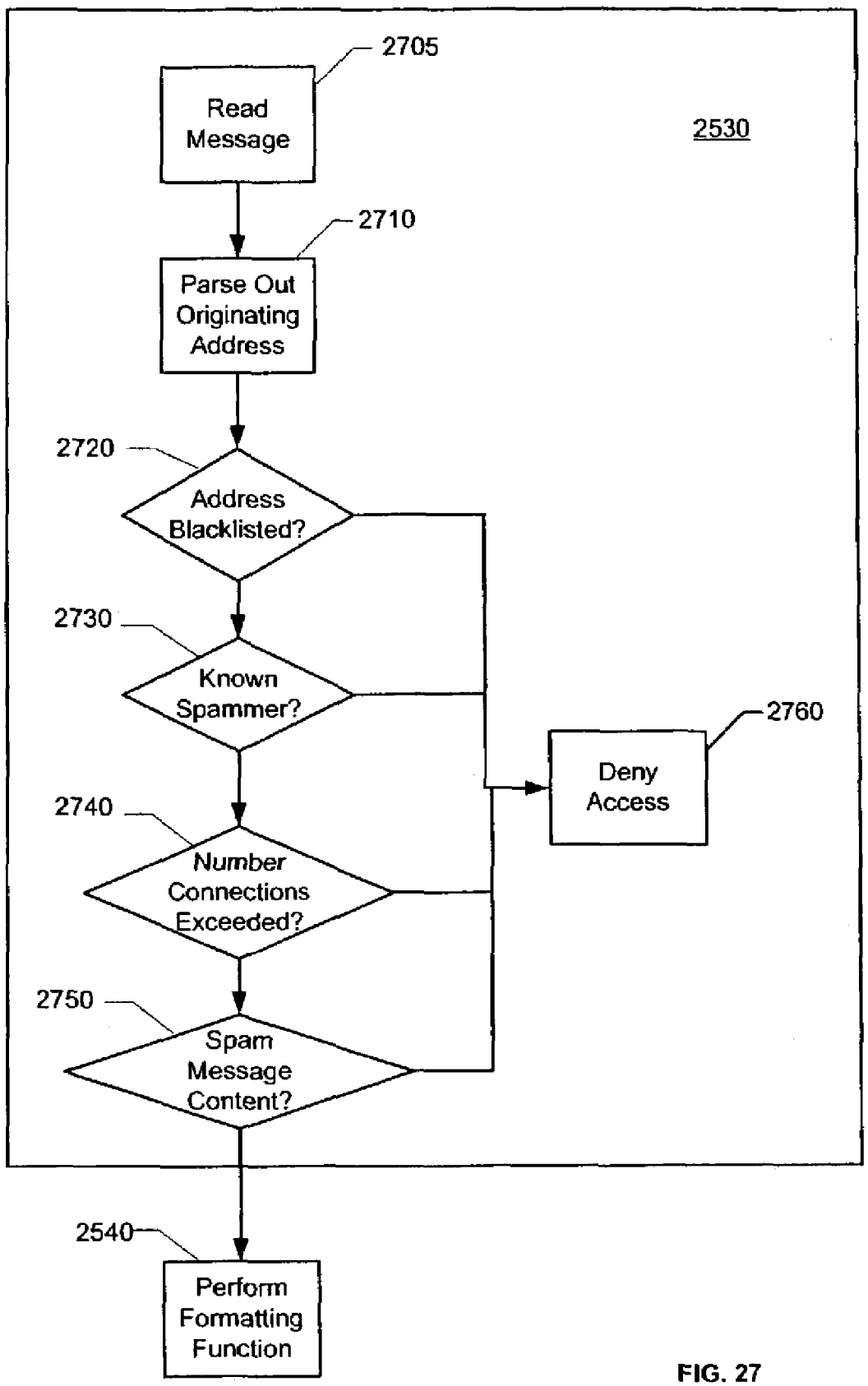
FIG. 27 illustrates the execution of various anti-spamming functions by an MTA entity in an exemplary embodiment consistent with the principles of the present invention.

FIG. 27 is an illustration of an exemplary anti-spamming function performed by the MTA consistent with the principles of the present invention. At stage 2705, the MTA reads the message, and at stage 2710, the MTA parses out the originating address. At stage 2720, the MTA determines if the originating address appears on a blacklist. For example, the MTA accesses a system-wide blacklist and a subscriber's blacklist to determine if the originating address is one to which access should be denied. If the originating address is blacklisted, then access is denied and the message is not delivered as illustrated in stage 2760. Alternately, the MTA may generate an undeliverable message and return it along with the message itself to the originating address. If the originating address is not blacklisted, then the MTA determines whether the originating address is the address of a known spammer as depicted in stage 2730. For example, the MTA may access a database of known spammers to determine if the originating address is that of a spammer. If it is, then the flow proceeds to stage 2760 and the message is not delivered. If it is not, then the MTA determines if the number of connections from the originating address has exceeded a specified amount as illustrated in stage 2740.

For example, a spammer may send thousands of messages to a network in a short period of time. The MTA detects the frequency of contact from a specific originating address or domain and blocks access if that frequency exceeds predefined limits as indicated in stage 2760. If the frequency does not exceed the specified limits, then the MTA determines if the message is a spam message based on its content as illustrated in stage 2750. For example, the MTA may read the content of a message and search for common words and phrases that may indicate a repetitious message. If the MTA determines that the message is spam based on its content, then the message is not delivered and access is denied as shown in stage 2760. If not, then the flow proceeds to stage 2540 in which the MTA performs formatting functions.

Master IT & Network Database (MIND)

In an exemplary embodiment of the present invention, the Master IT and Network Database (MIND) is responsible for providing subscriber information to other network elements. The subscriber information, for example, can be used for routing messages, for the validation of services, and for enabling other data services.

In one embodiment of the present invention, the MIND may function to centralize existing short message service center subscription databases. A short message service center is a wireless network entity responsible for delivering messages to mobile devices using a store and forward approach. In addition, the MIND may provide database replication and distribution. In a further embodiment of the present invention, the MIND may be capable of receiving in bulk existing subscriber data including, for example, distribution lists, black lists, white lists, and alias addresses. The MIND may also support interaction with a Routing and Validation Entity (RAVE). In a further embodiment of the present invention, the MIND may support Lightweight Directory Access Protocol (LDAP) as required by other components of the wireless infrastructure 100.

Consistent with the principles of the present invention, one embodiment of the MIND may act as a central storage database for account information, device information, network information, messaging attributes, and various other information pertinent to wireless communications. In this fashion, the MIND serves as a centralized storage point for various wireless subscriber information in a wireless network architecture. As a component of a wireless network architecture, the MIND may interact with other components of the architecture such as the RAVE and the Adaptive Routing Concentrator (ARC). In a further embodiment, the MIND may be compatible with other elements of a wireless network architecture.

The MIND may be comprised of a single database or a series of interconnected databases. In this manner, the MIND is scalable, redundant, and expandable. The MIND may be located in any convenient location so that it is accessible by other elements of the wireless network infrastructure 100. Various database architectures may be used to implement the MIND. These architectures are within the scope of knowledge available to one skilled in the art.

Figure 28:
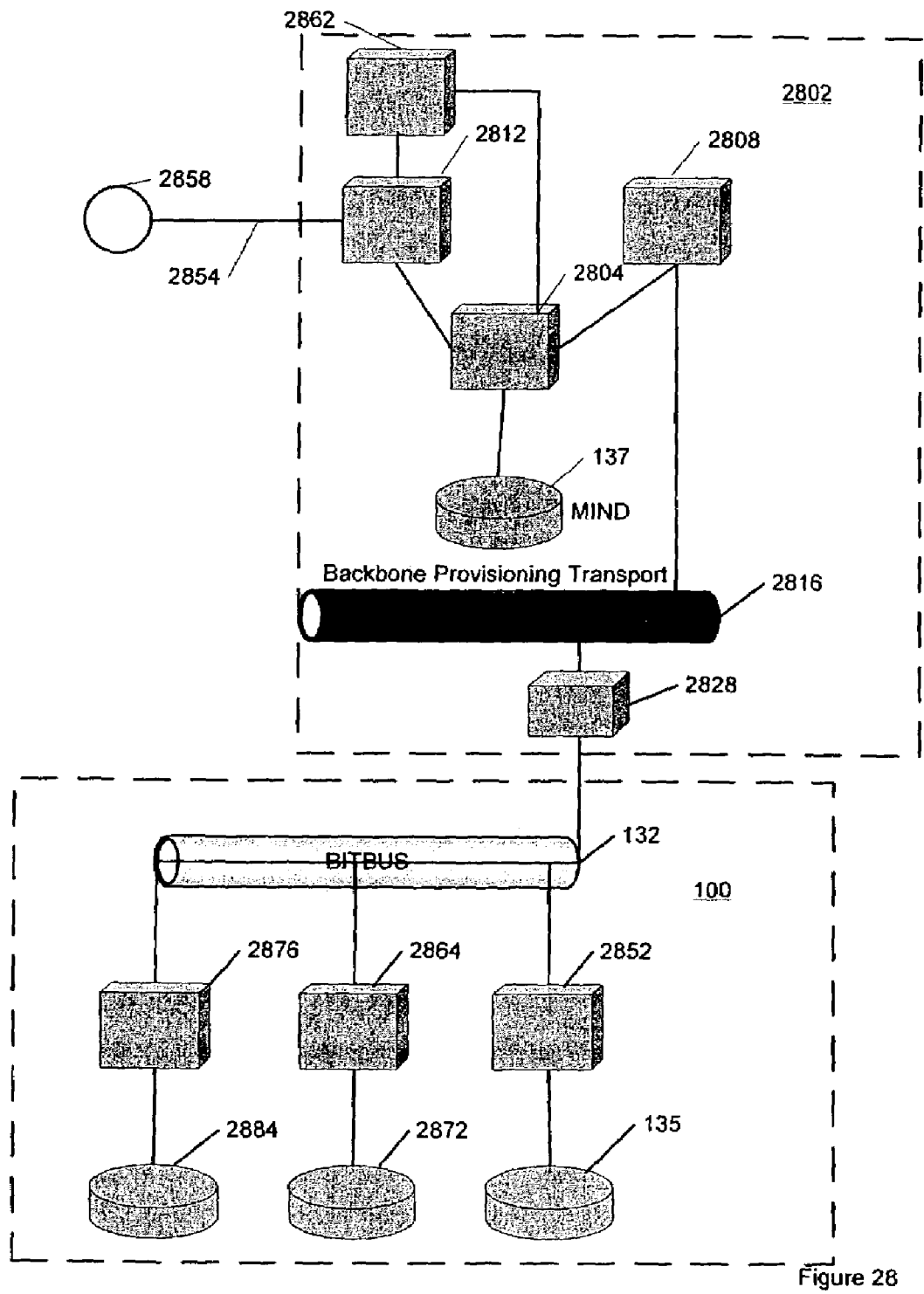
FIG. 28 depicts a MIND database 137 in an exemplary embodiment consistent with the principles of the present invention.

FIG. 28 depicts a MIND database 137 in an exemplary embodiment consistent with the principles of the present invention. Referring to FIG. 28, the MIND database 137 resides within a messaging infrastructure 100 and can be implemented with a single database or over multiple databases. In this example, the MIND database 137 interfaces with information technology database business logic 2804. In this embodiment, information technology database business logic 2804 allows access to data stored in the MIND database 137 by the messaging infrastructure 100. In this example, information technology database business logic 2804 contains business rules and an application programming interface to access the data in the MIND database 137. The information technology database business logic 2804 interfaces via a communications channel with provisioning system 2808. In addition, information technology database business logic 2804 interfaces with web interface 2812 via a communications channel. Data service application 2862 may interface with information technology database business logic 2804.

Web interface 2812 is accessible by subscribers 2858 via communications channel 2854. In one embodiment, communications channel 2854 can comprise either a cable-based or wireless Internet communications channel. For example, wireless subscribers 2858 may be able to interface via web interface 2812 with IT business logic 2804 and MIND database 137 via a web page on a personal computer. Alternatively, wireless subscribers 2858, through wireless communications channel 2854, may be able to interface with web interface 2812 and IT database business logic 2804, to alter various fields in the MIND database 137. A user friendly web interface 2812 may be provided for wireless subscribers 2858 to configure personal profiles. Web interface 2812 may include applications that utilize subscriber information, such as a customer self-management site.

In an alternate embodiment of the present invention, wireless subscribers 2858, via web interface 2812, may be able to alter a user profile comprising fields of a replica of MIND database 137. In this manner, wireless subscribers 2858 may not have direct access to the centralized storage facility of MIND database 137. Instead, wireless subscribers may be isolated from the centralized storage of MIND database 137 but may be permitted access to a replica of all or a subset of the data contained in MIND database 137. This embodiment of the present invention may provide protection for centralized MIND database 137 by denying direct access to wireless subscribers 2858. Incremental and bulk update methods, described below, may then be used to update MIND database 137 from one or more of its replicas.

Data service application 2862, in the exemplary embodiment of FIG. 28, may communicate with MIND 137 via web interface 2812 and IT database business logic 2804. Alternately, data service application 2862 may interface with MIND database 137 via IT database business logic 2804. In this example, data service application 2862 can be a third party application that provides data services to wireless subscribers 2858. These data applications may include targeted information, alerts, instant messages, or other services. Data service application 2862, provided by a third party, may use user profiles stored in MIND 137 for their data services operations. In this example, a customer may be able to use the same credentials for user profile information to access all data services offered both by a wireless provider and a third party.

For example, a username and password may be applicable both to a wireless service provider as well as a third party application. In this fashion, a wireless subscriber need only use a single username and password to access services of both a wireless service provider and a third party. In an alternate embodiment of the present invention, data service application 2862 may interface with a replica of MIND database 137. This replica may contain all or a subset of subscriber information contained in the fields of MIND database 137. Information such as wireless device type and other user preferences may also be used by data service application 2862 in order to configure the appropriate execution of a data service application.

In one exemplary embodiment of the present invention, provisioning system 2808 interfaces with information technology database business logic. Provisioning system 2808 may also interface with a backbone provisioning transport 2816. In this example, provisioning system 2808 receives automated notifications of updates to subscriber information and relays those updates to replica databases through a data distributor (not shown). In this manner, provisioning system 2808 serves as a portion of the information technology infrastructure 100 used to update replica databases such as network subscriber data replica 2872.

In this example, backbone provisioning transport 2816 interfaces with provisioning system 2808. Backbone provisioning transport 2816 may also interface with network database business logic adapter 2828. In this example, backbone provisioning transport 2816 acts as a bus for the transfer of data contained in the MIND database 137 to replica databases such as network subscriber data replica 2872.

In one embodiment of the present invention, network database business logic adapter 2828 interfaces with backbone provisioning transport. Likewise, network database business logic adapter 2828 interfaces with backbone integration transport 132. In this example, network database business logic adapter 2828 uses business rules and an application programming interface to access subscriber databases in the network. The business rules and application programming interface of network database business logic adapter 2828 may be common with those of IT database business logic 2804. In an alternate embodiment, the business rules and application programming interface of network database business logic adapter 2828 may be different than those of IT database business logic 2804.

Backbone integration transport 132 communicates with network database business logic 2852, 2864, and 2876. In alternate embodiments of the present invention, any number of network database business logic modules, such as network database business logic 2852, may be connected via bus connectors to backbone integration transport 132. In this example, backbone integration transport 132 is a bus that is used to integrate applications and network elements across the network.

Network database business logic 2852 communicates with RVDB 135. Network database business logic 2864 interfaces with network subscriber database replica 2872. Network database business logic 2876 interfaces with network data distributor database 2884. Network database business logic 2852, 2864, and 2876 may each contain business rules and application programming interfaces that can be used to access subscriber databases in messaging infrastructure 100.

Network data distributor 2884 may contain data structures and content that represents wireless subscriber information also contained in the MIND database 137. In this manner, network data distributor 2884 may be a replica of all or a subset of the data contained in MIND database 137. In this configuration, network data distributor 2884 may be the first database in the messaging infrastructure 100 to receive updates from the MIND database 137. Network data distributor 2884, in this example, relays and controls the distribution of data updates to other replicas in messaging infrastructure 100. Network data distributor 2884 may contain all or a subset of the data contained in MIND database 137.

In an exemplary embodiment, network subscriber data replica database 2872 communicates with network database business logic 2864. In this example, network subscriber data replica database 2872 may contain all or a subset of the information contained in MIND database 137. In a similar manner, RVDB 135 communicates with network database business logic 2852. In this example, RVDB 135 may contain all or a subset of the information contained in MIND database 137. These two databases, 135 and 2872, thus act as replicas of at least a subset of the MIND database 137.

MIND database 137, network data distributor database 2884, network subscriber data replica database 2872, and RVDB 135 may each be accessible by, for example, other components of the network, such as the routing and validation entity (RAVE). Likewise any one or all of these databases may be accessible by outside wireless subscribers 2858 and third party data service applications 2862. MIND database 137 and the replica databases, 135, 2872, and 2884, may also provide support for other network elements such as the RAVE. In one configuration consistent with the principles of the present invention, the RAVE entity may interface only with one of the replica databases, such as the network subscriber data replica database 2872. In an alternate embodiment of the present invention, one or all of the other network entities, such as the RAVE, may interface directly with the central MIND database 137. In a further embodiment of the present invention, replica databases may not be necessary so that all data and information is stored in a central MIND database 137. In this configuration, wireless subscribers 2858, third party data service application providers 2862, and other network entities such as the RAVE may interface directly with one centralized database, such as the MIND database 137.

In one embodiment of the present invention, the MIND database 137, as well as the replica databases, 135, 2872, and 2884, may all be capable of accepting additional data fields. In this manner, if a wireless provider wishes to add an additional data field, for example, a data field describing a feature of a new wireless device, then the MIND database 137, as well as any applicable replica databases such as 135, can be configured to accept the new data field. In this manner, the MIND database 137, as well as the replica databases, 135, 2872, and 2884, of the example of FIG. 28 are scalable, both in the number of data fields which they can hold, as well as the amount of subscriber information they contain.

An example of a situation in which a new data field may be added is when a new wireless service is added to the wireless network. For example, the design of the data fields comprising the customer profile may be able to accommodate new services by the addition of data fields to both the MIND database 137 and the replica databases, 135, 2872, and 2884. The process of adding a new service may also define how the applications that manage and operate this service will be accessed. Changes to the data fields of the MIND database 137 may allow for propagation of these new data fields or changes to other replica databases.

A wireless service provider's subscriber databases, such as the central MIND database 137, may be located both within an information technology infrastructure 100, and, with replicas such as database 135, throughout the messaging infrastructure 100. The subscriber information may be stored in various databases within the information technology infrastructure 100 2802, and those databases may be accessed through a set of information technology applications, such as electronic bill payment and presentment functions. Within the messaging infrastructure 100, there may be a master subscriber database, such as network data distributor database 2884, and a set of replicated subscriber databases such as network subscriber data replica database 2872. In this example, network data distributor database 2884 may be the source repository for data to be replicated to other replica network databases, such as network subscriber data replica database 2872. Each replica database, such as network subscriber data replica database 2872 may be a subset of the network distributor database 2884. In this fashion, network data distributor database 2884 could contain all of the data fields contained in MIND database 137.

In one embodiment of the present invention, MIND database 137 may contain subscriber profiles, including the necessary information to enable data services. This information may then be replicated throughout the messaging infrastructure 100 to other replica databases, such as network subscriber data replica database 2872 via a publish and subscribe method. Each replica database, such as network subscriber replica database 2872, may contain a subset of the information contained in the central MIND database 137 depending on the replica database's function. For example, RVDB 135 may contain a replica of a subset of the data contained in MIND database 137 or in network data distributor database 2884. If RVDB 135 is designed to interface with an entity of the wireless network, then this database 135 may contain only a subset of the information stored in MIND database 137 necessary for the functioning of the RAVE entity. Since the RAVE entity validates various messages, the RAVE entity may not need access to all of the data fields contained in MIND database 137 or network data distributor database 2884. In this manner, RVDB 135 may be a specialized replica database containing a subset of data needed to perform a specific function of the RAVE.

In a further embodiment of the present invention, network components, such as the RAVE, that require subscriber profile information may consult local replica databases, such as network subscriber data replica database 2872 for faster access. For example, the various entities of the wireless network, such as the RAVE and the DART, may wish to access data from the central MIND database 137 concurrently. Operational efficiencies may be achieved through replica databases, such as network subscriber data replica database 2872, in that various entities, such as the RAVE and the DART, may be able to consult local replicas rather than having to refer back to a central MIND database 137. For example, the RAVE, in initially validating incoming calls, may require various data fields stored in the MIND database 137. If the RAVE is able to access identical data fields contained in one more replica databases, then message throughput may be increased and delays may be decreased.

In a further embodiment of the present invention, the MIND database 137 or any of the replica databases, such as the network subscriber data replica database 2872, may allow for the collection of usage statistics, class of service traffic, types of messages, and other call traffic information. For example, the collection of these usage statistics may be delegated to a replica database, such as network subscriber data replica database 2872, or any other replica database (not shown). In this manner, a replica database 2872 may be tasked with collecting usage statistics so that the central MIND database 137 is not burdened. In one embodiment of the present invention, data from one of the replica databases, such as the network subscriber data replica database 2872 may be passed through various components of the network back to the central MIND database 137. Alternatively, one of the replica databases, such as network subscriber data replica database 2872 may perform analyses on this usage data and then pass the results back to MIND database 137. In this fashion, two-way communication is contemplated between MIND database 137 and replica databases 135, 2872, and 2884.

In a further embodiment of the present invention, updates to data fields of the MIND database 137 may be replicated to replica databases 135, 2872, and 2884 at or near real time. Network databases such as the MIND database 137 and replica databases 135, 2872, and 2884, may also provide for automated management, for example, via a simple network management protocol.

Network data distributor database 2884, network subscriber data replica database 2872, and network subscriber data routing and validation database 135 may each be stored on a single database component or over multiple database components. In this manner, the infrastructure of the MIND database 137 may be similar to the infrastructure of the replica databases in that any database may be stored in a single component or over multiple components and tables. In an alternate embodiment, the replica databases, such as network subscriber data replica database 2872 may be stored on several different tables and databases distributed throughout the network.

Figure 29:
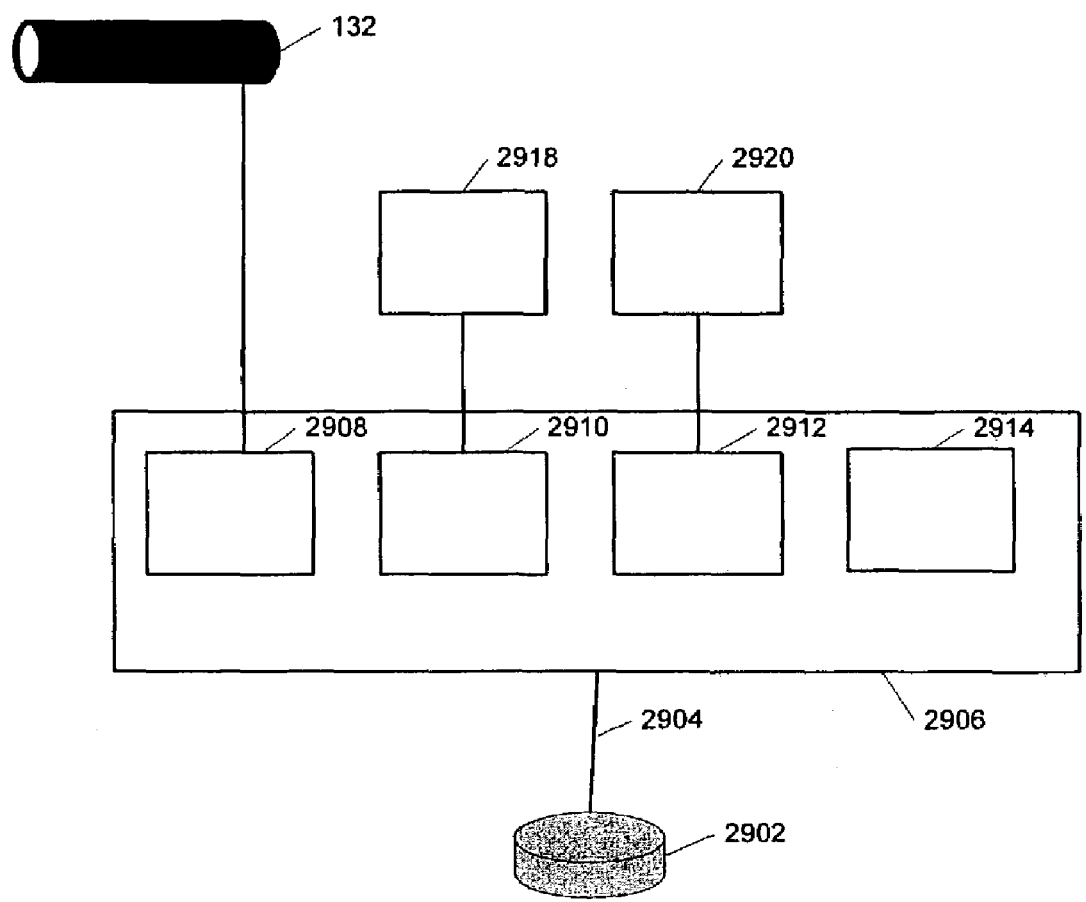
FIG. 29 illustrates the database business logic component of the messaging infrastructure in an exemplary embodiment consistent with the principles of the present invention.

FIG. 29 illustrates the database business logic component of the messaging infrastructure in an exemplary embodiment consistent with the principles of the present invention. In this example, database business logic 2906 can correspond to IT database business logic 2804, network database business logic adaptor 2828, network database business logic 2852, network database business logic 2864, or network database business logic 2876.

In one embodiment of the present invention, network database 2902 interfaces with database business logic 2906. Network database 2902, for example, could be a MIND database 137 or any one of the various replica databases, such as network subscriber data replica database 2872. Accordingly, network database 2902 may possess some of the same features of the MIND database 137, or the replica databases 2884, 2872, and 135 previously described.

Database business logic 2906 interfaces with network database 2902. Database business logic 2906, functionally, may contain various adaptors such as integration bus adaptor 2908, lightweight directory access protocol (LDAP) adaptor 2910, simple object access protocol (SOAP) adapter 2912, or any other network protocol adaptor 2914. In this example, database business logic 2906 communicates with backbone integration transport 2296 via integration bus adaptor 2908. Likewise, database business logic 2906 interfaces with an LDAP-based client 2918 via an LDAP adaptor 2910. Similarly, database business logic 2906 communicates with a SOAP client 2920 via a SOAP adaptor 2912.

In this manner, database business logic 2906 may be able to accommodate multiple adaptors for various applications or infrastructure elements. For example, the RAVE component may be able to access information stored in network database 2902 using an LDAP interface to the database. Any of a number of different existing protocols may be used in conjunction with database business logic 2906 via various adaptors such as the other protocol adaptor in 2914. For example, the CORBA protocol may be used in conjunction with database business logic 2906 with a CORBA adaptor (now shown).

In operation, the exemplary embodiment of FIG. 29 allows communication between various elements of the network architecture and network database 2902. For example, the RAVE entity or DART entity may be able to communicate with network database 2902 via network business logic 2906 and an appropriate adaptor such as LDAP adaptor 2910. In this manner, the RAVE entity, for example, may be an LDAP-based client 2918. The various adaptors contained in database business logic 2906, such as the SOAP adaptor 2912 can contain various communication rules in order to enable data transfer from network database 2902, for example, to a SOAP client 2920. In a further embodiment of the present invention, an adaptor, such as the SOAP adaptor 2912 may contain various business rules which would enable communication between a SOAP client 2920 and the network database 2902.

Figure 30B:
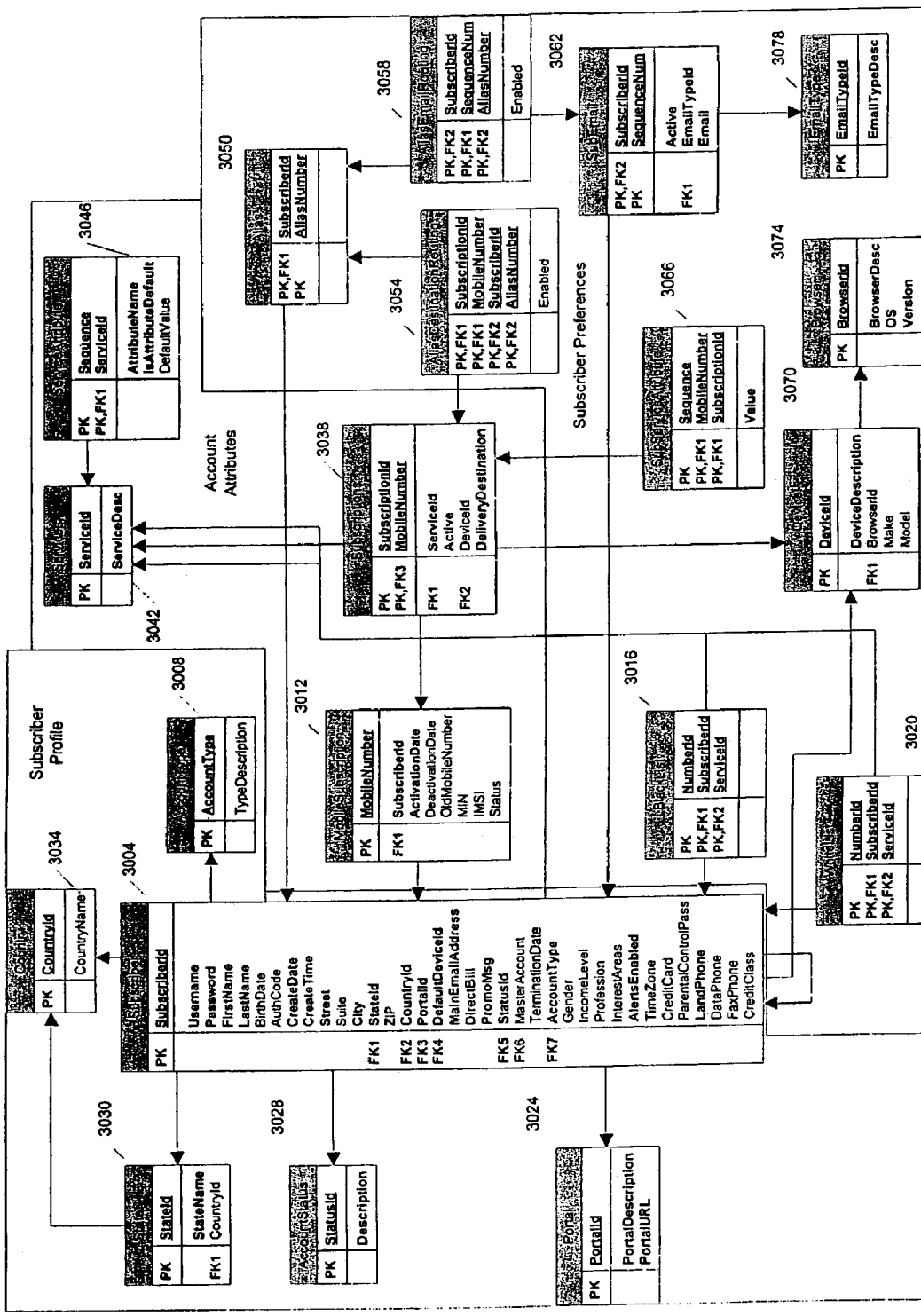
FIG. 30 depicts an exemplary embodiment of the MIND database in an exemplary embodiment consistent with the principles of the present invention.

FIG. 30 depicts an exemplary embodiment of the MIND database in an exemplary embodiment consistent with the principles of the present invention. In this example, a relational database comprises numerous tables each depicted by a box. Each of these tables contains information relevant to a wireless subscriber's profile. The title of the table is displayed in the gray area at the top of each box. In this example, the arrows depict the relationship among the tables, the abbreviation "PK" stands for primary key, and the abbreviation "FK" stands for foreign key. The relational data structure of FIG. 30 is intended to be an example as numerous other configurations are within the scope of the present invention.

In the example of FIG. 30, subscriber profile table 3004 stores personal information associated with a subscriber. This personal information, in this example, includes a username, a password, a subscriber's first name, a subscriber's last name, a subscriber's birth date, an authorization code, the date on which the account was created, the time at which the account was created, a street address, suite number, city, state, zip code, country, portal information, default device identification information, a main email address, direct billing information, promotional message information, status information, master account information, termination date, account type, gender, income, profession, personal interests, alerts information, time zone information, credit card information, parental control password information, land phone information, data phone information, fax phone information, and credit class information.

All or a subset of this information may be associated with a particular subscriber. Further, the data structure on which this personal information is stored is modifiable so that new information can be added, old information can be deleted, and information can be changed. In one example, a new field may be added to the subscriber profile table 3004. This new field (not shown) may then be populated with information specific to a subscriber using any convenient method. As noted previously, the data structure on which the example of FIG. 30 resides is scalable and modifiable.

A subscriber identification number, uniquely identifying a particular subscriber, is the primary key of the subscriber profile table 3004. This primary key, for example, is a string of characters that is associated with a subscriber. In this manner, each subscriber has a unique identification string that, for example, can serve as an account number. The foreign keys contained in subscriber profile table 3004 include a state identifier, a country identifier, a portal identifier, a default device identifier, a status identifier, a master account identifier, and an account type identifier. Each of these foreign keys reference a primary key of a separate table in the relational database structure of FIG. 30.

Account type table 3008 stores descriptive information about the various types of accounts provided by a wireless network provider. This information, for example, could include the various plan names, the rate structures, a standard quantity of air time, and other aspects of a particular type of wireless account. The primary key of account type table 3008, in this example, is an account type identifier. This account type identifier is also a foreign key in subscriber profile table 3004. Therefore, subscriber profile table 3004 references account type table 3008 for account type information.

Portal table 3024 stores portal information including a portal description and a portal URL address. The primary key of portal table 3024 is a portal identifier. This portal identifier, for example, is associated with a unique portal configuration. Other portal configurations would then have other unique portal identifiers associated with them. The portal identifier is also a foreign key in subscriber profile table 3004. Therefore, subscriber profile table 3004 references portal table 3008 for portal information.

Account status table 3028 stores account status information. The various account status types, in this example, are stored in account status table 3028. Each account status has an identifier associated with it. In this manner, the primary key of account status table 3028 is a status identifier. The account status identifier is also a foreign key in subscriber profile table 3004. Therefore, subscriber profile table 3004 references account status table 3008 for account status information.

A state table 3030 and a country table 3034 each store state and country information respectively. In one example, state table 3030 stores the names of each state associated with a particular country. State table 3030 has as its primary key a state identifier. Each state identifier can be associated with a state name. Likewise, in this example, country table 3034 has as its primary key a country identifier. Each country identifier can be associated with a country name. In one embodiment, state table 3030 has as its foreign key the country identifier. In this manner, state table 3030 references country table 3034 for country information. The state identifier and country identifier are also foreign keys in subscriber profile table 3004. Therefore, subscriber profile table 3004 references state table 3030 for state information and country table 3034 for country information.

Subscription table 3038 stores subscription information and has as its primary key a subscription identifier. In addition, subscription table 3038 may have a mobile number as a primary key. In this case, a mobile number or a block of mobile numbers may be associated with a particular subscription. Subscription table 3038, in this example, has as foreign keys a service identifier, a device identifier, and possibly a mobile number. Therefore, subscription table 3038 interfaces with services table 3042, device table 3070, and possibly mobile subscription table 3012 for information stored in those tables.

Mobile subscription table 3012 stores information about a mobile subscription. Mobile subscription table 3012 contains information about the activation date of a subscription, the deactivation date of a subscription, an old mobile number, a MIN, an IMSI, and status information. Mobile subscription table 3012 has as its primary key a mobile number which in this example is a unique identifier. Mobile subscription table 3012 has as a foreign key a subscriber identifier. In this example, the mobile subscription table 3012 references subscriber profile table 3004 for subscriber information.

In one embodiment of the present invention, services table 3042 stores information about services offered by a wireless subscriber. Services table 3042 has as its primary key a services identifier. Since subscription table 3038 has as its foreign key services identifier, subscription table 3038 references service table 3042 for service information.

In an example consistent with the principles of the present invention, service attribute table 3046 stores information about the attributes associated with a service. In this example, service attribute table stores information such as an attribute name, an attribute default, and a default value. Service attribute table 3046 has as its primary keys a sequence identifier and a service identifier. In this embodiment, the service identifier is also a foreign key so that service attribute table 3046 references services table 3042 for service information.

Device table 3070 stores information about various devices. In this case, device table 3070 contains information about the make and model of a device as well as a description of the various characteristics of that device. Device table 3070 contains a list of all possible devices used on a wireless network along with basic information about them. Device table 3070 has as its primary key a device identifier and has as its foreign key a browser identifier. Since subscription table 3038 and subscriber profile table 3004 have the device identifier as the foreign keys, these two tables reference device table 3070 for device information.

Blacklist table 3016 and white list table 3020 contain blacklist and white list information respectively. Each of these two tables has as primary keys a number identifier, a subscriber identifier, and a service identifier. In addition, the subscriber identifier and the service identifier are foreign keys in the blacklist table 3016 and white list table 3020. In this example, blacklist table 3016 and white list table 3020 reference subscriber profile table 3004 for subscriber information and services table 3042 for services information. The blacklist table 3020 may contain information relating to a subscriber's personal blacklists as well as a system-wide blacklist. In one embodiment of the present invention, a system-wide blacklist may reside in blacklist table 3016.

In one exemplary embodiment of the present invention, a browser table 3074 stores information about different browsers. For example, browser table 3074 contains browser descriptions, operating system descriptions, and browser versions. Browser table 3074 has as its primary key a browser identifier. Since device table 3070 has as its foreign key a browser identifier, device table 3070 references browser table 3074 for browser information.

Subservice attribute table 3066 stores subservice attribute information. Subservice attribute table 3066 has as its primary keys a sequence identifier, a mobile number, and a subscription identifier. Subservice attribute table 3066 has as its foreign keys a mobile number and a subscription identifier. In this example, subservice attribute table 3066 references subscription table 3038 for subscription information.

Alias table 3050 stores alias information. Alias information may include, for example, aliases that have been set up by a wireless subscriber. In this manner, a wireless subscriber, for example, may be able to configure aliases and associate alias names with devices or lists. Alias table 3050 has as its primary keys a subscriber identifier and an alias number. Alias table 3050 has as its foreign key a subscriber identifier. Alias table 3050 interfaces with subscriber profile table 3004 for subscriber information.

Alias destination routing table 3054 stores information about the routing destinations for an alias. Alias destination routing table 3054 has as its primary keys a subscription identifier, a mobile number, a subscriber identifier, and an alias number. These four identifiers are also foreign keys of alias destination routing table 3054. In this example, alias destination routing table 3054 references alias table 3050 for alias information and subscription table 3038 for subscription information.

Alias email routing table 3058 stores alias email routing information such as a routing enabled flag. In this example, alias email routing table 3058 has as its primary keys a subscriber identifier, a sequence number, and an alias number. These three primary keys also serve as foreign keys of alias email routing table 3058. In this manner, alias email routing table 3058 references alias table 3050 for alias information and sub email table 3062 for email information.

Sub email table 3062 stores email information. Sub email table 3062 has as its primary keys a subscriber identifier and a sequence number. Sub email table 3062 has as its foreign keys a subscriber identifier and an email type identifier. In this example, sub email table 3062 references subscriber table 3004 for subscriber information and email type table 3078 for email type information.

Email type table 3078 stores information about the type of an email. Email type table 3078 has as its primary key an email type identifier.

Referring now to Table 1, a more detailed explanation of various data fields that may appear in the MIND is depicted.

TABLE 1

| | Ref ID | Field Name | Example | Required at time of initial Registration? | Customer Proprietary |
|---|---|---|---|---|---|
| | 1. | Username | asmith | Yes | N |
| | 2. | Password | 1234 | Yes | Y |
| | 3. | Signed Up for DirectBill | Y/N | Yes | N |
| | 4. | Signed Up for Promotional Messages | Y/N | Yes | N |
| | 5. | Account Status (Active, Suspended, Closed) | Active | Yes | N |
| | 6. | Unique Account Identifier | A11b25s | Yes | N |
| | 7. | Account Number | 12345 | Yes | N |
| | 8. | Sub-Account Number (if applicable) | 9876 | Yes | N |
| | 9. | Account Type (Postpaid, Prepaid, Reseller, Corporate) | Post | Yes | N |
| | 10. | Rate Plan | CH 300 | Yes | N |
| | 11. | Feature Codes per Device | IM06 | Yes | N |
| | | IM Y/N-if Y, what code | IM03 | | |
| Account | | WAP CSD Y/N-if Y, what code | | | |
| Info | | WAP GPRS Y/N-if Y, what code | | | |
| | 12. | Service Activation Date | Jan. 01, 2001 | Yes | N |
| | 13. | Service Termination Date (if applicable) | | Yes | N |
| | 14. | Billing Cycle Date | 14 | Yes | N |
| | 15. | Credit Class Code = Spending Limit | A | Yes | Y |
| | 16. | Language | English | Yes | N |
| | 17. | Provisionable Classes of Service (Games, Ringtones, Promo Messages, etc . . .) (Replaces TCOS & OCOS) | Games Y/N Ringtones Y/N | No | N |
| | 18. | Parental Control Password | | No | Y |

TABLE 1-continued

| Section | Ref ID | Field Name | Example | Required at time of initial Registration? | Customer Proprietary |
|---|---|---|---|---|---|
| | 19. | Default Portal Selection (General, Spanish, Youth, Business, etc . . .) | General | Yes | N |
| Per Device | 20. | Device Type | RIM 950 | Yes | N |
| | 21. | Network Type | GSM, GAIT, TDMA, etc. | Yes | N |
| | 22. | Prepaid account server | | | |
| | 23. | Prepaid account server version | | | |
| | 24. | MSISDN/MDN Ported Number (if applicable) | 404-401-1234 | Yes | N |
| | 25. | IMSI/MIN | 11009060125 | Yes | N |
| | 26. | ESN | 11008914714 | Yes | |
| | 27. | SIM Version | GAIT, GSM SIM Tool, 16 k, 32 k, etc | Yes | N |
| | 28. | RIM User's Name (CI) (could be one of the aliases) | annsmith | Yes | N |
| | 29. | MAN/PIN (CI) | 15775065 | Yes | N |
| | 30. | Account Number (CI) | 1234567 | Yes | N |
| | 31. | Account Type (CI) | Enterprise | Yes | N |
| | 32. | Operating System (CI) | 2.0.13 | Yes | N |
| | 33. | Memory (CI) | 4 M | Yes | N |
| | 34. | ESN/MSN (CI) | 031/15/130066 | Yes | |
| | 35. | Domain/Closed User Group (CI) | @imcingular.com | Yes | N |
| | 36. | Device Schedule | Mobitex | No | |
| | 37. | Device Make | Nokia | Yes | N |
| | 38. | Device Model | 7160 | Yes | N |
| | 39. | Device-Version | 1.04 | No | N |
| Per Device | 40. | Device Email Address | 4044011234@mobile.mycingular.net | No | N |
| | 41. | IP Address (GPRS) | | No | N |
| | 42. | Password Validation Required on Originator (distribution list access) | Y | No | N |
| | 43. | Password for distribution list access (one for each list) | ******** | No | Y |
| | 44. | Destination Email Address | Annie@aol.com | No | N |
| | 45. | Destination Label | | No | N |
| Per Destination | 46. | Customer's POP Server List | Mail.atl.bellsouth.net | No | N |
| | 47. | Alerts Disabled? | Y/N | No | N |
| | 48. | My Time Zone | EST | No | N |
| | 49. | Distribution Lists (one for each list) | PaulConst, PaulMaint | No | N |
| | 50. | Alias (one for each list) | Annie | No | N |
| | 51. | User Defined "Blacklist" | Aol.com, xyz.com, suebex939@hotmail com, 4045551111, 7705555 | No | N |
| Messaging Attributes | 52. | User Defined "Whitelist" | Sam123@Aol.com, all mobiles | No | N |
| | 53. | Previous mobile number (due to a number change) | 404555123444 | No | N |

Table 1 is intended only as an example as various other data fields may also be included in the MIND. Moreover, numerous arrangements of these data fields are well within the scope of the present invention. In Table 1, a field name is provided along with an example. In addition, a "customer proprietary flag" as well as "a may be used at the time of initial registration flag" is associated with each field name. Other flags may also be associated with the field names. In a further embodiment of the present invention, other field names may also be added or deleted from the MIND. In this manner, the MIND is flexible, scalable, and adaptable to meet various changes in a wireless network. A further embodiment of the present invention may simply comprise a field name without any associated flag.

The example of Table 1 may be divided into four different sections: account information, device information, network address information, and messaging attributes. The fields that make up the account information in the MIND may have one row per subscriber. There may be multiple rows for each device type and each destination address belonging to a subscriber, all of which could be in separate tables. A subscriber record, which may stretch across several database tables, could be, for example, from 2,000 to 5,000 bytes.

In the exemplary embodiment of Table 1, a Username 01 stored in a first field of the MIND uniquely references a particular wireless customer. In this embodiment of the present invention, a user name is may be used at the time of initial registration and is not customer proprietary. In addition to a Username 01, a Password 02 may also be may be used at the time of initial registration and, in this example, is customer proprietary. The Username 01 and Password 02 stored in the MIND may be used by all applications in a wireless network. In this manner, a wireless customer may conveniently have one user name and password to use across all wireless applications.

A field entitled "Signed up for DirectBill" 03 may also be stored in the MIND. In this example, the field, "Signed up for DirectBill" 03, is a yes/no field, may be used at the time of initial registration, and not customer proprietary. Similarly, a field entitled "Signed up for Promotional Messages" may also be stored in the MIND. This field, in this example, is a yes/no field, may be used at the time of initial registration, and is not customer proprietary. The "Signed Up for DirectBill" field 03 indicates whether or not a wireless subscriber is in a direct billing program. Likewise, the "Signed up for Promotional Messages" field 04 indicates whether or not a wireless subscriber wishes to receive promotional messages. In this embodiment of the present invention, these two fields, as well as many of the other fields in the MIND, may be configurable by a wireless subscriber. In this manner, a wireless subscriber may be able to alter various fields stored in the MIND database.

In the example of the present invention depicted in Table 1, an "Account Status" field 05, stored in the MIND, may indicate whether a wireless subscriber's account is, for example, active, suspended, or closed. The "Account Status" field 05 may be used at the time of initial registration and may not be customer proprietary.

In one embodiment of the present invention, three fields may be used to identify a particular subscriber's account. Fields entitled "Unique Account Identifier" 06, "Account Number" 07, and "Subaccount" 08 may be stored in the MIND. Each of these three fields may be used to identify a particular account. In this example, each of these fields is used at the time of initial registration, and none of them are customer proprietary.

In one example, a field entitled "Account Type" 09, stored in the MIND database, may indicate whether a subscriber's account, for example, is post paid, pre-paid, reseller, or corporate. In this manner, the "Account Type" field 09 and the "Account Status" field 05 may only accept one of a limited number of possible responses. In this example, this field is used at the time of initial registration and is not customer proprietary.

In one embodiment, a field entitled "Rate Plan" 10, stored in the MIND database, indicates the particular plan under which a wireless subscriber participates. Further, a field entitled "Feature Codes Per Device" 11 may also be stored in the MIND. Like the "Rate Plan" field 10, the "Feature Codes Per Device" field 11 may be may be used at the time of initial registration and may not be customer proprietary. The "Feature Codes Per Device" field 11, for example, indicates whether a wireless subscriber is signed up for instant messaging and, if so, what type of instant messaging code should be used. In addition, the "Feature Codes Per Device" field 11 may also indicate a particular wireless application protocol, such as, for example, general packet radio service, associated with a particular wireless subscriber profile. In this example, these fields are used at the time of initial registration and are not customer proprietary.

In one embodiment of the present invention, three fields may accept date codes. The "Service Activation Date" field 12, "Service Termination Date" field 13, and "Billing Cycle Date" field 14 may contain the dates applicable to a particular wireless subscriber. In this example, these fields are used at the time of initial registration and are not customer proprietary.

A "Credit Class Code" or "Spending Limit" field 15, stored in the MIND, may also be associated with a particular wireless subscriber. This field can indicate credit information about a particular wireless subscriber and may also establish preset spending limits. A "Credit Class Code" field 15 may be altered only by a wireless provider. In this manner, some of the fields of this example may be changed by a wireless subscriber or end user while other fields of this example may only be altered by a wireless network administrator. The "Credit Class Code" field 15 may also be customer proprietary.

A "Language" field 16, stored in the MIND, may indicate a particular language associated with a wireless customer. As indicated in the example of Table 1, this field is used at the time of initial registration and is not customer proprietary.

In a further example, a field entitled "Provisional Classes of Service" 17, stored in the MIND, can be associated with various games and ringtones. In this example, this field is not used at the time of initial registration and is not customer proprietary.

A "Parental Control Password" field 18, stored in the MIND, in this example, can be used by a parent to control a child's access to a wireless device. For example, certain aspects of wireless communication associated with a wireless device may require a parental control password. In this manner, a parent can prevent a child or any other unauthorized user from participating in certain types of communications. In this example, the "Parental Control Password" field 18 may be used at the time of initial registration, but, like Password field 02, is customer proprietary.

In the example of Table 1, "Default Portal Selection" field 19, stored in the MIND, indicates a portal associated with a particular wireless device. "Default Portal Selection" 19 may be used at the time of initial registration, but is not customer proprietary.

In one example, a "Device Type" field 20, stored in the MIND, indicates the particular type of device that a wireless subscriber is using in a wireless network infrastructure. A particular wireless subscriber may have many devices which he uses within a wireless network architecture. A wireless subscriber may have a telephone device as well as a separate text device, both of which are used in a wireless infrastructure. In such a case, a particular user may have multiple device types associated with his profile. Each device may have a unique profile associated with it. In this manner, each device may have a certain set of fields in the MIND. In one embodiment of the present invention, different devices associated with different device types, for example, may have different rate plan structures, account numbers, or other information associated with them. In another aspect, two different devices may share the same account number, rate plan, and other user information.

In the example of Table 1, a "Network Type" filed 21 may be stored in the MIND. The "Network Type" field 21 indicates a particular network protocol, such as GSM, GAIT, or TDMA. In this example, this field is used at the time of initial registration and is not customer proprietary.

Fields entitled "Prepaid Account Server" 22 and "Prepaid Account Server Version" 23 may also be stored in the MIND. In this example, these fields store information about prepaid aspects of a subscriber's account.

In one embodiment of the present invention, "MSISDN/MDN" field 24 indicates the mobile directory number for a particular device. "IMSI/MIN" field 25 indicates the international subscriber mobile identity or the mobile identification number of a particular device associated with a wireless subscriber. "ESN" field 26 indicates the electronic serial number of a wireless device. "SIM Version" field 27 describes the subscriber identification module type for a particular wireless device used in the wireless network. "RIM User's Name" field 28 indicates a user name associated with a wireless subscriber. For example, this user name could be one of the wireless subscriber's aliases. "MAN/PIN" field 29 indicates the metropolitan area network and personal identification number associated with a particular wireless device or wireless subscriber. In one embodiment of the present invention, each of these field names is associated uniquely with a single wireless device. In this manner, a single field name may be may be used for each wireless device. All of these fields, in this example, are used at the time of initial registration and are not customer proprietary.

A second "Account Number" field 30 may also be stored in the MIND. Associated with this account number, for example, can be an "Account Type" field 31. The "Account Type" field 31, for example, can indicate a particular account to which a wireless user subscribes. An "Operating System" field 32 and "Memory" field 33 may describe various aspects of a particular wireless subscriber's device or account. Each of these four fields, in this example, are used at the time of initial registration and are not customer proprietary.

"ESN/MSN" field 34 also describes various aspects of a customer's account. In this example, "ESN/MSN" field 34 stores serial number information associated with a device. In this example, this field is used at the time of initial registration and is not customer proprietary.

In this example, "Domain" field 35, stored in the MIND, associates a particular user or a particular device with a standard domain name. In this example, a user's domain is IMcingular.com. This domain may be used to associate a particular user with a particular e-mail address. In addition, a particular domain and its associated domain name address can facilitate communication between a web-based application and a wireless device. In one aspect of the present invention, a wireless subscriber may be able to send text messages from his cellular telephone to a second person at a destination e-mail address. The "Domain" field 35 may also be used in aliasing.

In one embodiment of the present invention, a series of fields describes a particular device that is connected to a wireless network. In this example, "Device Schedule" 36, "Device Make" 37, "Device Model" 38, "Device Version" 39, and "Device E-Mail Address" 40 all describe various details about a particular device that a wireless subscriber uses on a wireless network infrastructure. In this example, the "Device Schedule" field 36 indicates a particular protocol such as Mobitex for use with a particular device. The "Device Make" field 37 and "Device Model" field 38 indicate the make and model of a wireless device used on a wireless network. A "Device Version" field 39 further defines the type of device. "Device E-Mail Address" 40, in this example, is a particular e-mail address associated with a certain device. Like the "Domain" field 35, "Device E-Mail Address" 40 can be used in e-mail communications. In this manner, a person at a computer can send an e-mail over the Internet to a wireless device. In this example, "Device Schedule" 36, "Device Version" 39 and "Device E-Mail Address" 40 are not may be used at the time of initial registration and are not customer proprietary. "Device Make" 37 and "Device Model" 38, in this example, are used at the time of initial registration and are not customer proprietary.

A field entitled "IP Address" field 41, in this example, stores a GPRS address associated with a device. In this example, this field is not used at the time of initial registration and is not customer proprietary.

A field entitled "Password Validation Required on Originator" 42, stored in the MIND, in this example, is a Boolean data field. This data field indicates whether a password is may be used for a certain application. The "Password Validation Required on Originator" field 42 is not used at the time of initial registration and is not customer proprietary. A field entitled "Password for Distribution List Access" 43, stored in the MIND, contains a user-defined password. The storage capacity of field 43 can be limited to a specific number of characters. In this example, the "Password for Distribution List Access" field 43 can be compared to a password entered by a wireless subscriber. If the passwords match, then the wireless subscriber is allowed access to a distribution list. This field 43, in this example, is not used at the time of initial registration, but, like "Password" field 42, is customer proprietary.

Destination E-Mail Address field 44 and Destination Label field 45, in this example, store information about a particular destination. In this example, these fields are not used at the time of initial registration and are not customer proprietary.

In this example, a field entitled "Customer's POP Server List" 46, stored in the MIND, describes a post office protocol mailing list which can be defined by a wireless subscriber. In this example, the "Customer POP Server List" field 46 is not used at the time of initial registration and is not customer proprietary.

An "Alerts Disabled" field 47, stored in the MIND, indicates whether alerts are disabled on a particular wireless device or on a particular wireless account. In this example, the "Alerts Disabled" field 47 can only contain a yes or a no. In this manner, the Alerts Disabled data field can be implemented with a single bit.

In the exemplary embodiment of Table 1, "My Time Zone" field 48, stored within the MIND, indicates the particular time zone with which a wireless device or user is associated. In one aspect of the present invention, a separate "My Time Zone" field 48 can be associated with each wireless device belonging to a single wireless subscriber. Alternatively, a single "My Time Zone" field 48 may be associated with a single wireless subscriber. In this example, the My Time Zone field 48 is not used at the time of initial registration and is not customer proprietary.

In an exemplary embodiment, "Distribution Lists" data field 49 can contain a single distribution list for each field. In this manner, multiple distribution list data fields may be provided in order to enable a wireless subscriber to store multiple distribution lists in the MIND. As is commonly known, a distribution list is simply a list of destinations or addresses associated with a particular key word to enable a wireless subscriber to send a message to multiple destinations. In this example, "Distribution List" field 49 is not may be used at the time of initial registration and is not customer proprietary. In addition, "Distribution List" field 49 can be configured by a wireless subscriber.

An Alias field 50, stored in the MIND, indicates an alias name associated with a wireless subscriber. In this example, the Alias field 50 is a messaging attribute that is associated, for example with a list. In this manner, a list can have an alias associated with it. In this example, this field is not used at the time of initial registration and is not customer proprietary.

In this example, a "User Defined Blacklist" field 51 and a "User Defined White list" field 52 may also be stored in the MIND. "User Defined Blacklist" field 51, in this example, contains a list of devices or addresses with which a wireless subscriber does not wish to communicate. In this manner, a wireless subscriber can black list a group of addresses so that he will not receive any incoming messages from those particular addresses. In a further embodiment of the present invention, a single wireless subscriber may have more than one black list defined. In this case, a wireless subscriber may have multiple "User Defined Blacklist" fields 51. Similar to the "User Defined Blacklist" 51, the "User Defined White list" field 52, in this example, contains a list of addresses or people with which a wireless subscriber wishes to communicate. The addresses or people contained in a "User Defined White list" field 52 for a particular wireless subscriber, for example, may receive preferential treatment with regard to various communications. In this example, both the "User Defined Blacklist" field 51 and the "User Defined White list" field 52 are not used at the time of initial registration and are not customer proprietary.

In an exemplary embodiment, a field entitled "Previous Mobile Number" 53, stored in the MIND, may contain a prior phone number for a wireless subscriber. In this manner, when a wireless subscriber changes phone numbers, he can have his previous mobile number stored in data field "Previous Mobile Number" 53. Data field "Previous Mobile Number" 53, in this example, is not used at the time of initial registration and is not customer proprietary.

Many of the fields contained in the MIND, previously listed, can be configured by a wireless subscriber. In this manner, a wireless subscriber has access to the MIND and also may edit or change various fields. As such, a customizable user profile may be comprised of the various data fields of the MIND. A wireless subscriber, for example, can alter the contents of the "User Defined Blacklist" field 51, the "User Defined White list" field 52, as well as various other fields previously mentioned.

In one embodiment of the present invention, a wireless subscriber can change the various fields of the MIND via different devices. For example, a wireless subscriber may be able to change a field with a wireless device, a computer terminal connected to the Internet, or a standard telephone. Many other avenues may also be used to change the various fields of the MIND. For example, a wireless subscriber may be able to change his profile by changing fields in the MIND via an Internet connection and web page.

Employing various user configurable fields of the MIND, a wireless subscriber may be able to create and edit personal aliases. Each alias may define a destination address and may provide the ability for the subscriber to manage message delivery. In addition, a wireless subscriber may be able to define distribution lists, filtering lists, such as white and black lists, and auto-reply lists.

Using various fields of the MIND previously described, a user-defined profile may allow for the definition of multiple handsets or devices. A user profile, comprising information contained in various fields previously described, may support destination address translation and number portability. The user defined profile may also support a set of messaging applications such as, web-to-mobile, mobile-to-mobile, mobile-to-web, numeric, or promotional messages. In a further embodiment of the present invention, the user-defined profile may support the customization and linking of services offered to subscribers. A subscriber may be able to set up advanced features in his profile, such as relaying messages to more than one mobile device or other messaging destination such as an e-mail account.

In a further embodiment of the present invention, a user-defined profile assembled from the previously mentioned fields may hold a set of canned messages or automatic replies. The subscriber may be able to opt out of or opt into promotional messages. In addition, a wireless subscriber may also be able to block messages by categories. For example, the subscriber may be able to choose to block all incoming mobile messages to avoid incurring fees.

In a further embodiment of the present invention, new services can be provisioned at or near real time by registering appropriate information in a subscriber profile contained in the MIND or in one of its replicas. For example, a wireless subscriber can sign up for additional services simply by changing the contents of various fields contained in the MIND.

The depiction of Table 1 is merely an example of one embodiment of the present invention. Many other fields and combinations of fields can be envisioned and are within the scope of the present invention. In addition, the present invention contemplates the use of these various data fields to configure user profiles in many different manners.

The MIND database can be implemented in many different ways consistent with the principles of the present invention. For example, the MIND database may reside in a magnetic storage medium resident on a computer. The MIND database may be implemented with currently available software database products developed by software companies such as Oracle. In one embodiment of the present invention, the MIND database may be distributed over many different computers or many different individual database products. In this manner, individual computers or databases may be networked together to form the MIND database. In this embodiment, a central controller may be implemented in order to manipulate the individual computers or databases. In a further embodiment of the present invention, the MIND database may reside on an optical storage device such as a compact disc or series of compact discs. In general, the MIND database may be implemented in any convenient storage media.

One embodiment of the MIND database consistent with the principles of the present invention may be horizontally scalable so that a data processor on which the database resides may be expandable. Further, the MIND database may be vertically scalable so that more data processor units can be added to the location of the database. Exemplary embodiments of the MIND consistent with the principles of the present invention may be scalable to the order of tens of millions of customer profiles in terms of space and in terms of speed. In one embodiment of the present invention, the MIND may be able to provide access to data only through published application programming interfaces. These scalable features of the MIND database may be implemented with currently available technology known to those skilled in the art.

Operation of the MIND

Figure 31:
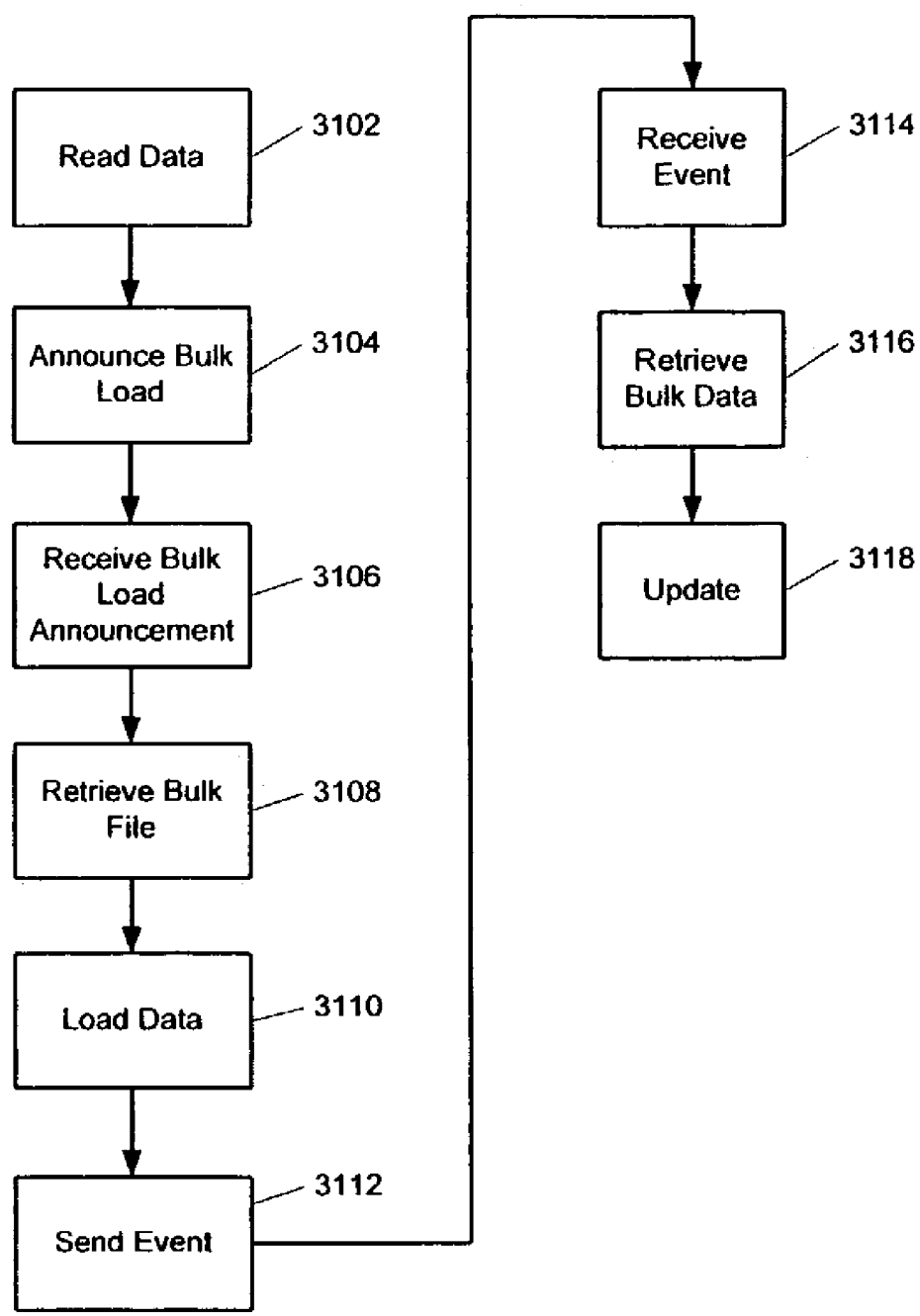
FIG. 31 illustrates a flow chart of a bulk load operation performed by the MIND in an exemplary embodiment consistent with the principles of the present invention.

FIG. 31 illustrates a flow chart of a bulk load operation performed by the MIND in an exemplary embodiment consistent with the principles of the present invention. In the example of FIG. 31, the flow chart depicts a bulk load of data contained in a central MIND database 137 into various replica databases, such as network data distributor database 2884.

In the embodiment of the present invention depicted in step 3102, the bulk load process may be initiated by IT database business logic 2804. For example, the IT database business logic 2804 may read all the data from the MIND database 137 or other database and create a data abstract file. This data abstract file can represent all or a portion of the data subject to the bulk load operation. The data of the bulk load operation, for example, can be stored in the MIND database 153 or may be stored in some external data storage device (not shown).

As depicted in exemplary step 3104, the IT database business logic 2804 announces that the bulk load data is available. In this example, this announcement is made to provisioning system 2808, through backbone provisioning transport 2816 and to network database business logic adaptor 2828. The announcement may then be transmitted through backbone integration transport 132, network database business logic 2876, and to network data distributor database 2884. Alternatively, IT database business logic 2804 may communicate directly with network database business logic 2876 to alert network data distributor database 2884 of the bulk load event. In one embodiment, business logic, such as IT database business logic 2804, may publish on backbone integration transport 132 a message alerting network data distributor database 2884 to a bulk load. In this example, network database business logic 2876 subscribes to bulk load messages and receives the bulk load message. Network database business logic 2876, in this example, replies by publishing a message on backbone integration transport 132. Upon receipt of this reply by IT database business logic 2804, the bulk load process commences. Other various communication channels and paths are within the scope of the present invention.

As depicted in exemplary step 3106, network database business logic 2876 of network data distributor database 2884 receives the bulk load event. As depicted in exemplary step 3108, network database business logic 2876 retrieves the bulk file from a location specified in the bulk load event. Network database business logic 2876 may retrieve the bulk load data from the MIND database 137. Alternatively, network database business logic may retrieve the bulk load data from an external data store (not shown). In this example, after retrieving the bulk file, network data distributor database 2884 loads the data. The bulk file can either be loaded directly from its location to network data distributor database 2884 or, for example, via network database business logic 2876. In the lafter instance, bulk information may be routed through network database business logic 2876 and then loaded into network data distributor database 2884.

As depicted in exemplary step 3112, network database business logic 2876 announces a bulk load event to other replica databases, such as network subscriber data replica database 2872. This announcement may be transmitted to network database business logic 2864, which may control network subscriber data replica database 2872. In this manner, the announcement may proceed from network database business logic 2876 to backbone integration transport 132 and then to network database business logic 2864. In an alternate embodiment of the present invention, the business rules and protocol handling that is contained in network database business logic 2876 may be contained directly in network data distributor database 2884.

Likewise, other business rules and protocol rules may also be contained within replica databases such as network subscriber data replica database 2872. In this alternate embodiment of the present invention, a direct link may be achieved from a bulk load data source or, for example, the MIND database 137 to network data distributor database 2884 and replica databases such as network subscriber data replica database 2872. In this example, the announcement of the bulk load event transmitted by network database business logic 2876 to network database business logic 2864, for example, can indicate the location of the bulk data.

As depicted in exemplary step 3114, network database business logic 2864 receives the bulk load event with the location of the bulk load data. Likewise, other replica network database business logic entities also receive the bulk load event and the location of the bulk load data. For example, network database business logic 2852 which is associated with network subscriber data routing and validation database 135 may also receive the bulk load event along with the location of the bulk load data. The transmission of this event notification, for example, may be done in parallel to all replica databases at the same time, to databases sequentially, or in any convenient order. For example, it may be preferable that network subscriber data replica database 2872 receives data before network subscriber data routing and validation database 135. If this is the case, then network database business logic 2876 would first transmit the bulk load event information to network database business logic 2864 and then transmit that bulk load event to network database business logic 2852. In this manner, network subscriber data replica database 2872 could receive its bulk load update before network subscriber data routing and validation database 135.

As depicted in exemplary step 3116, each replica database then retrieves the bulk data. The network database business logic associated with the replica database may be responsible for retrieving the bulk load data. For example, network database business logic 2864 may retrieve the bulk load data for network subscriber data replica database 2872. The replica databases are then updated with the bulk data as depicted in exemplary step 3118. In this manner, network subscriber data replica database 2872 would be updated with the bulk data.

In the example of FIG. 31, replica databases are replicated first from network data distributor database 2884 which is replicated from the MIND database 137. In this fashion, data stored in the MIND database 137 is first propagated to network data distributor database 2884. Network data distributor database 2884 then distributes the data to replica databases, such as network subscriber data replica database 2872. In an alternate embodiment of the present invention, the updating process can be performed in parallel. In this manner, the data from the MIND database 137 can be transferred in parallel to all replica databases, including network data distributor database 2884, network subscriber data replica database 2872, and network subscriber data routing and validation database 135.

In yet a further embodiment of the present invention, data contained in an external data storage device may be first sent to the MIND database 137 and then to the replica databases, 135, 2884, and 2872, in any order. The present invention also contemplates parallel update of the MIND database 137 and the replica databases 153, 2872, and 2884. In this manner, all databases throughout the system may be updated from an external source at the same time.

Network data distributor database 2884 may contain a subset of all customer information contained in the MIND database 137. All additions, updates, and deletions to a customer profile may be made, for example, on the MIND database 137. The MIND database 137 may then propagate the changes to the network data distributor database 2884. The network data distributor database 2884 may contain a master set of all files in the network. All network elements, such as the RAVE and the DART, may access the information stored in the network data distributor database 2884 via replicated database nodes located in close proximity to the network element itself. These database replicas, such as network subscriber data replica database 2872 and network subscriber data routing and validation database 135 may contain only a subset of the data in the network data distributor database 2884. Likewise, network data distributor database 2884 may contain only a subset of the data contained in the MIND database 137.

Figure 32:
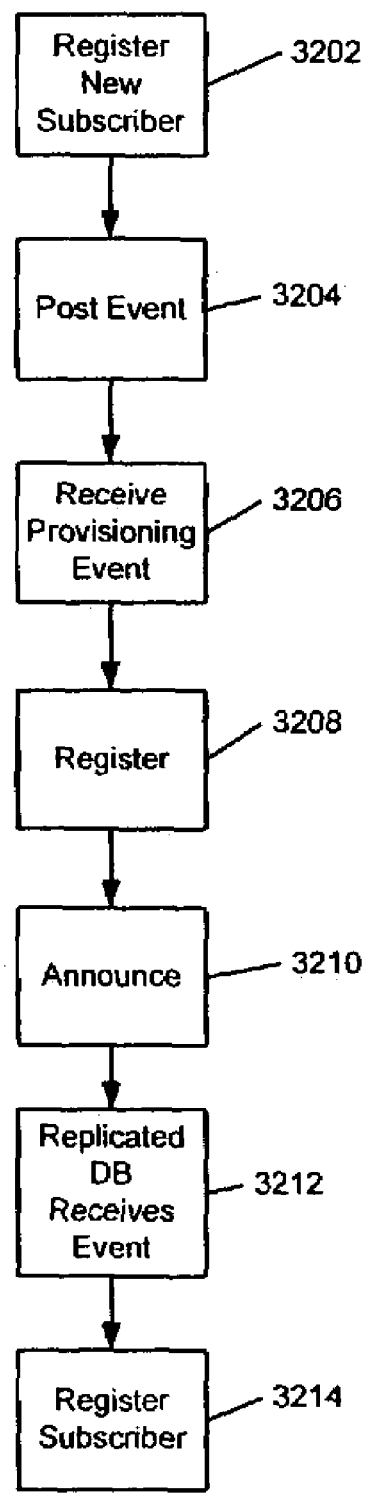
FIG. 32 depicts an incremental update of data contained in the databases of the infrastructure in an exemplary embodiment consistent with the principles of the present invention

FIG. 32 depicts an incremental update of data contained in the databases of the infrastructure in an exemplary embodiment consistent with the principles of the present invention. In this example, the databases are updated with a new wireless subscriber. As shown in the example of FIG. 32, an activation channel registers a new subscriber 3202. A subscriber can be registered, for example, via web interface 2812. In this manner, wireless subscriber 2858 may register for wireless service via web interface 2812. The registration information for the new wireless subscriber may then be passed via IT database business logic 2804 into the MIND database 137. Alternatively, a customer representative of the wireless carrier may input the data for the new wireless subscriber into MIND database 137 in any convenient manner.

After the new data is received by the MIND database 137 the replica databases may need to be updated. In step 3204, provisioning system 2808 posts an event stating that a new subscriber has been registered. This event may originate in provisioning system 2808 or may be a function of the MIND database 137 or the IT database business logic 2804. For example, when a new subscriber's data is stored in the MIND database 137, the MIND database 137 may initiate a process via IT database business logic 2804 and provisioning system 2808 to update replica databases such as network subscriber data replica 2872. Alternatively, the registration of a new wireless subscriber may initiate an update event in provisioning system 2808.

In the example of step 3206, network applications receive the provisioning event. The provisioning event may be transmitted to other network applications such as the DART or the RAVE via backbone provisioning transport 2816 and network database business logic adaptor 2828. Alternatively, the provisioning event may be transmitted directly to the various network entities such as the RAVE and the DART. In the example of FIG. 32, the provisioning event is transmitted from provisioning system 2808 via backbone provisioning transport 2816, network database business logic adaptor 2828, backbone integration transport 132, to network data business logic 2876. In an alternate embodiment of the present invention, the provisioning event may be transmitted from provisioning system 2808 to network database business logic 2876 in any convenient manner.

In the exemplary step of 3208, the network data distributor database 2884 registers the new subscriber. As previously described, the data for the new subscriber can be transferred from the MIND database 137 to the network data distributor database 2884. Alternatively, the network data distributor database 2884 may receive the new subscriber data from a separate data source.

As depicted in exemplary step 3210, the network application announces that a new subscriber has been registered. For example, network database business logic 2876 may announce to network database business logic 2864, or network database business logic 2828 that a new subscriber has been registered and his information has been stored in network distributor database 2884. This announcement may be transmitted from network database business logic 2876 via backbone integration transport 132 to network database business logic 2864. In an alternate embodiment of the present invention, the announcement that a new subscriber has been registered in network data distributor database 2884 or in the MIND database 137 can be made directly to network database business logic 2864 and/or network database business logic 2828.

In exemplary step 3212 of FIG. 32, the replicated databases receive the event. For example, network subscriber data replica database 2872 may receive an indication that a new subscriber is being registered on the wireless network. Likewise, network subscriber data routing and validation database 135 may also receive an indication that a new subscriber is being registered on the wireless network. This notification may be received directly from IT database business logic 2804, provisioning system 2808, MIND database 137, or from any other convenient source.

In exemplary step 3214 of FIG. 32, the subscriber is registered in replicated databases. In one embodiment of the present invention, the network subscriber data replica database 2872 and the network subscriber data routing and validation database 135 each receive data associated with the new wireless subscriber. In this manner, various fields contained within the replica databases 135 and 2872 may be created and/or updated. In one embodiment of the present invention, new data fields may be created in the network subscriber data replica database 2872 and the network subscriber data routing and validation database 135 for the new wireless subscriber. These new fields may then be populated with data about the new wireless subscriber. Likewise, network data distributor database 2884 may also be adapted to receive new data fields containing the data about the new subscriber.

In an alternative embodiment of the present invention, a wireless subscriber may register for a new network service. In this case, the MIND database 137 and the replica databases, 2884, 2872, and 135 may receive information about the new service to which the subscriber registers. This new information may be associated with existing subscriber data, such as a user name or password. In a further embodiment of the present invention, a wireless subscriber may wish to change certain aspects of his customer profile. For example, a wireless subscriber may want to change the password he uses for his account. Once the customer makes this change, the MIND database 137 may be able to propagate the change to various replicated databases.

Consistent with one possible embodiment of the present invention, the network data distributor database 2884 may remain identical to the MIND database 137. Changes to the MIND database 137 may then be reflected in the network data distributor database 2884 within, for example, one minute of those changes being applied to the master database. Similarly, changes to the network data distributor database 2884 may be reflected in the replica databases, such as network subscriber data replica databases 2872, within, for example, one minute of those changes being applied to the network data distributor database 2884. Other update times are within the scope of the present invention. Additionally, all the databases may be updated in real time in parallel.

Exemplary embodiments of the present invention may provide for contingency procedures to guarantee that the replica databases, such as network subscriber data replica database 2872, can be synchronized in the event of failures in the replication process. These contingency procedures may be automated. In this manner, the failure of a replica database to receive updated data may result in the implementation of an error correction routine. In addition, if a failure occurs, the wireless network architecture may provide for redundancy and error recovery.

In one embodiment of the present invention, new database replicas may be added and configured easily. For example, a replica subscriber database (not shown) may be added to the infrastructure. In this manner, the new database may be populated using a bulk load procedure previously described or an update procedure also previously described. The addition of replica databases, as well as the manipulation of existing replica databases allows for network scalability.

In a further embodiment of the present invention, sensitive customer information stored in MIND database 137 or replica databases, 2884, 2872, and 135 may be encrypted. Any number of existing encryption techniques can be used to preserve the security of customer information. Each subscriber profile attribute may be protected as indicated by an attribute property. The network database business logic, for example 2876, may then utilize that protection property flag to determine if that attribute can be modified or not. That protection property flag may be modified and the network database business logic, for example 2876, may then be able to react to that change by applying a new protection status to the subscriber attribute. In an alternate embodiment of the present invention, a network administrator may forbid a subscriber from changing certain aspects of his customer profile.

In one embodiment of the present invention, the process of updating replicated databases may be accomplished by caching data in some type of a short-term memory. For example, data about a wireless subscriber that is updated in the MIND database 137 may then be cached in some local storage accessible to the network data distributor database 2884. Likewise, data caching can be used in the previously-described data transfer methods in order to realize operational efficiencies.

Subscriber Configuration Interface

The Subscriber Configuration Interface (SCI) 165 supplies the framework to deliver network services, add new network services, and modify existing network services via a web interface. In one embodiment, SCI 165 provides network subscribers with the ability to manage and configure network services.

While the exemplary embodiment of FIG. 1 depicts only a single SCI 165, multiple SCIs may be employed with the present invention. For example, numerous SCIs may interface with one or more web interfaces. In this manner, a single web interface may support numerous SCIs. Likewise, in a further embodiment of the present invention, numerous web interfaces may interface with a single SCI, such as SCI 165. Many other permutations of network entities are within the scope of the present invention.

In the exemplary embodiment of FIG. 1, SCI 165, through network transport 125, RAVE 130 and integration transport 132 interfaces with UADB 140. In this embodiment, UADB 140 may contain, for example, customer aliases, White lists, Blacklists, distribution lists, language filters, message formatting options, vacation settings, and numerous other aspects of a subscriber's customer profile. In this manner, UADB 140, or one of its replicas, serves as a storage point for subscribers' preference profiles. In one embodiment of the present invention, the data contained in UADB 140 may be updated by subscribers via the web interface.

In another embodiment of the present invention, when a subscriber updates his preference profile through the web interface, UADB 140 may be updated at or near real time. For example, changes made by a subscriber through the web interface may be immediately written to UADB 140 or one of its replicas. If written to a replica of UADB 140, a master database (not shown) may then be updated from the replica of UADB 140. In a further embodiment of the present invention, a subscriber's update of his preference profile via the web interface may first be stored in a master database (not shown) and then replicated to UADB 140. Numerous other methods, described in other portions of this specification, may be used to update a subscriber's preference profile via the web interface. In yet another embodiment of the present invention, a subscriber's information, such as his preference profile, may be stored directly within SCI 165. Storage of configuration data within SCI 165 may be implemented through an integrated database, short term memory, long term memory, or any other convenient storage method.

In the exemplary embodiment of FIG. 1, LAMB 160 records transactions from SCI 165. Information about SCI 165 transactions may include, for example, time, date, originator information, transaction ID, destination information, message information, SCI functions accessed by the originator, errors, and any other function or process performed by SCI 165.

In one embodiment of the present invention, SCI 165 provides alarming and logging information to LAMB 160 via network transport 125. This alarming and logging information, for example, may be based upon the time of each transaction, the date of each transaction, the originator's IP address, the remote host name of the originator, the message ID of the transaction, destination addresses, validation results, message length, the message itself, total bytes sent not including headers, the time to complete the request, the status returned by the server, the status returned by other network entities, SCI functions accessed by the originator of the message, the last URL the subscriber was referred to by the SCI, errors, or any other convenient information.

In this manner, SCI 165 may publish on network transport 125 alarming and logging information. This alarming and logging information may then be received by LAMB 160 from network transport 125. Upon receipt of this alarming and logging information from network transport 125, LAMB 160 may then store, process, and operate on the alarming and logging information. LAMB 160, in a further embodiment of the present invention, may support centralized logging and alarming functions. Further, LAMB 160 may support real time or non-real time alarming and logging. In a further embodiment of the present invention, LAMB 160 may support variable debug levels.

The web interface, in the exemplary embodiment of FIG. 1, provides a web page with which both subscribers and non-subscribers may interact with SCI 165. In the example of FIG. 1, the web interface provides a common look and feel for those who access the web page. The web interface, for example, may include instructions on how to send and query web messages, instructions on how to configure a subscriber's preference profile, and instructions on how to create custom downloads. In a further embodiment of the present invention, the web interface may provide a subscriber with a web page that can be used to update and change a subscriber's preference profile. Further, the web interface may enable a subscriber or non-subscriber to send a web send message to a subscriber. Many other functions and instructions may be incorporated into the web interface and are within the scope of the present invention.

In the exemplary embodiment of FIG. 1, ARC 110*a* provides various translation functions. In this manner, ARC 110*a* may receive web send messages that are published by SCI 165 on network transport 125. Upon receiving these web send messages, ARC 110*a* may perform translation functions, for example, to transform a web send message into a common format for storage on MDS 175 or to transform a web send message into the proper format for transmission to a particular device.

Figure 33:
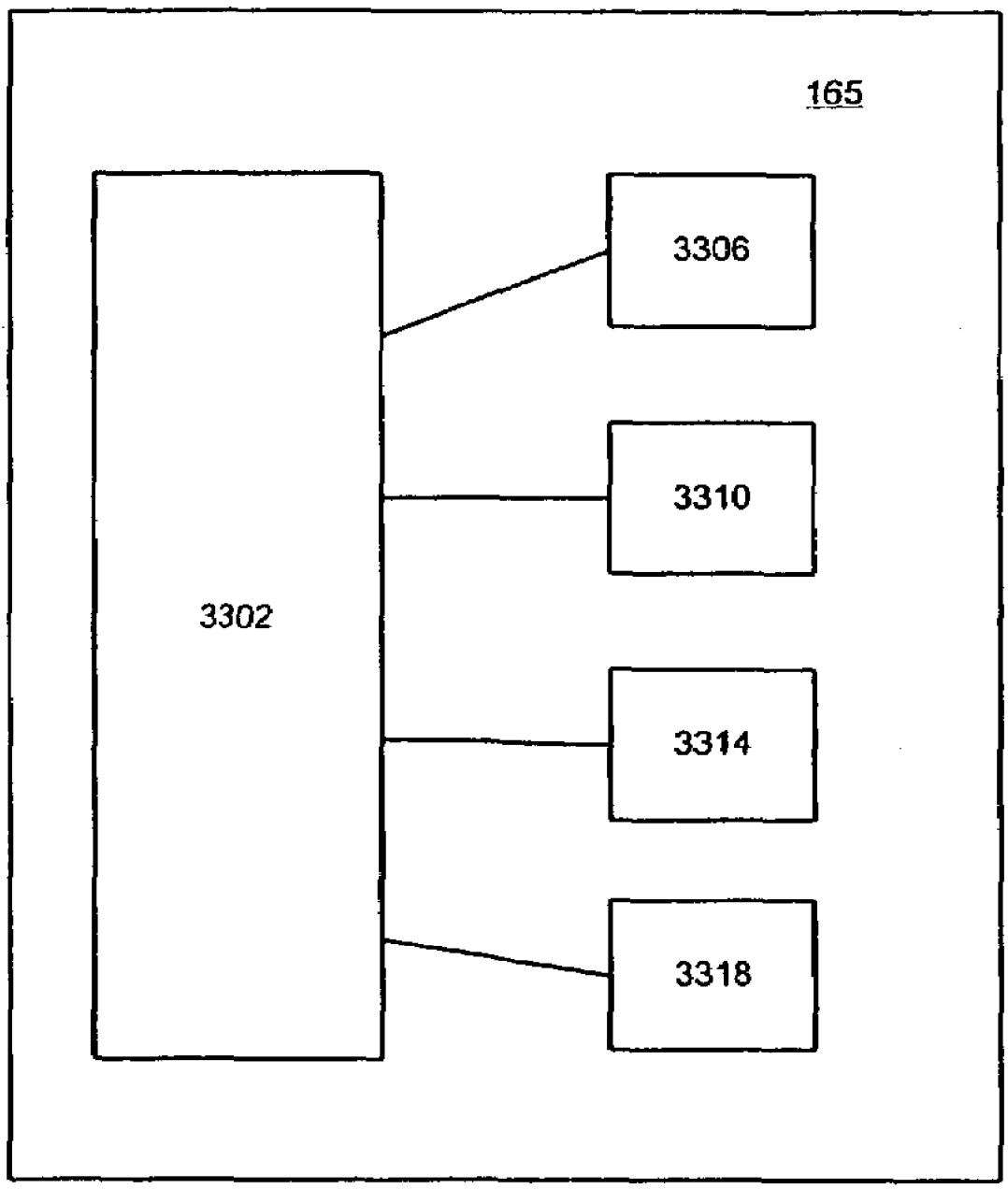
FIG. 33 illustrates an SCI in an exemplary embodiment consistent with the principles of the present invention.

FIG. 33 illustrates an SCI in an exemplary embodiment consistent with the principles of the present invention. In the example of FIG. 33, SCI 165 comprises portal interface 3302, send message logic 3306, query message logic 3310, configuration logic 3314, and create custom download logic 3318. In this example, portal interface 3302 is in communication with send message logic 3306, query message logic 3310, configuration logic 3314 and create custom download logic 3318. In addition, portal interface 3302, in this example, interfaces with a web interface (not shown).

In the exemplary embodiment of FIG. 33, portal interface 3302 provides a standard interface accessible by the web interface to provide subscribers with the ability to customize network services and send messages to data subscribers. In this example, portal interface 3302 allows a provider to enable a common look and feel for the web interface. Portal interface 3302 allows a single log-in and password for a particular subscriber and allows the web interface to incorporate network features such as send message, alias and distribution management, and White list and Blacklist pages.

In the exemplary embodiment of FIG. 33, portal interface 3302 as well as SCI 165 may serve up markup language content to an application protocol server to allow subscribers to access all of the features provided by SCI 165. In this manner, SCI 165 through portal interface 3302 may provide support for markup language content. In a further embodiment of the present invention, portal interface 3302 may automatically support older browsers and/or WAP access. In a further embodiment of the present invention, portal interface 3302 may support transport protocols, such as HTTP or HTTPS, to communicate with the web interface. Further, portal interface 3302 may support various markup languages, programming languages, and database protocols. For example, portal interface 3302 may support protocols such as LDAP or SMTP.

SCI 165, through its subcomponents such as portal interface 3302, may support various messaging protocols. For example, SCI 165, through its subcomponents such as portal interface 3302, may support short messaging service, interactive Mobitex messaging service, WAP subscriber validation, streaming services over GPRS or any other convenient service. Further, the embodiment depicted in FIG. 33 may support mobile terminated short messages originated by an operator. In this protocol, an operator based text messaging service allows a calling party to leave an alphanumeric message for a customer. This protocol can greet the calling party with a personalized message and then take an alphanumeric message of any length up to 160 characters on behalf of the customer and then deliver the message to the customer, for example, using SMS.

A further embodiment of the present invention may support mobile terminated short messages originated from a web page. This protocol allows submission of a short message, for example, up to 640 characters via a web page, such as the web interface, to a customer. In a further embodiment, SCI 165 may support mobile terminated short messages originated from a dial-up using Telocator Alphanumeric Protocol (TAP). This protocol allows submission of a short message, for example, up to 160 characters, via a modem pool to a customer. Numerous other protocols are supported by SCI 165 and portal interface 3302 and those listed here are merely examples.

SCI 165, and its subcomponents such as portal interface 3302, may support get and post methods. In a further embodiment of the present invention, SCI 165, and/or portal interface 3302 may support a load sharing interface that the web interface can use to provide adequate capacity and growth. Further SCI 165, through portal interface 3302, may include access to a stand alone home page with a navigation menu to each of the service configuration pages.

Send message logic 3306 allows an Internet user to access a standard "send a message" web page to create and send new messages to subscribers. In this manner, the "send a message" web page is accessible via the web interface. In a further embodiment of the present invention, send message logic 3306 allows a subscriber to access a class of service associated with a message. For example, data customers, such as SMS customers, Mobitex customers, GPRS customers and WAP customers, may be able to access the class of service associated with web send messages.

Send message logic 3306 may be displayed via the web interface to an Internet user. In this manner, the "send a message" web page appearing on the web interface may include various aspects of send message logic 3306. For example, fields in the "send a message" web page may include sender's name, sender's reply or notification address, sender's call back number, subject, message text, graphics symbols, passwords as required for a distribution list, future delivery time, recurring message based on time interval, and return delivery receipt request. Numerous other fields may be incorporated in send message logic 3306 and displayed on the web interface through a web page.

Send message logic 3306 may allow Internet users to create long messages that may include text, rich text format, and graphics within the text. Graphic symbols may be available on the "send a message" web page to drag into the message text itself. The capability of the device to receive this format may be handled by ARC 110 in the network.

In this example, once an Internet user enters the destination address in the appropriate field and changes to the next field to enter additional information, the destination address can be validated, and the device preference for the user or group can be determined. These preferences can then be used to customize other aspects of the "send a message" web page, such as enabling graphics mode, enabling validation of sender, and enabling message tracking. For example, SCI 165, upon receiving a destination address entered by an Internet user entered into the web interface, may publish that destination address on network transport 125. The destination address published on network transport 125 may then be received by RAVE 130. RAVE 130, through integration transport 132, may compare that destination address to addresses contained in UADB 140.

In this manner, RAVE 130 may perform validation functions on the destination address based on information contained in UADB 140. In addition, RAVE 130, through data contained in UADB 140, may be able to configure further aspects of the web send message from a subscriber's preference profile information contained in UADB 140. For example, if the destination address entered by an Internet user into the web interface corresponds to a subscriber whose information is stored in UADB 140, then RAVE 130 may access that subscriber's preference information, via integration transport 132, from UADB 140. RAVE 130 may then publish this subscriber's preference information on network transport 125. SCI 165 may receive this published information from network transport 125.

After receiving this subscriber's preference information, SCI 165 may then configure the "send a message" web page displayed on the web interface. In this manner, SCI 165 may be able to customize the "send a message" web page displayed on the web interface. This customized "send a message" web page displayed on the web interface can correspond to various preferences and information about a particular subscriber stored in UADB 140 or its replica. For example, SCI 165 may be able to determine the capabilities of the destination device based on the destination address and limit the message creation functionality of the "send a message" web page based on that device. In this manner, SCI 165, for example, may be capable of configuring web send messages for delivery to different device types such as TDMA/GSM, Mobitex, and other mobile devices using JAVA.

An Internet user submits a web send message through the web interface to a subscriber. Once a message has successfully been submitted, a cookie could be placed on the Internet user's browser which references this particular web send transaction. This permits the sender to obtain the status of a previously submitted web send message. The cookie can expire some time after the validity period of the web send message to allow the sender to check the last status of the message.

In this example, the cookie may allow the sender to track multiple messages to multiple recipients. The cookie may also allow the sender to view reply messages from the recipient. The cookie may be used to allow recipient replies to be returned to the method specified by the sender. The sender's specified methods may provide a convenient way to track messages sent to devices using an Internet device such as the web interface.

In an exemplary embodiment of the present invention, SCI 165 through the web interface, may provide an interface for Internet users to create, for example, rich text, pictures, animations, melodies, and sounds that can be attached to web send messages. Further, SCI 165, through its subcomponents such as portal interface 3302, may provide an interface for Internet users to generate downloadable multimedia files such as MIDI files to devices that support this feature. In this manner, SCI 165, as well as its subcomponents such as portal interface 3302, may provide support for any number of different data formats used with a web send message entered into the web interface.

In an exemplary embodiment of the present invention, SCI 165 submits web send messages to network transport 125. These web messages may be queued up in the network for transmission to the various subscribers. SCI 165 may provide the capability of specifying a future delivery time for these web messages. In such a case, these web messages can be delivered to mobile devices at the specified time. For example, an Internet user through the web interface may be able to specify a particular delivery time. In this case, the specified delivery time associated with the web message entered by an Internet user may then be used by SCI 165 to schedule delivery of the web message.

In a further embodiment of the present invention, SCI 165 may be able to handle recurring messages. For example, recurring messages, such as reminder type messages at periodic intervals or dates, may be created on SCI 165. A subscriber, through the web interface or through his device, may be able to set up reminder messages to be delivered to a destination such as a device. A subscriber may set password access to this feature in order to be able to edit and delete these reminder type messages or alerts. SCI 165 may then support recurring message delivery and password access that can be enabled by a subscriber. Further, SCI 165 may allow a subscriber to manage recurring messages originated by others to the subscriber's device. In yet another exemplary embodiment, SCI 165 may support management of these services by the device. For example, a subscriber, through his device, may be able to manage recurring reminder type messages.

In a further embodiment of the present invention, SCI 165 is capable of handling registered delivery of web messages. When a registered web message is delivered or the message reaches its final destination, an updated status report message may be sent to the originator of the web message. In one embodiment of the invention, the subscriber controls whether a status report message is returned to the originator of the web message. A delivery failure message, for example, can be sent back to the originator of the web send message via e-mail if a valid Internet e-mail address for the originator was supplied and registered delivery was selected when the original web message was created.

An Internet user via the web interface may enter a web send message and select registered delivery on the "send a message" web page displayed on the web interface. In this case, if the subscriber has enabled registered delivery in his configuration profile, the Internet user who originated the web send message may receive a delivery receipt when the web send message is received by the subscriber. In another embodiment, the Internet user who originated the web send message may receive a read receipt when the subscriber reads the web send message. Various other types of e-mail notification may be incorporated into the infrastructure of the present invention.

In one example consistent with the principles of the present invention, query message logic 3310 of SCI 165 may interface with the web interface to provide a method by which an Internet user can query information about a web send message. For example, a "query message" web page may be displayed on the web interface. In this example, Internet users may be able to access the "query message" web page in order to view information about a web send message sent by the Internet user. The subscriber may be able to regulate an Internet user's access to the "query message" web page. In this manner, a subscriber may be able to enable or disable an Internet user's ability to query web send messages.

In the example of FIG. 1 and FIG. 33, SCI 165, through its subcomponent, such as portal interface 3302, may satisfy an Internet user's query request via information contained in a cookie. In a further embodiment of the present invention, these query requests may be satisfied by a message ID. In this case, a message ID may be returned for each web send message sent by an Internet user. The Internet user may then be able to access information about the web send message using the message ID. For example, an Internet user accessing the "query message" web page displayed on the web interface may be able to enter the message ID corresponding to a particular web send message in order to access information about that web send message. The "query message" web page may be able to return the status of the web send message to the Internet user. The Internet user may be able to determine whether the web send message was delivered or read by a subscriber.

In a further example consistent with the principles of the present invention, SCI 165 may provide further management of queries. The status of queries may be checked or monitored. SCI 165 may provide for monitoring different queries and, for example, sorting, filtering, or storing queries. In one exemplary embodiment, an Internet user through the web interface may be able to manage various queries he has initiated about web send messages. An Internet user via the web interface, may be able to sort the various queries he has initiated about multiple web send messages.

In an exemplary embodiment of the present invention, configuration logic 3314 allows each subscriber to view, modify, and create customized message handling and processing rules. The configuration logic 3314 aspect of SCI 165, in this example, allows for a subscriber to customize or configure his preference information. In one embodiment of the present invention, this information may be stored in UADB 140 or one of its replicas.

In one possible embodiment of the present invention, configuration logic 3314 may permit subscribers to perform alias management. In this manner, alias management, implemented through configuration logic 3314 of SCI 165, permits subscribers to create e-mail distribution lists and device aliases on their account. A subscriber may have a distribution list that corresponds to a group of people from work. In this case, the subscriber can associate the group of destination addresses with the word "work." In this manner, when the subscriber invokes the word "work," a distribution list consisting of all the destination addresses of the subscriber's work acquaintances can be accessed. In this manner, if a subscriber wishes to send a message to all of the destination addresses associated with the word "work," then the subscriber may be able to enter the message and then send it to the "work" alias.

Likewise, a subscriber may have multiple devices. In this case, the subscriber can associate an alphanumeric string, such as a word, with each device. In this manner, a subscriber who has multiple devices may be able to provide an alias to be associated with the various configurable aspects of each device. For example, a subscriber who has a cellular phone may associate the word "phone" with that device. In this example, all of the various configurable aspects of the cellular phone, such as the ability to receive text messages, can be associated with the word "phone." The subscriber can then invoke the word "phone" in order to access the configuration for his cellular phone.

This alias information may be stored in UADB 140, its replica, another database, or within SCI 165. A subscriber may then be able to alter the alias information stored in one of these various sites. A subscriber may be able to create and alter alias information contained within the network either through the web interface or through his device.

In an exemplary embodiment of the present invention, configuration logic 3314 may provide that all aliases must be unique across an entire provider's network. Further, SCI 165 may allow a subscriber to enable or disable distribution lists, specify that a password is required to access a distribution list, or enable or disable distribution lists from one of the devices in a subscriber's account profile.

In a further embodiment of the present invention, a subscriber, through SCI 165, may be provided the ability to create and modify destination devices and addresses. Likewise, a subscriber may be able to create and modify Internet destination devices and addresses. For example, each device can have its own address, and therefore, its own alias. A subscriber, through SCI 165, may be able to create, modify, and delete device profiles. In this manner, a subscriber, for example, through the web interface or through his device, may be able to change an alias and its associated device profile. Likewise, a subscriber may be able to assign aliases to a particular device or destination. In a further aspect of the present invention, a subscriber may be able to enable or disable destination addresses using an alias. A subscriber may be provided the ability to disable e-mail and web delivery using his mobile number once an alias is created: A default alias, for example, could be a username that is created on the account at activation or by the subscriber via the web interface.

In a further embodiment of the present invention, SCI 165 and its configuration logic component 3314 may allow a subscriber to configure an account to be in an absent or vacation state to notify senders that the subscriber is unavailable. In this manner, a subscriber could associate the word "vacation" with this absent or vacation state. In one embodiment, upon receiving a web send, e-mail, or mobile-to-mobile message, the originator of that message may receive a prepared response from the subscriber. This prepared response, for example, could indicate that the subscriber is unavailable. In one aspect of the present invention, the subscriber can set this absent or vacation mode to be indefinite or to expire automatically after a set number of days. SCI 165 may support an interface to configure a subscriber absentee mode. For example, a subscriber, through his mobile device, may be able to configure and initiate this absentee mode. In a further embodiment of the present invention, the web interface may provide a web page with which a subscriber can initiate or alter this absentee mode. In addition, SCI 165 may be able to support this user interface.

In an exemplary embodiment of the present invention, SCI 165 may provide the ability for a subscriber to configure White lists and Blacklists. In this example, White lists are used to grant access to specific domains, specific IP addresses, or specific e-mail addresses, regardless of whether those domains or addresses might be excluded by a filtering process. Blacklists are used to block access from specific domains and IP addresses. In one embodiment, a subscriber may be able to provision his or her Blacklist and White list to manage e-mail and web access. In addition, White list and Blacklist capability can be implemented on a global as well as on a per subscriber level.

In one aspect consistent with the principles of the present invention, SCI 165 may support an interface, such as the web interface, to allow subscribers to manage their White lists and Blacklists. A subscriber may be able to create a Blacklist, for example, by entering various destination addresses in a web page displayed on the web interface. In this manner, a subscriber may select a Blacklist function on the web interface and be able to enter a list of Internet addresses to which the subscriber wishes to deny access. This information, entered by a subscriber in the web interface, may then pass via communications channel 146 to SCI 165. SCI 165 may then publish this Blacklist information on network transport 125. RAVE 130 via integration transport 132 may then store this Blacklist information in UADB 140 or one of its replicas. In an alternate embodiment of the present invention, this Blacklist information may be stored directly within SCI 165 by any number of methods. In yet another embodiment, DART 126 may store blacklist information in MDS 175. In a further embodiment of the present invention, SCI 165 may support entering hosts and domains by name into a White list or Blacklist.

In a further aspect of the present invention, SCI 165 may be able to obtain the IP address of an accessing party to be able to process the White list or Blacklist. For example, an Internet user who appears on a subscriber's Blacklist may access the web interface. In this case, the Blacklisted Internet user may wish to send the subscriber a web send message. SCI 165 may then obtain the IP address of the Blacklisted Internet user for processing by the network. The IP address of the Blacklisted Internet user may be published on network transport 125 by SCI 165. This Blacklisted address may then be compared with the subscriber's Blacklist stored in UADB 140 or one of its replicas. Since the addresses match, in this example, the Blacklisted user would be denied access to the network. In a further embodiment of the present invention, SCI 165 may support reverse address lookup to list hosts and domains by name. This reverse address lookup may then be used to process, for example, a Blacklist.

In a further embodiment of the present invention, SCI 165 may allow a provider the capability of creating and managing a system-wide Blacklist to control spamming. Further, SCI 165 may allow a provider to manage global Blacklists. For example, a provider may have a list of addresses of known spammers. In such a case, the provider may wish to block the spammer's access to the network. SCI 165 may allow for the creation and administration of Blacklists to block potential spammer's access to the network.

In an exemplary embodiment of the present invention, SCI 165 may be accessed via the web interface. SCI 165 may provide the Internet address of the Internet user accessing the web interface. SCI 165 may also be capable of performing an Internet reverse address lookup to identify the domain and host of the accessing party. After SCI 165 obtains the address of the accessing party, SCI 165, for example, can apply per subscriber Blacklist and White list rule filtering to block unwanted messages from the Internet. After applying per subscriber Blacklist and White list rule filtering, SCI 165 may then apply global Blacklist filtering of sites identified as sources of spam-type messages. In this manner, SCI 165 may implement filtering in a two-step process. SCI 165 may first implement an individual subscriber's Blacklist and White list and then implement a system-wide Blacklist and White list.

In further embodiments of the present invention, Blacklists and White lists that are implemented on a system-wide level may take precedence over a Blacklist and White list for a particular subscriber. In this instance, SCI 165 may first check an accessing parties Internet address against a subscriber's Blacklist. Second, SCI 165 may then check the accessing party's address against a system-wide Blacklist. If the accessing party's address does not appear on the subscriber's Blacklist, but does appear on the system-wide Blacklist, then that accessing party is denied access to the network. In further embodiments of the present invention, SCI 165 may be able to implement multiple Blacklists and White lists. For example, a network administrator may establish multiple Blacklists with varying precedents. SCI 165 may be able to handle the various Blacklist rules based on rules of precedence.

In an exemplary embodiment of the present invention, SCI 165 may be able to support other anti-spamming procedures. SCI 165 may be capable of origination validation based upon a sender's IP address or domain, limiting connections per second per host, accessing a national database of known spammers, providing customer awareness information related to spamming, providing a method for customers to report spamming to the provider, providing a method for determining and blocking spamming by use of war dialing attacks, providing a method for determining spamming based upon the content of a web message using a list of regular expressions, detecting previously unidentified spam messages based upon volume of very similar web send messages, and using counters in processing the text of web send messages.

In a further embodiment of the present invention, firewalls (not shown) may be implemented between SCI 165 and the web interface as well as between the web interface and Internet 175. These firewalls (not shown) serve to protect the web interface, SCI 165, and other elements of the infrastructure. Further aspects of the present invention may support SSL to protect subscriber data when being accessed or updated by the subscriber. For example, the web interface, SCI 165, or other network entities may use various encryption methods in order to protect subscriber data.

In a further exemplary embodiment, SCI 165 may support a process of propagating changes to other SCIs (not shown) when updates have been made to add new configuration and network service features. For example, SCI 165 may receive a new system-wide Blacklist. In such a case, SCI 165 may propagate this new system-wide Blacklist to other SCIs (not shown). Alternatively, a new system-wide Blacklist may be propagated to all SCIs in parallel. In yet another embodiment, one SCI, such as SCI 165, may be designated as a master SCI. In such a case, master SCI 165 may then propagate a change in a system-wide Blacklist, for example, to other SCIs.

In the exemplary embodiment depicted in FIG. 33, create custom download logic 3318, a component of SCI 165, allows a subscriber to create his own custom graphics, ring tones, calendar entries, and address book entries to send to enhanced messaging service (EMS) compliant devices. For example, create custom download logic 3318 may provide the capability for subscribers to create rich text, pictures, animations, melodies, and sounds. Further, create custom download logic 3318 may allow subscribers to generate downloadable multimedia files such as MIDI files to devices that support this feature. In one embodiment of the present invention, the web interface may provide a web page on which a subscriber may access create custom download logic 3318.

The web interface may provide a web page in which a subscriber can create sounds. In this example, a subscriber may be able to create a custom ring tone via the web interface. This custom ring tone may then proceed through communications channel 146 to SCI 165. SCI 165 may publish this user-created ring tone on network transport 125. In publishing this user created ring tone on network transport 125, SCI 165 may also attach information about the subscriber who created the ring tone. In such a case, the user-created ring tone may be stored in a database such as UADB 140 or MDS 175. A subscriber could then access this custom-created ring tone from his device. In such a manner, a subscriber may be able to create a ring tone using the web interface, store that ring tone in a database residing within the infrastructure, and then download that ring tone from the database to his device. In a similar manner, a subscriber may be able to create custom graphics as well as calendar and address book entries.

Figure 34:
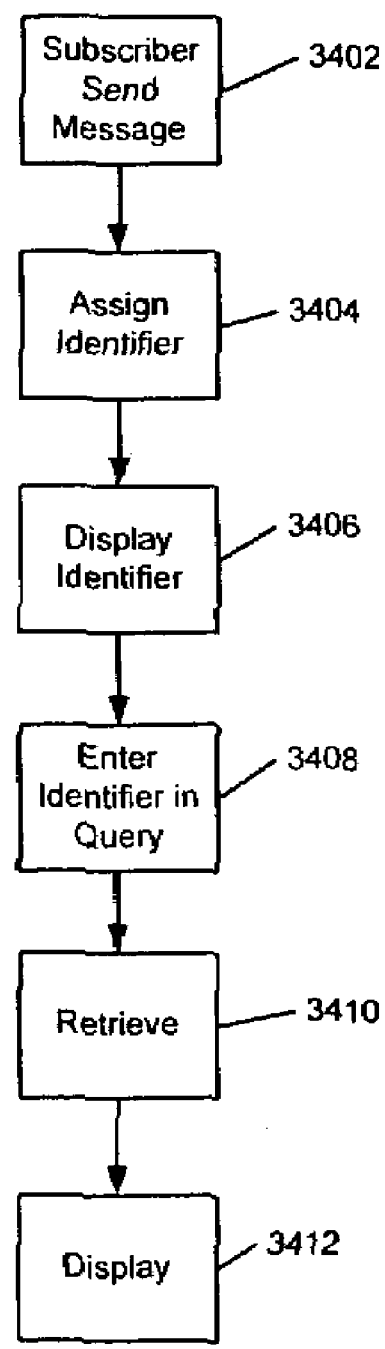
FIG. 34 depicts a method for querying or tracking a message based on a unique identifier in an exemplary embodiment consistent with the principles of the present invention.

FIG. 34 depicts a method for querying or tracking a message based on a unique identifier in an exemplary embodiment consistent with the principles of the present invention. In this example, a unique identifier is associated with a message that is sent from one subscriber to another subscriber, from one subscriber to a non-subscriber, or from a non-subscriber to a subscriber. The method contemplates assigning a unique identifier to each message that travels through the network and allowing access to the message status based on that identifier. In one aspect of the invention, the unique identifier can be entered in a query request at any access point in the network. In another embodiment, a unique identifier is associated with a message center or an MTA. In this manner, the identifier may be unique for that message center and not unique across multiple message centers in a network.

In exemplary step 3402, a subscriber sends a message. As mentioned, the invention contemplates a non-subscriber sending a message as well. The message can be sent from any device with any destination address. For example, a non-subscriber may send a message from a "web send" web page displayed on a web browser by an SCI. In this case, the SCI displays a web page through which any Internet user can send a message to any subscriber. In another embodiment, a subscriber sends a message from his device to a non-subscriber's email account. The message itself can be in any format and can be sent over any pathway through the network.

In exemplary step 3404, the network assigns a unique identifier to the message. This unique identifier can be in the form of a string of characters of any convenient length. For example, the unique identifier may be a six character string of letters and numbers. In one aspect of the invention, a non-subscriber sends a message to a subscriber's device from a "web send" web page. In this example, the message is received by an ARC for translation. The ARC initially strips off the destination address and publishes the address with a subject of "validation request" on the network transport. In one aspect of the invention, the ARC publishes the validation request without a particular RAVE as a destination. In this aspect, all RAVEs connected to the network transport subscribe to messages with the subject "validation request." In this publish and subscribe protocol, all RAVEs access the validation request.

In another embodiment, a point to point protocol is used. In this manner, the originating ARC directs the validation request to a specific RAVE. A RAVE entity receives the validation request and performs the necessary validation functions. For example, the RAVE receives the destination address, accesses a subscriber's information based on that destination address, and returns a validation response. In various aspects of the invention, this validation response can be published on the network using a publish and subscribe protocol or using a point to point protocol. The originating ARC receives the validation response. Since the destination address is valid, the ARC performs necessary translation functions and the message proceeds through the network to the destination address. The ARC, upon translating the message, may assign a unique message identifier. This identifier could then pass back through the network to the web interface.

In another embodiment consistent with the exemplary method of FIG. 34, the SCI itself assigns the unique message identifier. In alternate embodiments of the invention, RAVE entities, DART entities, mail transfer agents, LAMB entities, or any other network element may assign the unique identifier. The identifier may originate in a single component that generates unique identifiers. In another aspect of the invention, numerous different network elements may each generate the unique identifiers. In this case, the network elements may communicate among each other to ensure that the identifiers generated are unique. In another aspect of the invention, an identifier is assigned to a message based on the message center associated with the message. In this aspect of the invention, identifiers are unique for messages traveling through a message center but they may not be unique across different message centers in the network.

In exemplary step 3406, the unique identifier is displayed to the party who originated the message. For example, a person who sends a message from a "web send" web page may receive a unique identifier displayed on that web page. In one embodiment, a person sends a message from a "web send" web page. Upon sending the message, a screen containing the unique identifier associated with that message may pop up on the web page. In another embodiment, the unique identifier may be sent to the person along with a delivery or read receipt. In yet another example, a subscriber may receive the unique message identifier on a predetermined device or at a predetermined location. A subscriber may wish to receive the identifier possibly along with a delivery receipt at an email address specified by the subscriber.

Once in possession of the unique identifier, a person may query the message as depicted in exemplary step 3408. A person may access a "query message" web page displayed on a web portal served by an SCI. In this example, the "query message" web page contains various query functions such as tracking a message, ascertaining whether the message was delivered, ascertaining whether the message was read, displaying transmission errors, and any other type of query function. The "query message" web page displays a screen into which a person can enter the unique identifier. In other embodiments of the invention, a subscriber may be able to initiate a query from a device. A subscriber may be able to enter the unique identifier into a blackberry, pager, cellular phone, or other device to obtain information about the message.

Once the unique identifier is entered, as depicted in exemplary step 3410, the network retrieves the queried information about the message based on the unique identifier. A unique identifier is entered into a "query message" web page. The identifier is passed from the web page to an SCI. In one embodiment, the SCI contains a listing of the unique identifiers associated with messages sent from the web page. The SCI may then perform a look-up function to ascertain the status of the message and any other requested information. In another embodiment, the SCI publishes on a network transport the unique identifier along with the subject "query request." In this example, the DART entity may subscribe to the subject "query request" and each DART may look for these messages. In this manner, the network may use a publish and subscriber protocol.

In another embodiment, the "query request" may be addressed to a specific DART element in a point to point protocol. In either case, a DART element receives the "query request" with the unique identifier. The DART element, in this example, accesses one or more MDSs based on the unique identifier. For example, messages and accompanying message information may be stored in an MDS in various tables along with a unique identifier. In this manner, a DART element may simply perform a look-up operation to retrieve message information from an MDS database. In this example, the MDS stores the message itself along with message information including information about receipt of the message. The DART element returns the information to the network transport, either in a publish and subscribe protocol or a point to point protocol, destined for the originating SCI. The SCI displays the information on a web page. In other embodiments of the invention, other elements may perform the query functions. For example, a RAVE entity or a LAMB entity may access a database to retrieve the information requested in a query.

In exemplary step 3412, the requested information is displayed. In the example of a query initiated from a web page, the requested information is displayed on the web page. In other embodiments of the invention, the information is displayed on a device. The information may also be sent to a destination device specified by a subscriber. For example, a subscriber may initiate a query from his pager and then request that the information be sent to a specified email address.

Figure 35:
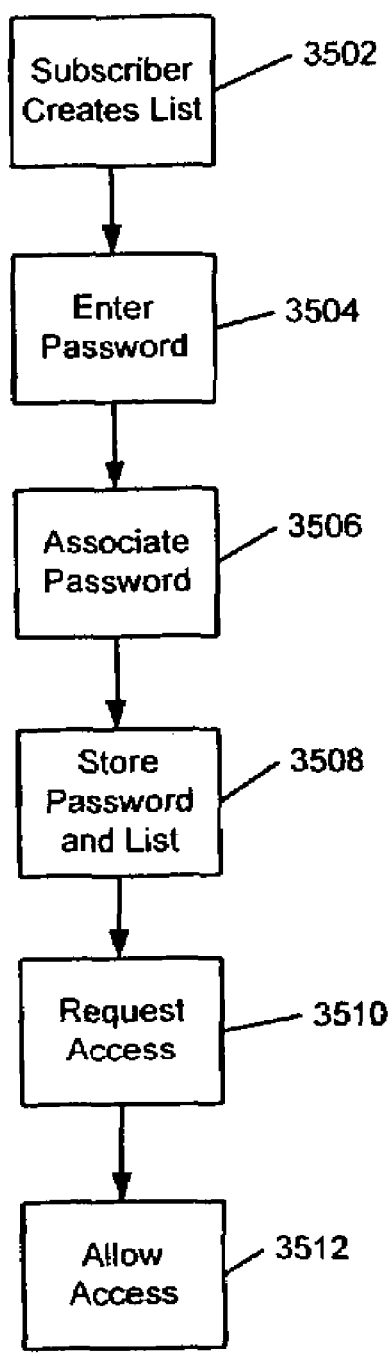
FIG. 35 depicts a method for password protecting a subscriber-created distribution list in an exemplary embodiment consistent with the principles of the present invention.

FIG. 35 depicts a method for password protecting a subscriber-created distribution list in an exemplary embodiment consistent with the principles of the present invention. In step 3502, a subscriber creates a distribution list of destination addresses. In one embodiment of the invention, a subscriber may access a web page to create a distribution list of addresses. In this example, a subscriber enters into the web page a list of destination addresses. These destination addresses are then associated with an alias that the subscriber uses to refer to the distribution list.

A subscriber may enter into the web page a list of addresses that correspond to the people with whom he works. This distribution list may then be associated with a word such as "work." In this manner, the subscriber can refer to the list of addresses simply by entering the word "work" into a device. In another embodiment of the invention, the addresses of a distribution list can be entered into a device such as a blackberry, cellular phone, or pager. In another aspect of the invention, a subscriber may enter the list of addresses into a PDA or personal computer. In addition, the subscriber may associate any string of characters with the distribution list. For example, the subscriber may associate a word, a number, or a symbol with the list.

In exemplary step 3504, the subscriber enters a password that is used to protect the distribution list. In one aspect of the invention, the network displays a query to the subscriber asking if he wishes to password protect the distribution list. The subscriber may respond that he wishes to password protect the distribution list. In such a case, the network then requests that the subscriber enter a password. In one aspect of the invention, the subscriber enters the password into a web page displayed on a personal computer. In other aspects of the invention, the subscriber enters the password into a personal digital assistant, pager, cellular phone, or other device.

In exemplary steps 3506 and 3508, the network associates the password with the distribution list and stores the password and distribution list in a data structure. For example, a subscriber may enter a distribution list and password into a device. This information then passes to an ARC element for translation. Initially, the incoming ARC publishes on a network transport a validation request. A RAVE receives the validation request, looks up information stored in a UADB, RVDB, or MIND, processes the validation request, and returns a validation response. In this example, subscriber information stored in a data structure indicates that the subscriber has signed up for service that allows him to create password-protected distribution lists. The validation response is received by the incoming ARC. Upon receipt, the ARC translates the distribution list and password into a common format and appends relevant message information such as the originating address, message type, and other information. The ARC sends this translated list, password, and accompanying information, for example, to a RAVE via the network transport.

As noted, communication between the network entities can occur via a publish and subscribe protocol or a point to point protocol. The RAVE receives the distribution list, password, and accompanying information and stores them in a UADB, RVDB, MIND, or other data structure. In one embodiment, the data structure is a relational database that stores the list and password along with accompanying identifying information in tables. In this manner, the password is associated with the distribution list in the data structure. The password and distribution list may be stored together in the same data structure in the same table, or in different data structures that are linked together. In another aspect of the invention, the distribution list and password are stored in a linked list. Encryption may be employed to preserve the integrity of the password. In another aspect of the invention, various flags, such as a confidentiality flag, may be set to indicate the confidential nature of the password.

After the distribution list and password are stored, the subscriber, in exemplary step 3510, requests access to the distribution list using the password. In this example, the subscriber accesses the distribution list from a device. The subscriber enters a message and denotes as its destination a distribution list. The subscriber may wish to send a message to his work contacts. In this manner, the subscriber enters the word "work" as the destination for a message. The word "work" in this case is an alias referring to the distribution list of destination addresses associated with the subscriber's work contacts.

Upon entering the distribution list as the destination for the message, the network prompts the subscriber for the password. In one embodiment of the invention, the subscriber enters a message with a password protected distribution list as a destination. The distribution list alias is received by an ARC element. The ARC element, in this example, publishes on a network transport the alias along with a "get alias information" request. The RAVE entity receives the "get alias information" request and processes it by accessing information stored in a UADB, RVDB, or other data structure. The RAVE, upon accessing the data structure discovers that the distribution list is password protected and sends a "get password" request to the originating ARC. The ARC translates the "get password" request so that it can be displayed on the device. This prompt is then displayed on the subscriber's device. In other aspects of the invention, this password prompt can be displayed in many different forms on any device used in conjunction with the network. The subscriber responds to the password prompt by entering the password into his device and transmitting it to the network.

As depicted in exemplary step 3512, upon receipt of the password, the network allows access to the distribution list. In this example, the subscriber enters the password into a device. The incoming ARC receives the password, performs translation, and sends it to the RAVE for verification. The RAVE receives the password and checks it against the password stored in a data structure. The password is valid and the RAVE returns a validation response along with the contents of the distribution list. Other elements of the network then process the message. In further embodiments of the invention, other network elements, such as the LAMB, DART, other ARCs, SCIs, and other RAVEs, may perform the distribution look-up and password validation functions described.

Figure 36:
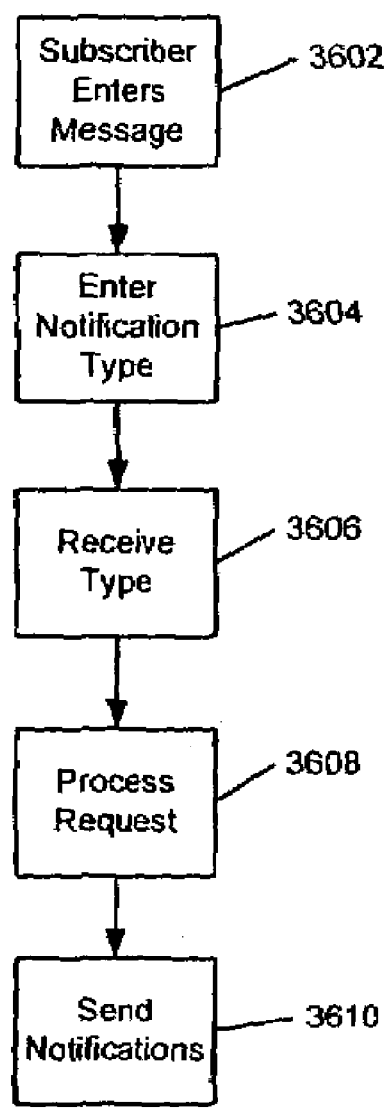
FIG. 36 depicts a method for designating a type of message notification in an exemplary embodiment consistent with the principles of the present invention.

FIG. 36 depicts a method for designating a type of message notification in an exemplary embodiment consistent with the principles of the present invention. In this example, a subscriber sends a message and requests a notification about the receipt of the message. In exemplary step 3602, the subscriber sends a message. This message can be of any type and can be sent from any type of device. For example, the subscriber may send an SMS message from his cellular phone. In this case, the subscriber enters the message text and destination into his phone.

After entering the message to be sent, the subscriber enters the type of notification he wishes to receive as depicted in exemplary step 3604. In one embodiment of the invention, the subscriber enters the notification type when he enters the message itself. In another embodiment, the network prompts the user to enter a notification type. For example, a subscriber who sends an SMS message on his cellular phone first enters the destination address and message text. After he forwards the message text and destination address to the network, he receives a prompt from the network to enter the type of notification he wishes to receive. This prompt displays a list of notification types and notification destinations.

Notification types may include receipt notification which notifies a sender of a message when the message was received and read notification which notifies the sender of a message when the message is read. The subscriber may also be able to choose a destination for the notification. In this manner, a subscriber may receive the notification on any device such as a personal computer, pager, or cellular phone.

In one embodiment of the invention, the notification prompt is generated by a network entity such as a RAVE, ARC, LAMB, SCI, or DART. For example, a first subscriber may send a message from a web page to a second subscriber. The first subscriber enters the message and destination address into a "web send" web page. The first subscriber then enters the type of notification he wishes to receive and the address to which he wants the notification sent. This web page is served up by an SCI. In this manner, the SCI solicits the notification information and then transmits the notification information to other network entities for processing.

In exemplary steps 3606 and 3608, the network receives the notification information and processes it. In one embodiment, the notification information includes the type of notification requested, a message identifier, and a destination address or multiple destination addresses to which the notification is to be sent. This information may be passed from a web page to an SCI and then to an ARC. In another embodiment, the information is passed directly from a device to an ARC. Upon receipt, the ARC performs translation functions and publishes on a network transport the information with the subject "notification request." In this case, DART entities subscribe for notification requests and a DART entity receives the information. In other embodiments of the invention, other network entities such as RAVEs, LAMBs, and ARCs may subscribe for notification requests. Upon receipt, the DART processes the request by accessing an MDS to determine the status of the message. In one embodiment of the invention, status information is stored in an MDS along with the message itself and accompanying information. The DART, in this case, accesses an associated MDS for information to satisfy the notification request.

Upon accessing this information, the DART returns the information to the network transport. An ARC receives the information along with the destination address or addresses for the notification message. The receiving ARC translates the notification message into a format that is displayable on the devices associated with the destination addresses. In one aspect, a notification message that is sent to multiple devices may require multiple ARCs to perform the proper translation functions. After translation, the notification message is sent to the devices at the specified destination addresses as depicted in exemplary step 3610.

Figure 37:
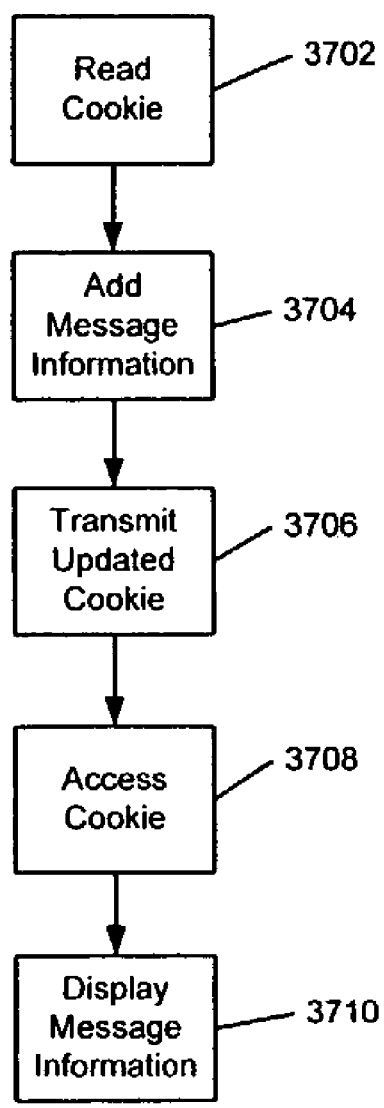
FIG. 37 depicts a method for providing message information to a subscriber based on the contents of a cookie in an exemplary embodiment consistent with the principles of the present invention.
Figure 38:
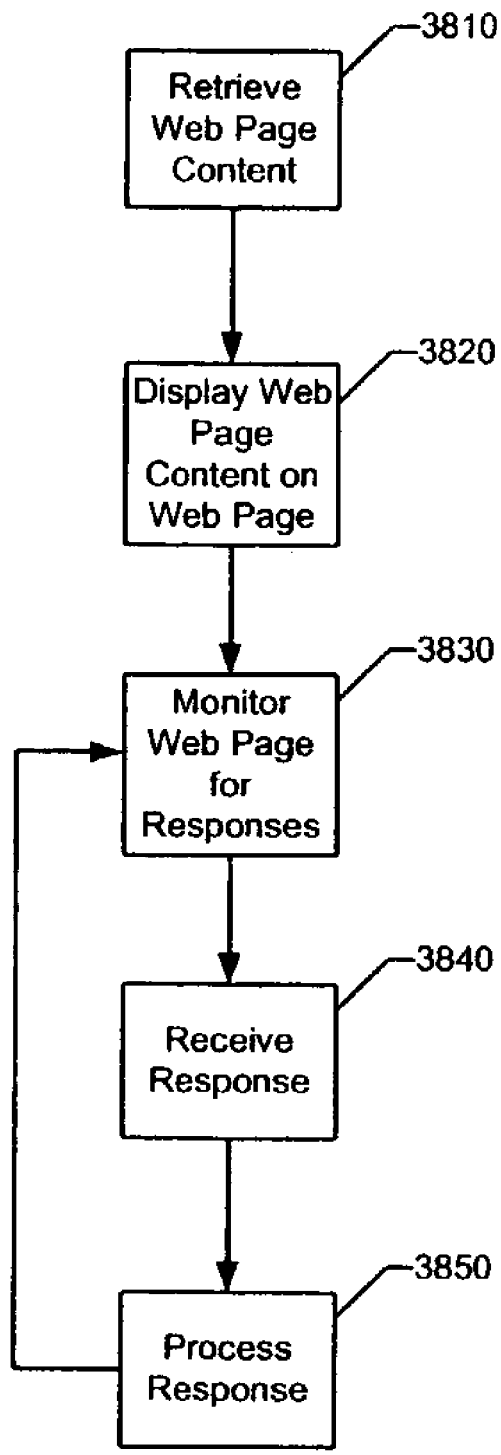
FIG. 38 illustrates a flow chart of the operation of an SCI in an exemplary embodiment consistent with the principles of the present invention.

FIG. 37 depicts a method for providing message information to a subscriber based on the contents of a cookie in an exemplary embodiment consistent with the principles of the present invention. In exemplary step 3702, the network reads a cookie from a browser. In one example consistent with the principles of the invention, a subscriber accesses a "web send" web page from a browser on a personal computer connected to the internet. The browser, for example, can be Netscape Navigator or Microsoft Internet Explorer. In this example, an SCI, MTA, or web based device serves up the "web send" web page to the subscriber's browser. Alternatively, a server connected to the network serves up the "web send" web page to the subscriber's browser. As is commonly known in the art, the server on which the "web send" web page resides reads a cookie from the subscriber's browser. The cookie may be read in any convenient manner. Alternatively, if the subscriber is a first time visitor to the web page, the server creates a cookie that is written to the subscriber's browser. This newly created cookie may then be read and updated with message information. The contents of cookies, the manner in which they are read, and the manner in which they are created are all known to those skilled in the art.

In exemplary step 3704, the network updates the contents of the cookie with message information. A subscriber accessing a "web send" web page from his browser sends a message that travels through the network. As previously noted, this message can be of any type and can have any destination. The subscriber may send an SMS message from a web page to a device. This message, in this example, travels through the network to its destination. In one aspect of the invention, the destination address and/or the origination address are verified by a RAVE entity, the message is translated by incoming and outgoing ARCs, and the message and accompanying information are stored in a data structure by a DART. In this example, the SCI obtains information about the message and adds it to the cookie. The SCI obtains a message identifier which can be in the form of a string of characters, and appends that identifier to the cookie. Other various types of information such as transaction identifiers, message type codes, destination addresses, or any other type of message information may be appended to the cookie. In this manner, the cookie contains information about the message, in this case, that the subscriber has sent from a "web send" web page displayed on a browser.

In exemplary step 3706, the network transmits the updated cookie to the subscriber's browser. After appending message information to the cookie, the SCI or other server transmits the cookie to the subscriber's browser. The web browser software writes the cookie to the hard drive on the subscriber's personal computer. The various methods of transmitting and writing cookies are known to those skilled in the art.

This process can be repeated many times. For example, a subscriber may send several messages from his browser. Each time a message is sent, a cookie can be read, updated, and returned to the browser. Alternatively, the SCI or other server may initially read the cookie, compile information about all the messages sent from the web page, update the cookie with that collective information, and then transmit the cookie back to the web browser. Many other combinations of reading, updating, and returning a cookie are known to those skilled in the art and are within the scope of this invention.

In exemplary step 3708, the browser accesses information stored in the cookie. For example, a subscriber may initiate a query about the messages he sent from his browser. In this manner, a subscriber may query the system for the messages that have been received or read by their intended destination. The information contained in the cookie may be used to satisfy the query request. For example, the subscriber initiates a query request from his browser. Upon initiating the query, the network reads the cookie and obtains the message information. In one aspect of the invention, the message information comprises a unique message identifier for each message sent. The network obtains the message identifiers from the cookie and performs a query function based on those identifiers. The SCI or other server reads the cookie, strips out the message identifiers and passes a query request along with the identifiers to an incoming ARC. The ARC translates this request along with the identifiers into a common format and transmits this information to another network entity such as a DART, RAVE, or LAMB. A DART receives the request along with the identifiers and obtains the status of the messages from a connected data structure. The DART may perform a simple look-up in an MDS based on the message identifiers. The DART may then return the requested information to an ARC for translation. This information may then pass through an SCI or other server to be displayed on the subscriber's browser.

In another embodiment of the invention, the browser simply reads the message information from the cookie and displays it to the subscriber. In this example, the cookie may be updated by the network so that it contains information about whether the messages were received or read. In this manner, the network may read the cookie and update it with various information about the status of the message.

Finally, in exemplary step 3710, the message information is displayed on the browser. This information can be displayed on the browser in any format and methods for displaying information on a browser are known to those skilled in the art.

In this embodiment, the SCI serves up web page content, monitors the web page, receives responses from the web page, and processes those responses. At stage 3810, the SCI retrieves web page content to be displayed on a web page, and at stage 3820 displays that content on the web page. The SCI may access a data storage device to obtain the web page content and may also update portions of a web page with that content. At stage 3830, the SCI monitors the web page for responses from subscribers. At stage 3840, the SCI receives a response and, at stage 3850, the SCI processes that response. The SCI then continues to monitor the web page for further responses as illustrated in stage 3830.

Figure 39:
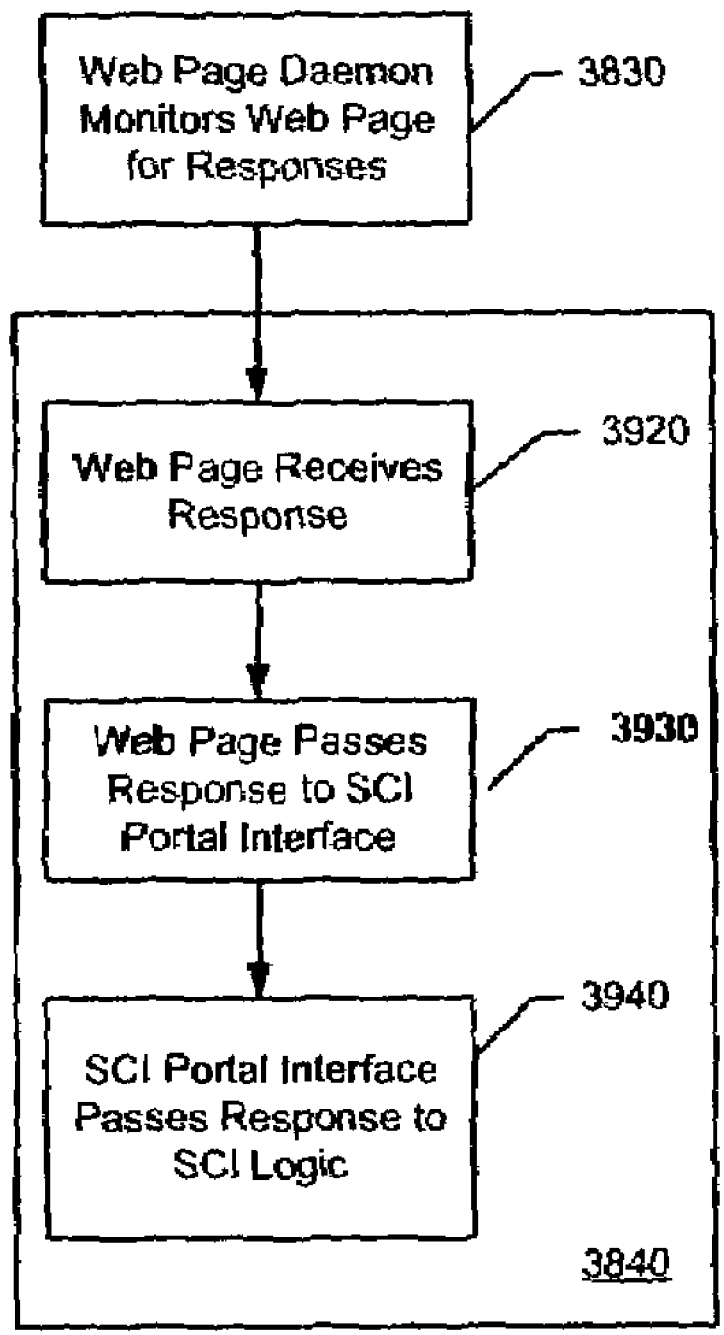
FIG. 39 illustrates the receipt of a response by the SCI in an exemplary embodiment consistent with the principles of the present invention.

FIG. 39 illustrates the receipt of a response by the SCI in an exemplary embodiment consistent with the principles of the present invention. At stage 3830, a web page daemon monitors traffic for responses. At stage 3920, the web page receives a response. More particularly, the server on which the web page is displayed receives the response. At stage 3930, the response is passed to the portal interface portion of the SCI. The portal interface portion, in this embodiment, acts as a gateway between the SCI logic and the web server. At stage 3940, the portal interface portion of the SCI passes the response to the SCI logic portion for processing.

Figure 40:
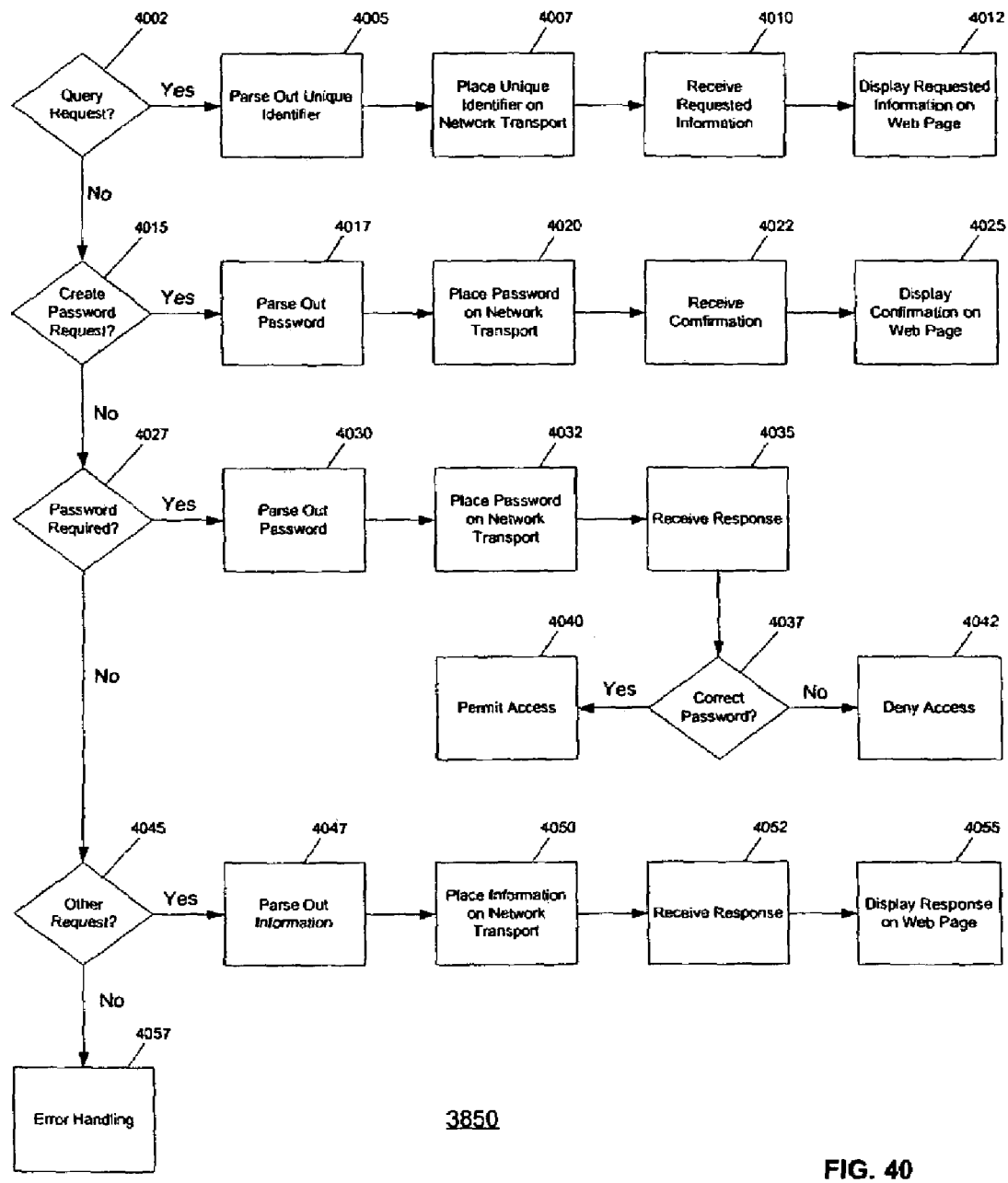
FIG. 40 is an exemplary flow diagram that illustrates the processing of a response by the SCI in an exemplary embodiment consistent with the principles of the present invention.

FIG. 40 is an exemplary flow diagram that illustrates the processing of a response by the SCI in an exemplary embodiment consistent with the principles of the present invention. While only a few different processing functions are depicted, the SCI is capable of performing additional functions described herein. At stage 4002, the SCI determines if the response is a query request. In this case, the query request is based on a unique identifier previously assigned to a message. The subscriber enters the unique identifier into a web page and the request along with the identifier is received by the SCI. If the response is a query request, then the SCI parses out the unique identifier on which the query is based as indicated in stage 4005. In stage 4007, the SCI passes the identifier along with a request to the network transport. In an alternate embodiment, the request and identifier may be passed to an ARC for translation before being placed on the network transport. At stage 4010, the SCI receives the requested information. In this case, the requested information is the status or history of the message associated with the unique identifier. At stage 4012, the SCI displays the requested information on the web page.

If the response is not a query request, the flow proceeds to stage 4015 in which the SCI determines if the response is a request to create a password. In many instances, a subscriber may be able to create a password that can be associated with different aspects of his account. For example, a subscriber may be able to create a password protected distribution list. If the request is a create password request, then the SCI parses out the password entered by the subscriber as depicted in stage 4017. In this manner, the response itself contains a request to create a password along with the desired password. At stage 4020, the SCI places the password along with a request on the network transport. Alternately, the SCI passes the request and desired password to an ARC for translation before the request and desired password are placed on the network transport. At stage 4022, the SCI receives confirmation that the password has been created in the system. In one embodiment, this confirmation acknowledges the creation of the password as well as the password itself. At stage 4025, the SCI displays the confirmation information on the web page.

If the response is not a request to create a password, then the SCI determines if the response is a password required response as illustrated in stage 4027. For example, a subscriber may wish to access a password protected distribution list. In such a case, the subscriber must enter the password when prompted by the web page. The entry of this password is transmitted to the SCI for processing in the form of a password required response. At stage 4030, the SCI parse out the password. The SCI places the password along with a request on the network transport for processing by the network as illustrated in stage 4032. Alternately, the SCI passes the request and password to an ARC for translation and the ARC places the translated request and password on the network transport.

At stage 4035, the SCI receives the response from the network. Typically, this response contains information about the validity of the password. At stage 4037, the SCI, based on the response from the network, determines whether the password is valid. If it is valid, then the SCI permits access as depicted in stage 4040. If the password is invalid, then the SCI denies access as illustrated in stage 4042.

If the response is not a password required response, then the SCI determines if it is another type of request as illustrated in stage 4045. As noted, the SCI is capable of performing numerous functions by receiving responses entered by subscribers into a web page. If the response is a type of request, then the SCI parses out the necessary information in stage 4047. At stage 4050, the information, along with a request, is placed on the network transport for processing by the network. Alternately, the information and request are transmitted to an ARC for translation. At stage 4052, the SCI receives a response to the request, and at stage 4055, the SCI displays the relevant information. Finally, if the response is not a type of request, then the SCI performs error handling functions as illustrated in stage 4057.

LAMB

Figure 41:
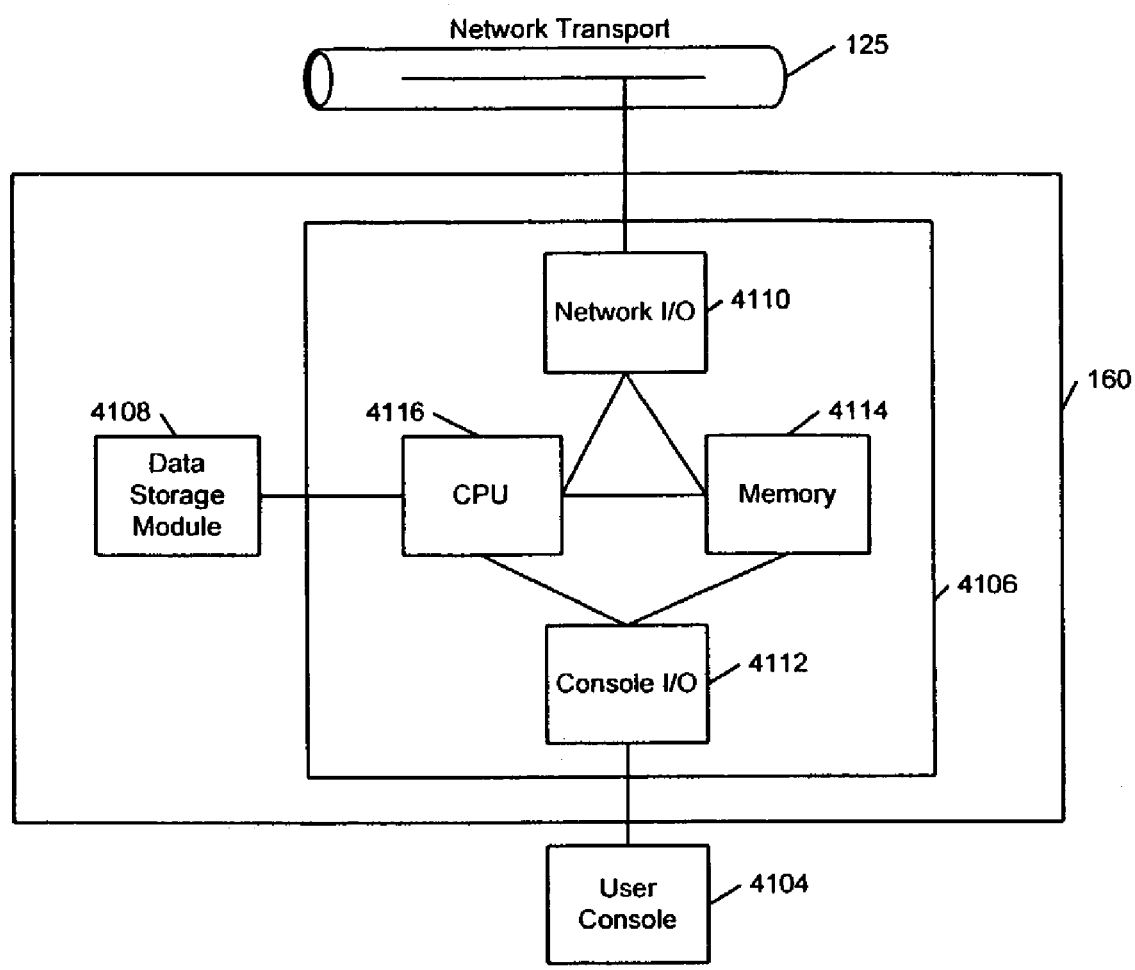
FIG. 41 illustrates a LAMB in an exemplary embodiment consistent with the principles of the present invention.

FIG. 41 illustrates a LAMB in an exemplary embodiment consistent with the principles of the present invention. A LAMB (logging, administration, maintenance, and billing) module 160 is operatively connected to network transport layer 125. Network transport layer 125 may comprise, for example, a network bus through which messages pass. LAMB module 160 may also be operatively connected to a user console 4104. User console 4104 may comprise, for example, one or more terminals connected to LAMB module 160 via any known network protocol or via the Internet.

LAMB module 160 may further comprise a LAMB processor 4106 and a data storage module 4108. LAMB processor typically comprises a network input/output (I/O) module 4110 for interfacing with network transport layer 125 and a console input/output (I/O) module 4112 for interfacing with user console 4104. LAMB processor 4106 may also comprise a memory 4114 and a central processing unit (CPU) 4116. CPU 4116 may process instructions stored in memory 4114 for administering an error condition. Additionally, CPU 4116 may interface with data storage module 4108 to record information relating to message moving through the communications network. Optionally, memory 4114 and data storage module 4108 can be part of the same storage device.

Figure 42:
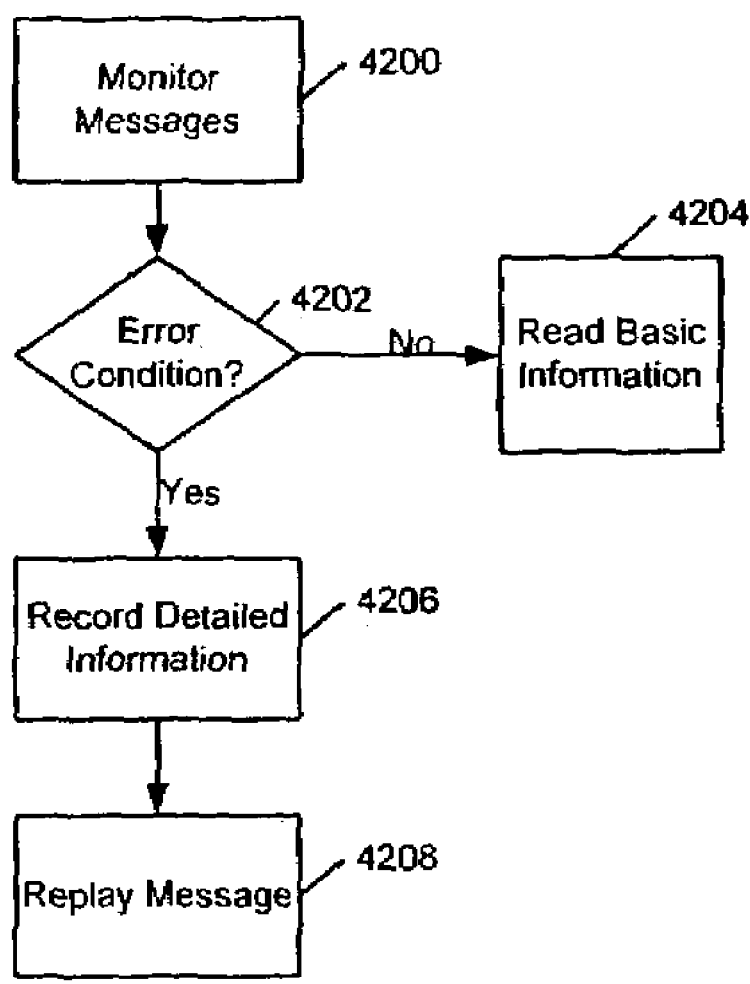
FIG. 42 illustrates an exemplary method for administering an error condition in accordance with an embodiment of the present invention.

FIG. 42 illustrates an exemplary method for administering an error condition in accordance with an embodiment of the present invention. In step 4200, a message moving through the communication network (i.e., network transport layer 125) is monitored. A determination is made in step 4202 whether there is an error condition associated with the message. If there is no error condition, basic information relating to the transaction is recorded in step 4204 to the data storage module 4108. If there is an error condition, detailed information is recorded in step 4206 to the data storage module 4108. In contrast, detailed information comprises basic information plus additional information. The rationale behind the determination in step 4202 is to conserve storage space in data storage module 4108 when a message is transmitted error-free. In contrast, this space is reserved for messages provoking an error condition, because such messages are most likely to be replayed and scrutinized.

For those messages that do provoke an error condition, the message is replayed through the communications network in step 4208. Step 4208 may comprise transmitting the message through the communications network in a safe mode of operation (as is known in the art), at the behest of a user, and/or on a step-by-step basis. Moreover, if, for example, the transmission of the may cause damage or other deleterious effects to the communications network, flags may be added to certain portions of the message indicate that certain operations associated with the message transmission are "dummy" operations, i.e., for troubleshooting and not for actual execution. This flagging operation may be implemented manually by a user or automatically via software resident in LAMB module 4106, for example.

Figure 43:
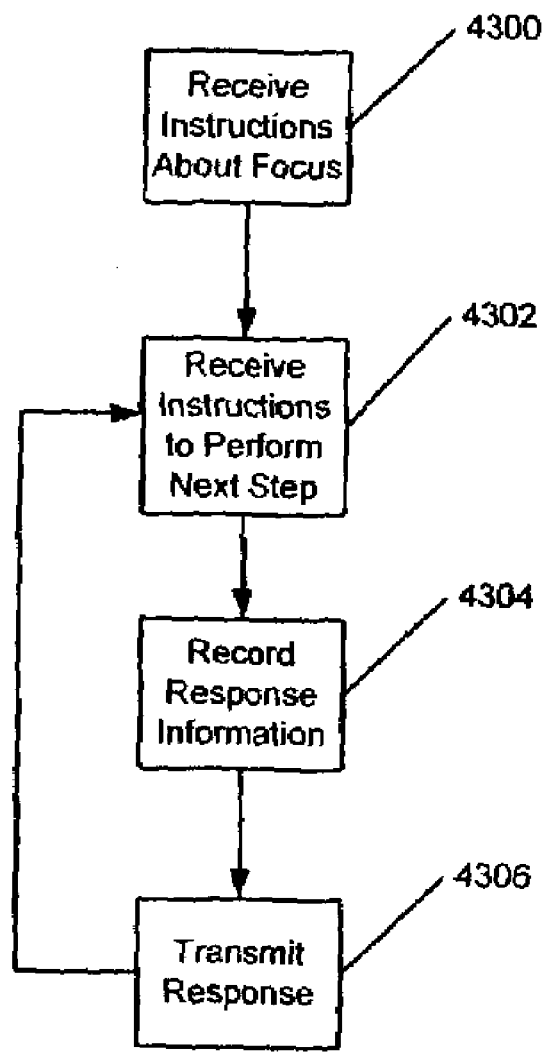
FIG. 43 illustrates an exemplary method for stepping through a message transmission consistent with an embodiment of the present invention will now be described.

Turning now to FIG. 43, an exemplary method for stepping through a message transmission consistent with an embodiment of the instant invention will now be described. In step 4300, instructions are received from a user console about an element of the communications network on which to focus. Typically, a user will input a desired element for the focus at the user console based on the user's notion that a particular element is at the root of the error condition. Elements on which to focus may comprise, for example, SMSCs, ARCs, RAVEs, or DARTs. In step 4302, a user may command the stepping of the message through the communication network, wherein the LAMB module 4106 receives instructions from the user console to perform the next step of the message transmission. Response information related to the response of the element of focus is recorded in step 4304. This response information may comprise, for example, details associated with an error condition. In step 4306, this response information is transmitted to the user console.

In this way, the information may be used by the user to troubleshoot problems associated with the message transmission. Step 4306 may then revert back to step 4302 as needed to complete all steps necessary to transmit the message through the communications system.

Figure 44:
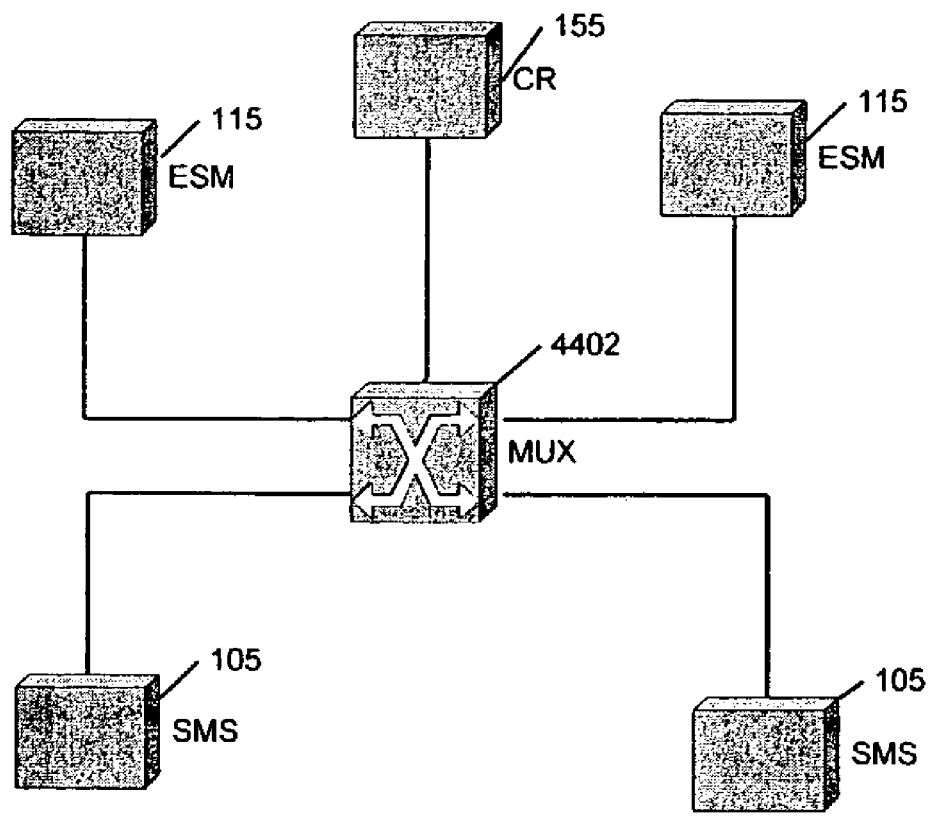
FIG. 44 illustrates a first exemplary embodiment of a content router may be operatively connected to a multiplexer consistent with the principles of the present invention.

Turning now to FIG. 44, in a first exemplary embodiment, a content router 155 may be operatively connected to a multiplexer 4402. Content router 155 may modify the destination and/or text of a message moving through the communication network. Multiplexer 4402 is operatively connected to one or more External Short Message Entities (ESMEs) 4404, which may send request messages comprising, for example, a command and at least one parameter.

Multiplexer 4402 is also operatively connected to one or more short message service centers (SMSC) 4406, which are responsible for providing response information in response to query messages, such as those that may be sent from content router 155. SMSC 4406 may comprise a content provider, such as an Internet or Intranet website, or any other information provider. Multiplexer 4402 may route request messages based on instructions provided by content router 155 to and from various SMSCs 4406 that provide information content. SMSCs 4406 may then send a query response message back through multiplexer 4402 to content router 155. Content router 155 may then send a request response message back to ESMEs 4404.

Figure 45:
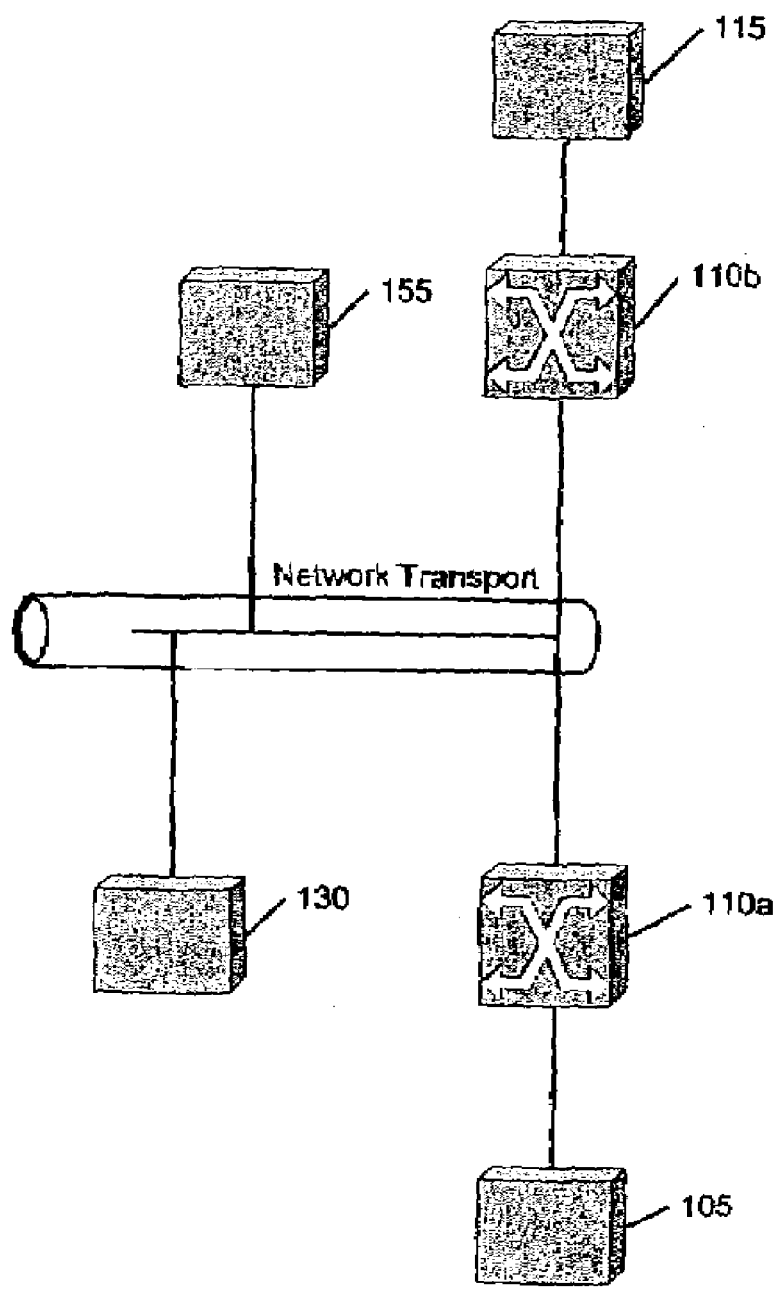
FIG. 45 illustrates another exemplary system environment with a content router in which to practice an embodiment of the present invention.

FIG. 45 illustrates another exemplary system environment in which to practice an embodiment of the present invention. Turning to FIG. 45, a content router 155 is operatively connected to a network transport layer 125, which may comprise a bus, for example. Network transport layer 125 is in turn operatively connected to one or more Adaptive Routing Concentrators (ARC) 110. ARCs 110 may be used to interface between network transport layer 125 and various network elements. An ARC 110 may interface an ESME, 115 with network transport layer 125. As mentioned previously, ESME 115 may send request messages comprising, for example, a command and at least one parameter, through ARC 110 to network transport 125.

Content router 155, which may monitor the network transport layer 125 for such request messages, may then receive the request message and process the request message. Such processing may comprise, for example, sending a query message through an ARC 110 to an SMSC 105 based on the command and the at least one parameter. SMSC 105 functions to provide information content. Thus, SMSC 105 may, in turn, send a query response message back through an ARC 110 to content router 155 via the network transport layer 125. Here again, content router 155 may process the received query response message. After processing, content router 155 may send a request response message back to ESME 115 via network transport layer 125 and an ARC 110.

Additionally, network transport layer 125 may be operatively connected to a RAVE 130, which may act as a address aliasing facility to all elements of the communications network. In this way, the aliasing facility may receive a destination address, which is typically an abbreviation or shortened code, and send out its associated long code, address, or telephone number back to a requesting entity.

Figure 46:
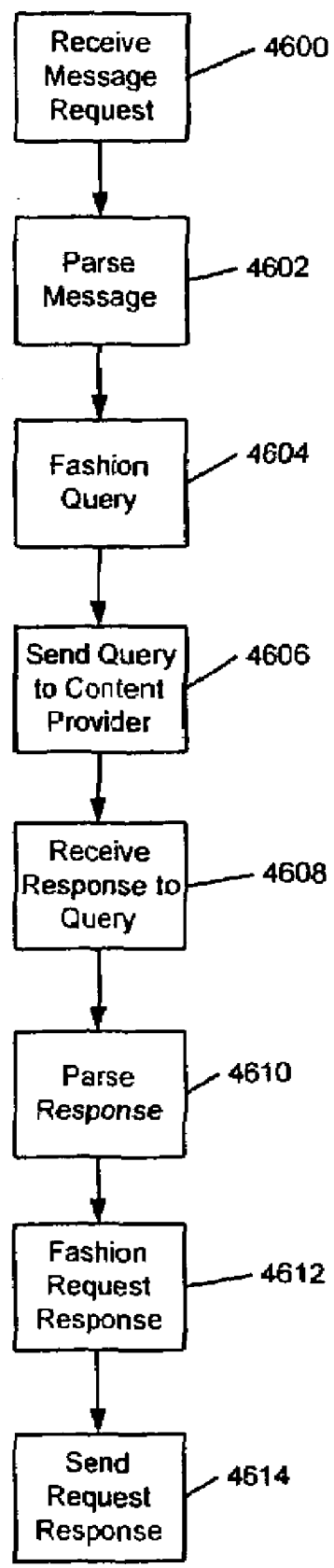
FIG. 46 illustrates a flowchart of an exemplary method for retrieving information with a content router consistent with an embodiment of the present invention.

FIG. 46 illustrates a flowchart of an exemplary method for retrieving information consistent with an embodiment of the present invention. In step 4600, a message request is received at, for example, content router 155. This message request may originate in an ESME 115, such as a mobile telephone or other wireless communication device. Message requests may comprise just a command or may comprise a command and at least one parameter. For example, the message

QUOTE SBC requests a realtime stock quote for SBC Communications, Inc., wherein "QUOTE" is the command and "SBC" is the parameter. Furthermore, the message

QUOTE SBC BLS is an example of a message with two parameters, wherein the message requests real-time stock quotes for SBC Communications, Inc. and BellSouth Corporation. Finally, the message

WEATHER is an example of a message with a command and no parameters, wherein the message requests a weather report for a prespecified location. The present invention contemplates any number of such commands, such as TRAFFIC, SCORE, NEWS, and HELP. The present invention also contemplates that any of these commands may be modified and new commands could be added. Commands should generally comprise a mnemonic or an abbreviation for a service associated with the command.

In step 4602, content router 155 parses the received message determine the command, and, optionally, one or more parameters. In some cases, content router 155 may receive some messages where the command is not recognized. As an optional step to the exemplary method, content router 155 may determine if the received message contains a recognized command. If the received request message does not contain a recognized command, content router 155 may optionally send a further information request back to the entity that sent the request message. This further information request may seek clarification of the command in the original request message. Furthermore, content router 155 may send a query message comprising a default command if the received request message does not contain a recognized command.

Another optional step may be used for handling commands that are not recognized. This step comprises parsing received request message for at least a semblance of a recognized command. In actuality, this semblance of a recognized command may comprise a fragment of a command, a misspelled command, an aliased command, a command concatenated to a parameter, a command concatenated to an address, or an abbreviated command, for example. Once this semblance of a command is recognized, a recognized command may be associated with the semblance of a command. In this way, the associated command may be sent with a query message. The present invention contemplates that the step of associating a known command with a semblance of a command may be implemented via lookup tables, dictionaries, heuristics, and/ or experience. Furthermore, the present invention contemplates that this step may be adaptive and changeable as new permutations of commands are encountered.

Using the command and the parameter(s), content router 155 fashions a query message based on a protocol associated with a content provider (step 4604). This step acknowledges that content providers (such as SMSC 105) may have specific message protocols for obtaining information that likely differ from those of the entity sending a message request. Optionally, the command may be associated with a certain content provider such that all messages comprising that command are sent to the certain content provider. In step 4606, content router 155 sends the query message to the content provider.

Content router 155 receives a message, parses the message for a command, fashions a query message in the format recognized by the content provider, and sends the query message to the content provider.

Typically, the content provider will process the query message in its own proprietary fashion. For example, the content provider may comprise an Internet or Intranet web site. Thus, data from the content provider may be obtained, for example, by sending a message that fills out appropriate fields in a web page and submits a request for information.

Again with reference to FIG. 46, content router 155 may receive a query response message from the content provider in step 4608. In step 4610, the content router may parse the query response message for the response information, which should comprise the information originally sought in the message request. The content provider fashions a request to the response message based on this response information and based on a protocol associated with the message request (step 4612). In step 4614, content router 155 sends the request response message, typically to the device that sent the original message request. Typically, the protocol associated with the message request is actually the protocol of the device that sent the message request. Thus, step 4612 fashions a message that may be understood by the entity that sent the original message request.

Figure 47:
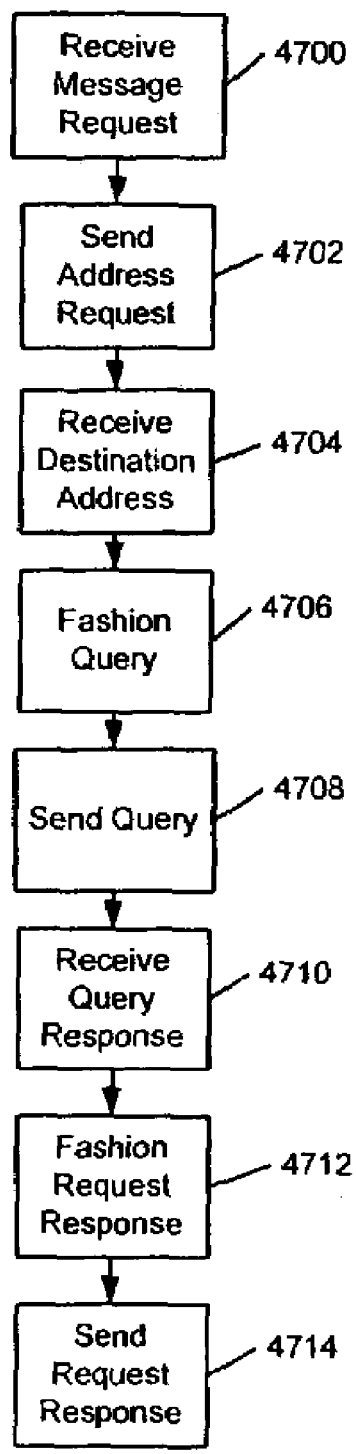
FIG. 47 illustrates another exemplary method for retrieving information using a content router according to an exemplary embodiment of the present invention.

Turning now to FIG. 47, another exemplary method will be described for retrieving information according to an embodiment of the present invention. In step 4700, content router 155 receives a message request. As mentioned above, this message request may originate in an ESME 115, such as a mobile telephone or other wireless communication device. Message requests may comprise a command and/or at least one parameter, and a destination alias or a destination address. In step 4702, content router sends and address request message to an aliasing facility, such as, for example, a RAVE 130. The content router may then transform the destination alias into its associated destination address (e.g., a long code, address, or telephone number), which is then sent back to content router 155. In step 4700, content router 155 receives the destination address.

Content router 155 fashions a query message in step 4706 based on a protocol associated with the destination address. Typically, the protocol of the device to which the query message is being sent will dictate the protocol of the query message, such as, for example, the posting of form data in a predetermined format for a Intranet or Internet web site. The query message is sent to the destination address in step 4708 by content router 155. Typically, a device associated with the destination address, such as a content provider, will process the query message and send a query response message back to content router 155. In step 4710, content router 155 receives a query response message from a device associated with the destination address.

Content router 155 may fashion a request response message in step 4712. This request response message may be based on a protocol associated with the request message. In step 4714, content router 155 sends this request response message typically to the device that sent a message request. This device could comprise an ESME 115, such as a mobile telephone or other wireless communication device. However, it is contemplated that content router 155 may send the request response message to other devices without departing from the scope of the present invention.

An example of the exemplary method of FIG. 47 will now be presented. Consider the message request

141 QUOTE SBC that is received by content router 155. In this message, "141" is the destination alias, "QUOTE" is the command, and "SBC" is the parameter. According to the exemplary method of FIG. 47, content router 155 sends an address request message to an aliasing facility. The address request message comprises the address alias, such as

141

Content router 155 then receives a destination address from the aliasing facility, such as

111040000 where "111040000" is a destination address associated with the destination alias. Content router may then combine the destination address with the command and the one or more parameters, such as

111040000 QUOTE SBC and send this message to network transport layer 125 for eventual delivery to a device associated with the destination address (e.g., a content provider). In this example, the device associated with the destination address may be a content provider that is capable of providing real-time stock quotes. In step 4700, content router 155 may receive a response from the content providing device at the destination address, such as 40.17

In this case "40.17" represents a current stock price for SBC Communications, Inc.

Content provider 155 can then fashion a request response message comprising this information and send the request response message back to the device that sent the original message request. Furthermore, content provider 155 would fashion the message based on a protocol associated with this device, such that the sent message would be understood by the device. Typically, this device would be an ESME 115, such as a mobile telephone or other wireless communication device. Thus, the stock price information could be displayed by the device remotely.

An exemplary embodiment of the present invention may support SMPP3.4.

An exemplary embodiment of the present invention may use a database for storing the processing rules.

An exemplary embodiment of the present invention may provide a web based interface to maintain processing rules.

An exemplary embodiment of the present invention may support keyword selection from the content of a message.

An exemplary embodiment of the present invention may support keywords with regular expressions, for example a rule with [h-i]elp may accept help and ielp.

An exemplary embodiment of the present invention may support keywords as case sensitive/insensitive.

An exemplary embodiment of the present invention may support intelligent keyword selection. Keywords may be treated as if they do not have white space (E.g. Help Games can be listed as HelpGames)

An exemplary embodiment of the present invention may support arguments in the message contents (e.g., keyword followed by multiple arguments).

An exemplary embodiment of the present invention may support variable tags for argument selection (e.g. $1, $2, $3).

An exemplary embodiment of the present invention may allow multiple Destination/Keyword combinations to take one specific action An exemplary embodiment of the present invention may support an engine which uses both the content and subject for rule evaluation.

An exemplary embodiment of the present invention may allow new rules to be added dynamically.

An exemplary embodiment of the present invention may allow modification of the originating and or destination address of the message.

An exemplary embodiment of the present invention may selectively create new content based on some/all of the parameters of the original message.

An exemplary embodiment of the present invention may use delimiting characters (space, comma, hash, star, etc) to identify keywords and parameters.

If a routing rule does not exist then a default action may be provided (e.g. notify the originator of the problem).

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. An adapter for passing messages in a wireless telecommunications infrastructure from a first wireless telecommunications device to a second wireless telecommunications device via a network transport bus, comprising:

a messaging interface in communication with the first and second wireless telecommunications devices, the messaging interface operable to receive a received message in a first messaging format from the first wireless telecommunications device and send the received message in a second messaging format to the second wireless telecommunications device;

a processor coupled to the messaging interface, the processor operable to:

receive the received message from the messaging interface via the network transport bus and translate the received message into a common message in a common messaging format and translate the common message into a message in the second messaging format;

publish a routing request in the common messaging format to the network transport bus for retrieval by a routing element that is communicatively connected to the network transport bus; and retrieve a routing response published to the network transport bus by the routing element in the common messaging format, wherein the routing response includes routing information for the second wireless telecommunications device; and a bus interface coupled to the processor, the bus interface operable to receive the common message from the processor and to publish the common message to the network transport bus for retrieval by the second wireless telecommunications device, wherein the adapter is communicatively coupled to a network database via the network transport bus, wherein the network database stores the common message in the common messaging format for later retrieval by any device communicatively coupled to the network transport bus without further translation and wherein the first wireless telecommunications device and the second wireless telecommunications device operate under different wireless messaging technology protocols, and wherein if the routing response is invalid, further processing of the received message is halted and the received message is not translated to the common messaging format.

2. The adapter of claim 1, wherein the processor is further operable to:

identify a destination address from the received message; and generate a subject address to the common message based on the response.

3. The adapter of claim 2, wherein the processor is further operable to include in the request for the routing information a routing validation request, the routing validation request including an address of the first wireless telecommunications device and an address of the second wireless telecommunications device.

4. The adapter of claim 3, wherein the processor is further operable to receive in the routing response the routing information indicating an invalid response.

5. The adapter of claim 4, wherein the processor is further operable to not transmit the common message through the bus interface if the routing information indicates an invalid response.

6. The adapter of claim 4, wherein the processor is further operable to send a declination message through the messaging interface to the first wireless telecommunications device in the first messaging format if the routing information indicates an invalid response.

7. The adapter of claim 3, wherein the routing information indicates whether or not the second wireless telecommunications device is password protected.

8. The adapter of claim 7, wherein the processor is further operable to request a password from the first wireless telecommunications device.

9. The adapter of claim 8, wherein the processor is further operable to verify the password received from the first wireless telecommunications device, and transmit the message if the password is valid.

10. The adapter of claim 2, wherein the common messaging format is one of a MIME format and an XML format.

11. The adapter of claim 2, wherein the messaging format of the first wireless telecommunications device is SMS.

12. The adapter of claim 2, wherein the first messaging format is one of an EMS format, an HTML format, a TAP format, a WML format, a Mobitex format, and a UPOC format.

13. The adapter of claim 1, wherein the messaging interface is operable to communicate with a plurality of devices and to receive messages in multiple messaging formats from the plurality of devices.

14. A method of passing messages from a first wireless telecommunications device to a second wireless telecommunications device in a wireless telecommunications system via a network transport bus, comprising:

receiving a first message in a first messaging format from the first wireless telecommunications device via the network transport bus, wherein the network transport bus communicatively connects a plurality of network elements and utilizes a common messaging format for communication among and between the network elements, wherein the network elements comprise an adapter, a routing and validation entity, a data storage and routing terminal, and a network database all communicatively connected to the first network transport bus;

translating the first message from the first messaging format into a common message in the common messaging format;

publishing a routing request in the common messaging format to the network transport bus for retrieval by the routing and validation entity;

retrieving a routing response published to the network transport bus by the routing and validation entity in the common messaging format, wherein the routing response includes routing information for the second wireless telecommunications device, and wherein if the routing response is invalid, further processing of the first message is halted and the first message is not translated to the common messaging format;

storing the first message in the common messaging format in the network database for retrieval by any device communicatively connected to the network transport bus without further translation;

translating the first message in the common messaging format from the common messaging format into a message in a second messaging format; and transmitting the message in the second messaging format via the network transport bus to the second wireless telecommunications device, wherein the first wireless telecommunications device and the second wireless telecommunications device operate under different wireless messaging technology protocols.

15. The method of claim 14, wherein receiving the first message further comprises reading a destination address appended to the first message.

16. The method of claim 15 further comprising:
generating a subject address for the common message in the common messaging format based on the response.

17. The method of claim 15, wherein receiving the routing response further comprises receiving the routing response in the common messaging format over the network transport bus.

18. The method of claim 17, further comprising:
receiving a routing validation response, the routing validation response indicating an invalid request.

19. The method of claim 17 wherein the routing information indicates whether or not the second wireless telecommunications device is password protected.

20. The method of claim 19, further comprising:
requesting a password from the first wireless telecommunications device in the first messaging format.

21. The method of claim 20, further comprising:
verifying the received password in the password reply message; and
publishing the common message through the bus only if the password is valid.

22. The method of claim 14, further comprising:
preventing the transmission of the common message through the bus if the routing information indicates an invalid response.

23. The method of claim 14, further comprising:
sending a declination message through the messaging interface to the first wireless telecommunications device in the first messaging format if the routing information indicates an invalid response.

24. The method of claim 14, further comprising:
receiving a plurality of messages in different messaging formats; and
translating the received messages from the different messaging formats into a common messaging format.

* * * * *